(12) United States Patent  (10) Patent No.: US 6,681,106 B2
Marsh et al.  (45) Date of Patent: *Jan. 20, 2004

(54) SYSTEM AND METHOD FOR ANALYZING WIRELESS COMMUNICATION RECORDS AND FOR DETERMINING OPTIMAL WIRELESS COMMUNICATION SERVICE PLANS

(75) Inventors: William Marsh, Austin, TX (US); John Merritt, Austin, TX (US); Ted Colbert, Austin, TX (US); Juan Gonzales, Austin, TX (US); David Langworthy, Austin, TX (US)

(73) Assignee: Traq Wireless, Inc., Austin, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 09/758,816

(22) Filed: Jan. 11, 2001

(65) Prior Publication Data
US 2001/0037269 A1 Nov. 1, 2001

Related U.S. Application Data
(60) Provisional application No. 60/230,846, filed on Sep. 7, 2000.

(51) Int. Cl.[7] ............................................. H04M 11/00
(52) U.S. Cl. ............. 455/408; 379/114.02; 379/114.28; 705/52
(58) Field of Search ................................. 455/405–408, 455/560; 705/52–54; 379/114.01–114.03, 114.1, 114.12, 114.21, 114.23, 114.27, 114.28, 115.01, 115.02

(56) References Cited

U.S. PATENT DOCUMENTS

| | | | |
|---|---|---|---|
| 5,027,388 A | | 6/1991 | Bradshaw et al. .......... 379/112 |
| 5,553,131 A | | 9/1996 | Minervino, Jr. et al. .... 379/221 |
| 5,615,408 A | * | 3/1997 | Johnson et al. ............. 455/405 |
| 5,659,601 A | | 8/1997 | Cheslog ...................... 455/406 |
| 5,684,861 A | | 11/1997 | Lewis et al. ................... 379/59 |
| 5,878,126 A | | 3/1999 | Velamuri et al. ........... 379/219 |
| 5,907,800 A | | 5/1999 | Johnson et al. ............. 455/405 |
| 6,125,173 A | * | 9/2000 | Jagadish et al. ......... 379/114.1 |
| 6,240,169 B1 | * | 5/2001 | Haskins et al. ........ 379/114.02 |
| 6,252,952 B1 | * | 6/2001 | Kung et al. .............. 379/114.1 |
| 6,301,471 B1 | * | 10/2001 | Dahm et al. ................. 455/405 |
| 6,345,090 B1 | * | 2/2002 | Walker et al. ......... 379/114.12 |
| 2001/0007978 A1 | | 7/2001 | Marsh et al. |
| 2001/0016831 A1 | | 8/2001 | Marsh et al. |

* cited by examiner

Primary Examiner—Edward F. Urban
Assistant Examiner—Charles Craver
(74) Attorney, Agent, or Firm—Thomas, Kayden, Horstemeyer & Risley LLP

(57) ABSTRACT

In general, a system and method for analyzing wireless communication records and for determining optimal wireless communication service plans is disclosed. A transceiver is configured to receive billing information associated with a subscriber of a telecommunications service under a current rate plan. A storage unit stores the billing information. A processor processes the subscriber related billing information to produce organized data having a predefined format. The processor then analyzes the processed data in relation to a plurality of rate plans of a plurality of telecommunications service providers, and determines at least one proposed rate plan that would save the subscriber telecommunication costs relative to the current rate plan. A report of at least one proposed rate plan is then produced and provided to the subscriber, which enables selection of a best telecommunication service provider.

53 Claims, 44 Drawing Sheets

SYSTEM AND METHOD FOR ANALYZING WIRELESS COMMUNICATION RECORDS AND FOR DETERMINING OPTIMAL WIRELESS COMMUNICATION SERVICE PLANS

CROSS-REFERENCE TO RELATED APPLICATIONS

This application claims the benefit of U.S. Provisional Application Ser. No. 60/230,846, filed on Sep. 7, 2000, and entitled "System and Method for Analyzing Wireless Communications Records and for Determining Optimal Wireless Communication Service Plans", which is incorporated by reference herein in its entirety into the present disclosure.

This application is related to co-pending U.S. patent application Ser. No. 09/758,815, filed on Jan. 11, 2001, and entitled "System and Method for Analyzing Wireless Communication Data," which is hereby incorporated by reference in its entirety into the present disclosure.

This application is also related to co-pending U.S. patent application Ser. No. 09/758,818, filed on Jan. 11, 2001, and entitled "System and Method for Determining Optimal Wireless Communication Service Plans," which is hereby incorporated by reference in its entirety into the present disclosure.

This application is also related to co-pending U.S. patent application Ser. No. 09/760,315, filed on Jan. 11, 2001, and entitled "System and Method for Determining Optical Wireless Communication Service Plans Based on Spectrum Licenses," which is hereby incorporated by reference in its entirety into the present disclosure.

This application is also related to co-pending U.S. patent application Ser. No. 09/758,824, filed on Jan. 11, 2001, and entitled "System and Method for Determining Optimal Wireless Communication Service Plans Based on Historical Projection Analysis," which is hereby incorporated by reference in its entirety into the present disclosure.

FIELD OF THE INVENTION

The present invention is generally related to wireless telecommunication, and, more particularly, is related to a system and method for determining an optimal wireless communication service plan for a customer.

BACKGROUND OF THE INVENTION

Because immediate access to information has become a necessity in virtually all fields of endeavor, including business, finance and science, communication system usage, particularly for wireless communication systems, is increasing at a substantial rate. Along with the growth in communication use has come a proliferation of wireless communication service providers. As a result, a variety of wireless communication service alternatives have become available to consumers and businesses alike.

Subscribers to communication services, particularly wireless communication services, and the businesses that may employ them, who are dissatisfied with the quality of service or the value of the service provided by a particular provider, may terminate their current service and subscribe to a different service. Unfortunately, due to the vast number of communication service providers available, it is difficult to determine an optimal service plan, as well as optional service packages. In addition, due to the competitive nature of the wireless communication field, the cost and options made available with service plans frequently change, adding to the difficulty of finding the most optimal service plan available at a specific time.

Thus, a heretofore unaddressed need exists in the industry to address the aforementioned deficiencies and inadequacies.

SUMMARY OF THE INVENTION

In light of the foregoing, the invention is a system and method for analyzing wireless communication records and for determining optimal wireless communication service plans.

Generally, describing the structure of the system, the system uses at least one transceiver that is configured to receive billing information associated with a subscriber of a telecommunications service under a current rate plan that is stored in a storage unit. A processor is also used by the system which is configured to process the subscriber related billing information to produce organized data having a predefined format, analyze the processed data in relation to a plurality of rate plans of a plurality of telecommunications service providers, determine at least one proposed rate plan that would save the subscriber telecommunication costs relative to the current rate plan, and produce a report of the at least one proposed rate plan to enable selection of a best telecommunication service provider and a best rate plan.

The present invention can also be viewed as providing a method for analyzing wireless communication records and for determining optimal wireless communication service plans. In this regard, the method can be broadly summarized by the following steps: receiving billing information associated with a subscriber of a telecommunication service under a current rate plan; processing the subscriber related billing information to produce organized data in a calling profile record for each telecommunication service being used by the subscriber; creating a usage history table and a call detail table from the processed billing information; analyzing the processed data in relation to at least one rate plan of a plurality of at least one telecommunication service provider; determining at least one proposed rate plan that would save the subscriber telecommunication costs relative to the current rate plan, via use of the usage history table and call detail table; and producing a report of the at least one proposed rate plan to enable selection of a best telecommunication service provider and a best rate plan.

The invention has numerous advantages, a few of which are delineated hereafter as examples. Note that the embodiments of the invention, which are described herein, possess one or more, but not necessarily all, of the advantages set out hereafter.

One advantage of the invention is that it automatically provides a subscriber with the best telecommunication service provider and the best rate plan without necessitating unnecessary subscriber interaction.

Another advantage is that it improves the quality of service and the value of the telecommunication services received by a subscriber.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
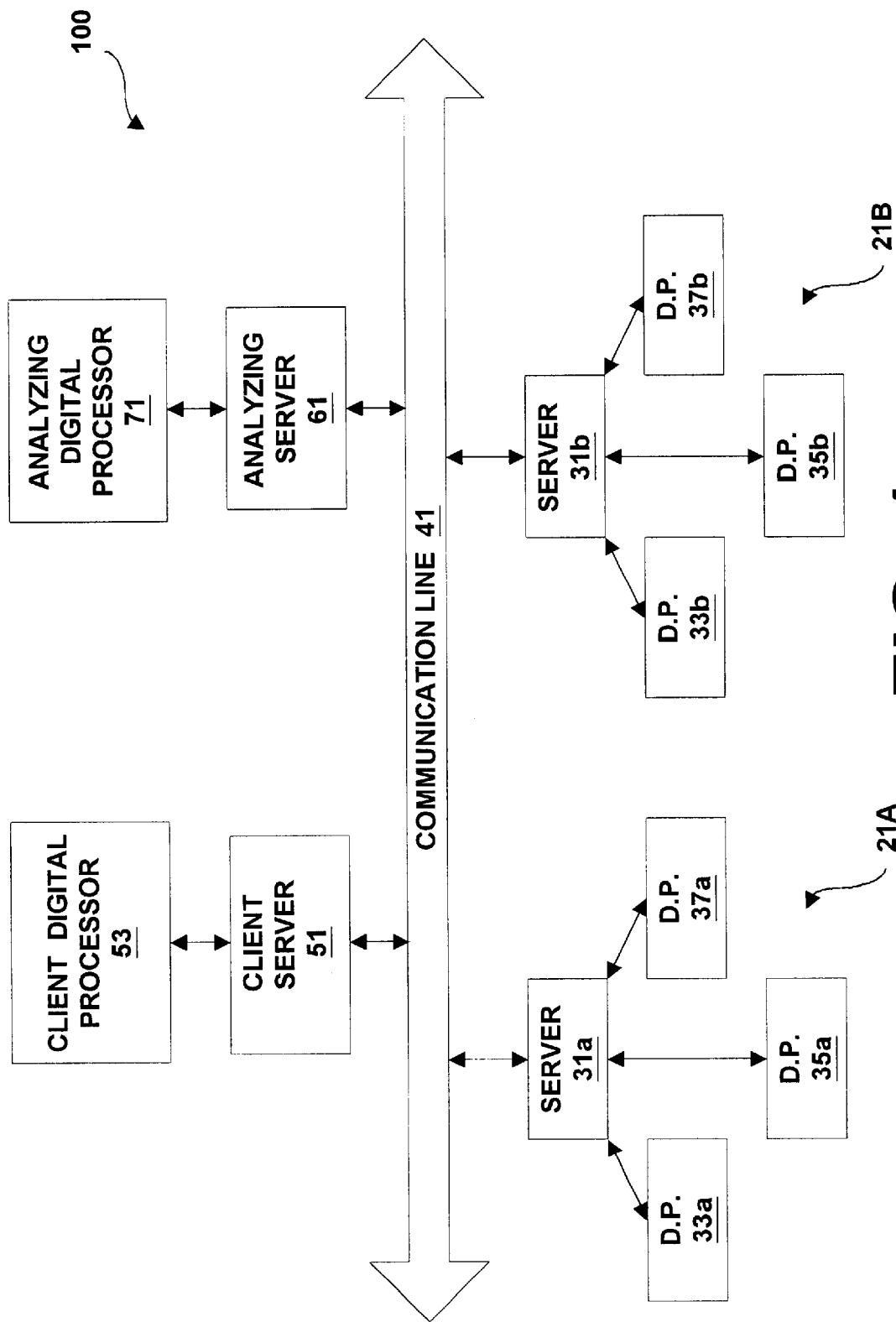
FIG. 1 is a block diagram illustrating a system and method for analyzing wireless communications records and advising on optimal wireless communication service plans.
Figure 2A:
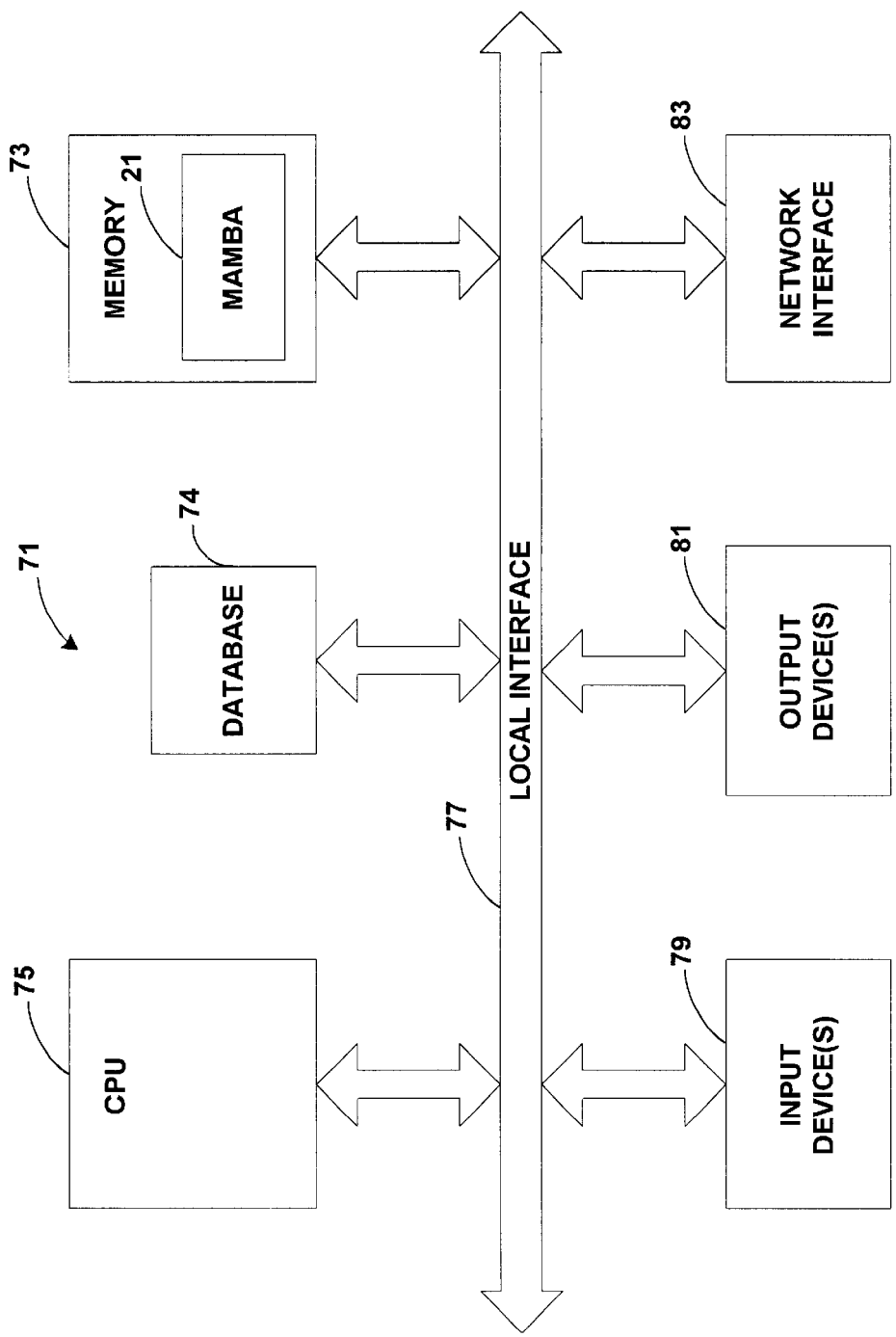
FIG. 2A is a block diagram illustrating a more detailed view of an analyzing digital processor depicted in FIG. 1.
Figure 2B:
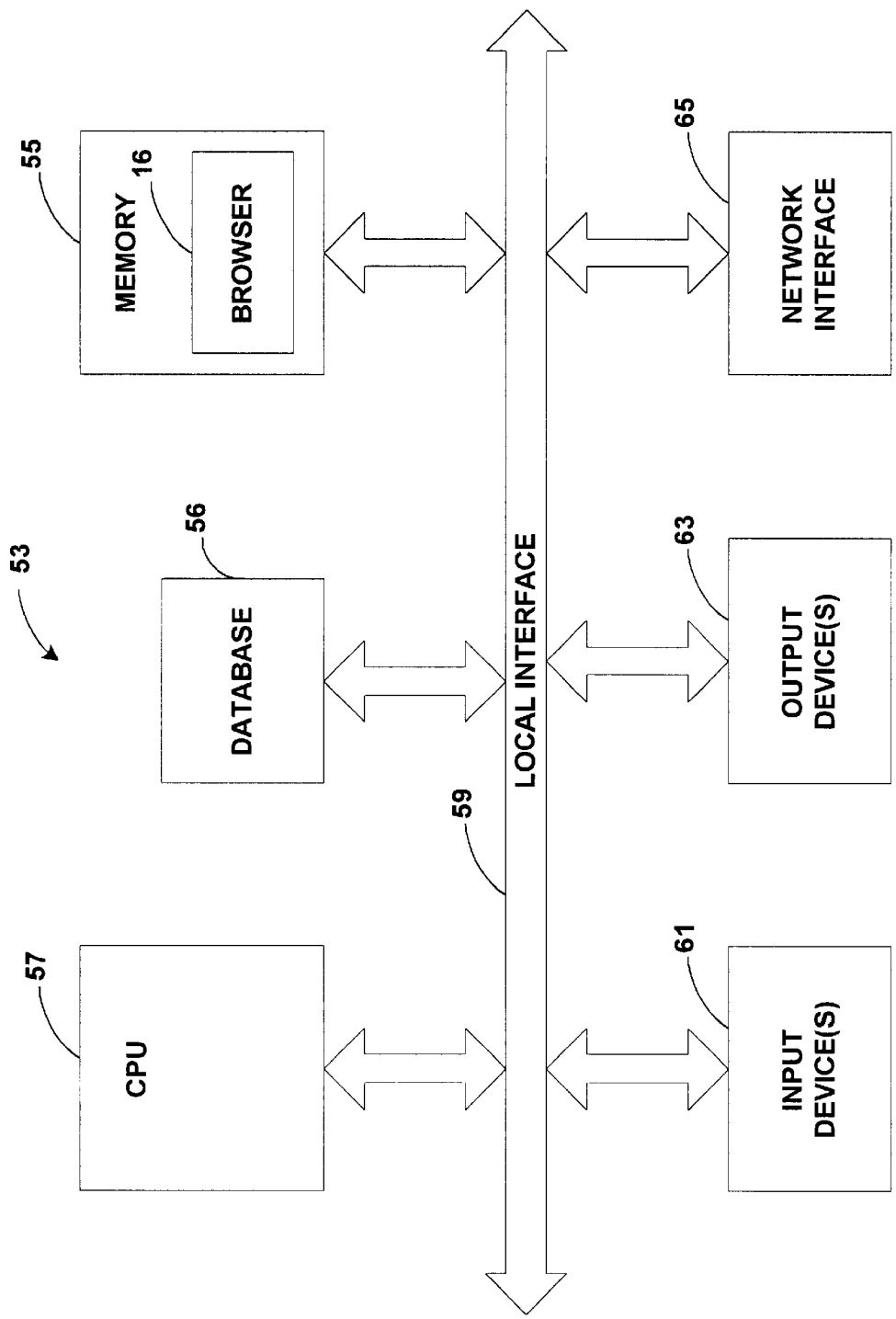
FIG. 2B is a block diagram illustrating a more detailed view of a client digital processor depicted in FIG. 1.

The moving average monthly bill analysis (MAMBA) system 100, as is structurally depicted in FIGS. 1, 2A, and 2B can be implemented in software, hardware, or a combination thereof. In the preferred embodiment, as illustrated by way of example in FIG. 2A, the MAMBA system 100, along with its associated methodology, is implemented in software or firmware, stored in computer memory of the computer system, and executed by a suitable execution system. If implemented in hardware, as in an alternative embodiment, the MAMBA system 100 can be implemented with any or a combination of the following technologies, which are well known in the art: a discrete logic circuit(s) having logic gates for implementing logic functions upon data signals, an application-specific integrated circuit (ASIC) having appropriate combinational logic gate(s), programmable gate array(s) (PGA), field programmable gate array(s) (FPGA), etc.

Note that the MAMBA system 100, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the MAMBA system 100 software may be magnetically stored and transported on a conventional portable computer diskette.

By way of example and illustration, FIG. 1 illustrates a typical Internet based system upon which the MAMBA system 100 of the present invention may be implemented. It should be noted that while the present disclosure provides implementation of the MAMBA system 100 within an Internet based system, the MAMBA system 100 need not be provided via use of the Internet. Instead, one of reasonable skill in the art will appreciate that the MAMBA system 100 may be implemented within other mediums, such as, for example, but not limited to, a local area network (LAN), or wide area network (WAN).

Alternatively, instead of implementing the MAMBA system 100 via use of the Internet, the MAMBA system 100 may also be implemented via use of a first transmitting and receiving device such as, but not limited to, a modem located at a customer premise (CP), which is in communication with a second transmitting and receiving device such as, but not limited to, a modem located at a central office. In accordance with such an embodiment, personal computers (PCs) may be located at the customer premise and the central office having logic provided therein to perform functions in accordance with the MAMBA system 100.

Referring to FIG. 1, a plurality of networks 21a, 21b are shown wherein each network 21 includes multiple digital processors 33, 35, 37. Digital processors 33, 35, 37 within each network 21 may include, but are not limited to, personal computers, mini computers, laptops, and the like. Each digital processor 33, 35, 37 is typically coupled to a host processor or server 31a, 31b for communication among processors 33, 35, 37 within the specific corresponding network 21.

The host processor, or server, 31 is coupled to a communication line 41 that interconnects or links the networks 21a, 21b to each other, thereby forming an Internet. As such, each of the networks 21a, 21b are coupled along the communication line 41 to enable access from a digital processor 33a, 35a, 37a of one network 21a to a digital processor 33b, 35b, 37b of another network 21b.

A client server 51 is linked to the communication line 41, thus providing a client with access to the Internet via a client digital processor 53, as further described hereinbelow. In accordance with the preferred embodiment of the invention, the software for implementation of the MAMBA system 100 is provided by a software program that is operated and located on an analyzing digital processor 71, and connected through an analyzing server 61, to the communication line 41 for communication among the various networks 21a, 21b and/or digital processors 33, 35, 37 and the client connected to the Internet via the client server 51.

It should be noted that the number of client servers, client digital processors, analyzing digital processors, and analyzing servers may differ in accordance with the number of clients provided for by the present MAMBA system 100. As an example, if five separately located clients were utilizing the MAMBA system 100, five separate client digital processors may be connected to a single client server or to five separate client servers.

In accordance with the preferred embodiment of the invention, the client digital processor 53 may be any device, such as, but not limited to, a personal computer, laptop, workstation, or mainframe computer. Further, the networks used by the MAMBA system 100 are preferably secure and encrypted for purposes of ensuring the confidentiality of information transmitted within and between the networks 21a, 21b.

The analyzing digital processor 71, further depicted in FIG. 2A, is designed to analyze the wireless communication data, received either from the wireless communication provider, the client, or a third party in order to determine the optimal wireless communication service plans. As shown by FIG. 2A, the analyzing digital processor 71 includes logic to implement the functions of the MAMBA system 100, hereinafter referred to as the MAMBA software 21, that determines the optimal service plan stored within a computer memory 73.

Several embodiments of the analyzing digital processor 71 are possible. The preferred embodiment of analyzing digital processor 71 of FIG. 2A includes one or more central processing units (CPUs) 75 that communicate with, and drive, other elements within the analyzing digital processor 71 via a local interface 77, which can include one or more buses. A local database 74 may be located within the analyzing digital processor 71. It should be noted that the database 74 may also be located remote from the analyzing digital processor 71. Furthermore, an input device 79, for example, but not limited to, a keyboard or a mouse, can be used to input data from a user of the analyzing digital processor 71. An output device 81, for example, but not limited to, a screen display or a printer, can be used to output data to the user. A network interface 83 can be connected to the Internet to transfer data to and from the analyzing digital processor 71.

Referring to FIG. 2B, the client digital processor 53 of FIG. 1 is further illustrated. Several embodiments of client digital processor 53 are possible. In accordance with the preferred embodiment of the invention, the client digital processor 53 includes one or more CPUs 57 that communicate with, and drive, other elements within the client digital processor 53 via a local interface 59, which can include one or more buses. A local database 56 may be located within the client digital processor 53. It should be noted that the database 56 may also be located remote from the client digital processor 53. The client digital processor 53 also includes a memory 55 that houses software to provide a browser 16. Furthermore, an input device 61, for example, but not limited to, a keyboard or a mouse, can be used to input data from a user of the client digital processor 53. An output device 63, for example, but not limited to, a screen display or a printer, can be used to output data to the user. A network interface 65 can be connected to the Internet to transfer data to and from the client digital processor 53.

Figure 3:
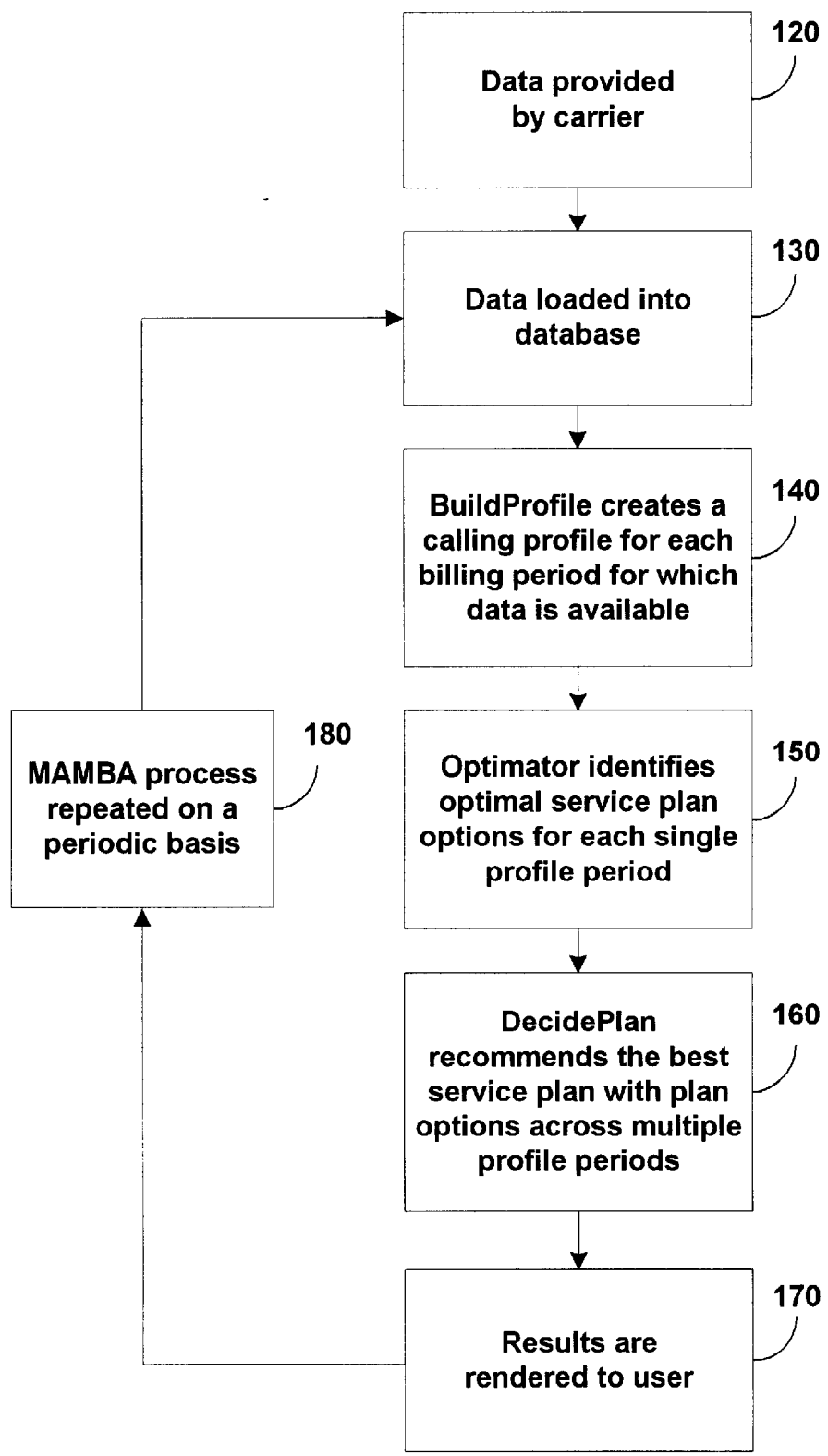
FIG. 3 is a flowchart that illustrates logical steps taken by the moving average monthly bill analysis (MAMBA) system of FIG. 1.

FIG. 3 is a flowchart that illustrates logical steps taken by the MAMBA system 100. Any process descriptions or blocks in flow charts illustrated or described in this document should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 5:
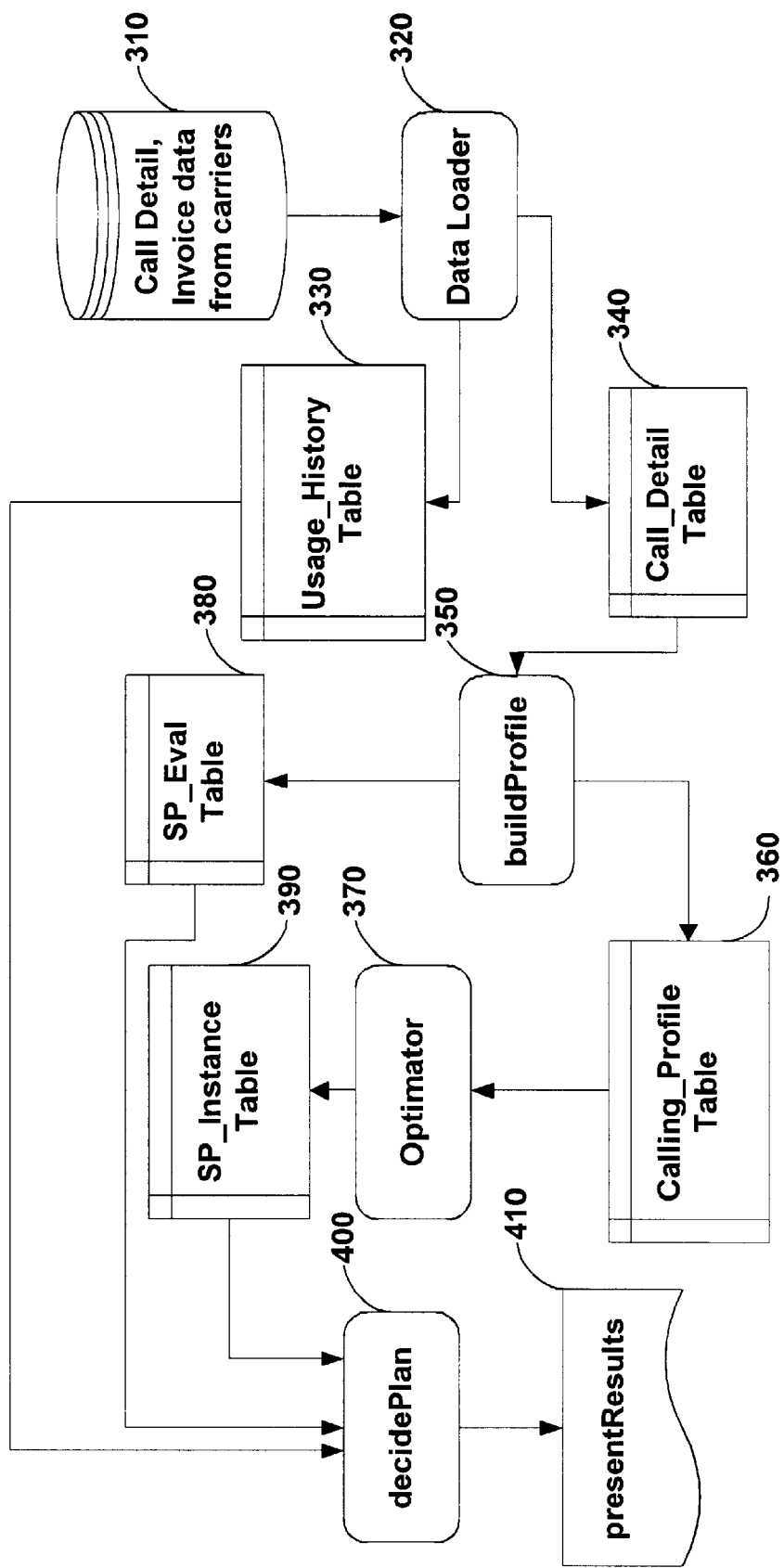
FIG. 5 illustrates a flowchart of the major MAMBA process of FIG. 1 and its read from/write to interaction with significant data tables.

As shown by block 120, data regarding a given cellular account, subscriber, or group of subscribers if the service is provided for a corporate customer, is provided by a carrier. As shown by block 130, the data is loaded into the analyzing digital processor database 74 by a dataloader process 320 (shown in FIG. 5 below). The loaded data is then analyzed. Analysis of the loaded data includes, but is not limited to, the steps of: creating a calling profile (block 140) for each billing period by running a buildProfile process (explained in detail below, with reference to FIG. 5); identifying optimal service plan options for each profile period (block 150); and making recommendations as to the best service plan and options (block 160), wherein service plan options are across multiple profile periods, by running a decidePlan process (FIG. 5 400). The results are then rendered to a user (block 170). In accordance with the preferred embodiment of the invention, the MAMBA system 100 then repeats the logical steps beginning with block 130 in accordance with a predefined periodic basis (block 180). The logical steps taken by the MAMBA system 100 are further explained hereinbelow.

The MAMBA system 100 can be offered on an application service provider (ASP) basis to telecommunication personnel at the customer premise, or to purchasing or other appropriate managers or administrators of wireless services at corporations, government agencies and/or similar organizations as a "cost assurance" tool. The MAMBA system 100 assures that all of the wireless accounts or subscribers under the management or control of administrators are on the best possible service plan, given their specific usage profile trends, and therefore minimizes overall expenditures for wireless services by the enterprise.

The MAMBA system 100 is an extension of the existing "one user at a time" Hypertext Markup Language (HTML)-based profiler application, which takes as input from an individual account or subscriber, via an HTML or Web-based interface, an interactively constructed user-defined profile, i.e., how many minutes of airtime a user may consume according to the three "W's" that, combined, bound the mobile calling environment: "When" (peak, off-peak, or weekend), "What" (local or toll), and from "Where" (home market or non-home market) the call is made. This calling profile, entered via the profiler HTML page, is then provided as input to an analysis component labeled an "optimator," which provides as output the best set of possible service plans, including optional packages, promotions, etc., based upon the entered calling profile. The results are presented to the user in the same HTML/Web-based format.

Figure 4:
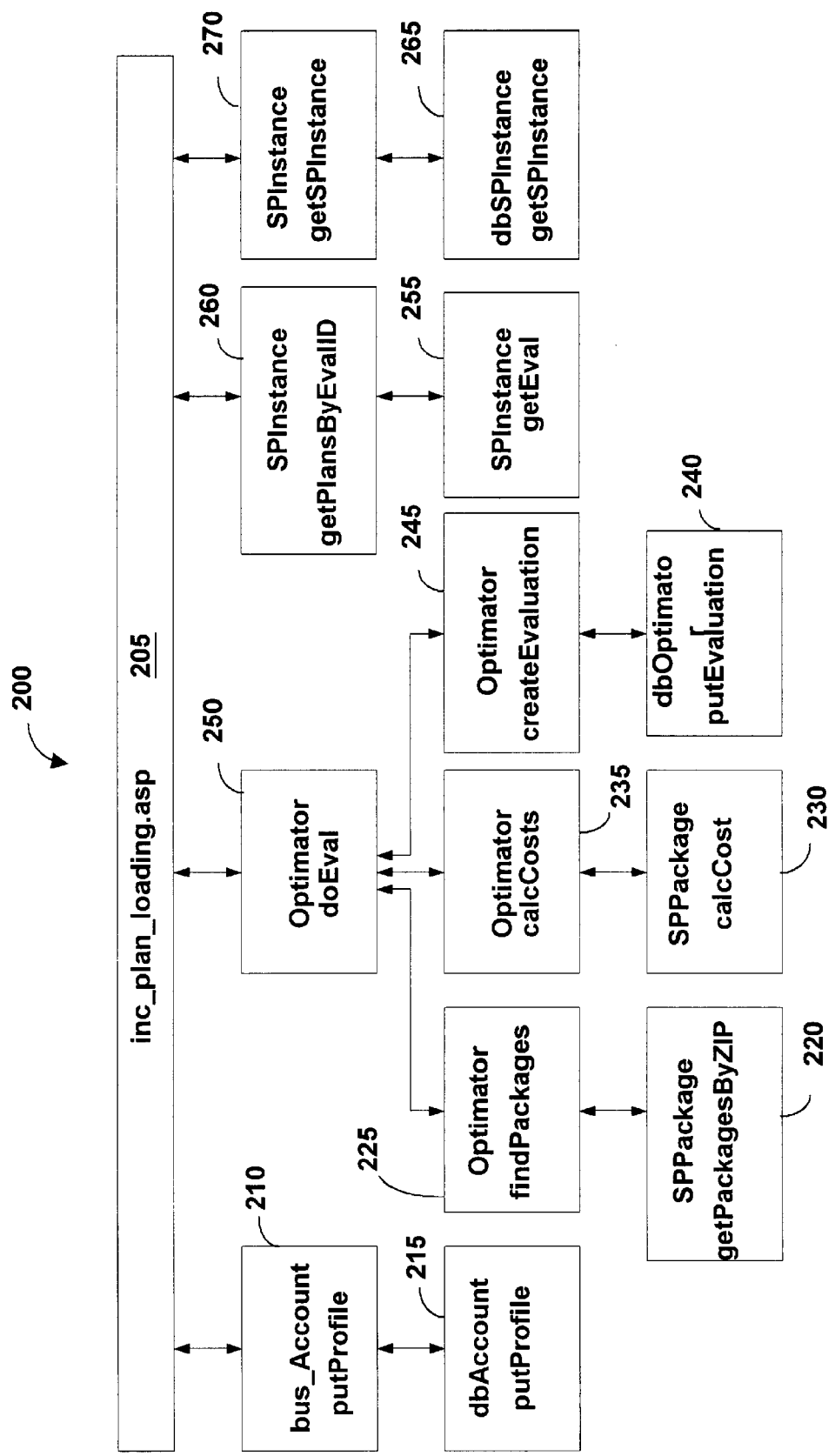
FIG. 4 is a block diagram illustrating a breakdown of an ad hoc profiler process according to profiles, optimator, and service plan instance processes.

Several embodiments of a profiler application 200 are possible. By way of example, the flow of logic comprising one possible embodiment of the profiler application 200 is shown in FIG. 4. The logic is represented in flow charts that interrelate. In the profiler application 200 of FIG. 4, an inc_plan_loading.asp function 205 collects a user's usage profile information via a user interface, such as, but not limited to, an HTML-based input page/screen. The usage profile preferably comprises the following: the expected quantity of wireless usage to be utilized during a given billing period (usually, but not exclusively, a one month period); how the expected usage will be distributed according to time-of-day and day-of-week; how the usage was expected to be distributed by local versus toll calling; and the expected distribution according to the location where calls are made or received. A dbAccount putProfile function 215, which is connected to a bus_Account putProfile function 210, then writes this profile information to the analysis digital processor database 74.

The bus_Account putProfile function 210 is connected to an optimator doEval function 250 and to service plan instances 260, 270 via the inc_plan_loading.asp function 205, which presents the usage profile information stored via the dbAccount putProfile function 215 to the optimator doEval function 250.

The optimator doEval function 250 then presents a list of user-provided ZIP codes, symbolic of where the user can purchase service (at least their home zip code and possibly one or more zip codes of locations for the user's place of employment) from the user profile, to an optimator findPackages function 225. The optimator findPackages function 225 is, in turn, is connected to an SPPackage getPackagesByZIP function 220 which determines which wireless service plan packages are offered within the user provided ZIP codes. The SPPackage getPackagesByZIP function 220 then presents these wireless service plan packages to the optimator doEval function 250 via the optimator findPackages function 225. The optimator doEval function 250, in turn, presents the plan packages and the user profile information to an optimator calcCosts function 235 which then calls an SPPackage calcCost function 230 to calculate and organize, from lowest cost to highest cost, the cost of each service plan package combination for the given user usage profile. The cost information is then presented to the optimator doEval function 250 which uses an optimator createEvaluation function 245 and a dbOptimator putEvaluation function 240 to write the resulting evaluations, which represent comparison of the user usage profile to available service plans, to a database.

Finally, the optimator doEval function 250 utilizes a combination of an SPInstance getEvalID function 255, an SPInstance getEval function 260, a dbinstance getSPInstance function 265 and an SPInstance getSPInstance function 270 to present the results to the user via the inc_plan_loading.asp function 205.

The MAMBA system 100 extends the ad hoc profiler application 200 into a multi-account or subscriber-automated and recurring process that provides an analysis of periodically loaded wireless service usage of a given account or subscriber, and/or group of accounts or subscribers (e.g., a set of subscribers all employed by the same company and all subscribing to the same carrier), and determines whether or not that subscriber, or group of subscribers, is on the optimal wireless service plan according to the particular subscriber's usage patterns across a variable number of service billing periods. If not, the MAMBA system 100 suggests alternative cellular service plans that better meet the users' usage patterns and that reduce the overall cost of service to the account/subscriber.

FIG. 5 represents the functional "flow" among the major MAMBA system 100 components and their read from/write to interaction with the most significant data tables that are most directly utilized or affected by the analysis. Functionally, the MAMBA system 100 is comprised of the following five (5) processes, which further elaborate upon the flow chart of FIG. 3:

1) Using the Data Loader (DL) process 320, call detail records are imported from either the subscriber or the carrier information sources 310, either in the form of CDs and/or diskettes provided by an end user or via direct connection with carriers through file transfer protocol (FTP) or other communication means, into usage_history 330 and call_detail tables 340. While this step is actually not a part of the MAMBA system 100 per se, as the DL process 320 application may serve the analysis service offered, it may be a prerequisite process that should be modified in order to support the MAMBA system 100. Depending upon the final implementation strategy for the DL process 320, a staging table may be utilized as a subset of the total data set potentially provided by each carrier as may be used by the MAMBA system 100. Such a staging table would allow for a minimum set of data used to populate the call_detail table 340 to be extracted. It should be noted that the DL Process 320 is further defined with reference to FIGS. 6 and 7 hereinbelow.

2) In accordance with the second process, the buildProfile process 350 of FIG. 5 is created from the imported call detail tables 340. The MAMBA system 100 uses the call detail tables 340 for a given billing period to create a calling profile record 360, within a calling profile table, for each account of a given client. The calling profile record 360 represents in a single data record the wireless service usage for the client's account, which for a single subscriber and in a single billing period could represent the sum total of the information captured by hundreds or thousands of individual calls as recorded by the wireless service provider in the form of call detail records (CDRs).

The calling profile record 360 assesses a subscriber's CDRs according to the following three parameters: "when calls are made/received", according to time-of-day and day-of-week; "what kind of calls are made or received", either local or toll; and, "where calls are made or received" which is categorized into home, corporate and/or a variable number of alternate zip codes. With reference to the "where" parameter, if the number of alternate zip codes exceeds the number available for the calling profile record, then an additional algorithm is used to map the alternate zip codes in excess of those allowed by the calling profile data record into one of the allowed alternate zip codes "buckets". As an example, for four alternate markets, the MAMBA system 100 uses additional "bucketizing" logic to map any "where" usage information that goes beyond the four (4) alternate market buckets onto one of the four (4) markets. It should be noted that bucketizing is further defined with reference to FIG. 8 hereinbelow.

3) In accordance with the third process, namely the optimator process 370, the calling profile records 360 are used by the optimator process 370, as is further described hereinbelow. The optimator process 370 evaluates the calling profile records 360 to determine whether or not the client's current calling plan is the most cost effective for the usage represented by the calling profile 360 under analysis and recommends a variable number of cost-effective calling plans. This recommendation may take the form of a rate plan evaluation record 380 and at least one linked service plan instance record 390. It should be noted that the optimator process 370 is further defined with reference to FIG. 9 hereinbelow.

4) The fourth process, namely the decide plan process, uses the decidePlan process 400 to compare the results from the optimator process 370 to the cost, based upon usage history, for the current service plan an account, or client subscriber, is using. The decidePlan process 400 then selects the best possible plan using a "historical predictor" algorithm and several related statistical filters that, together, make a decision engine. It should be noted that the decidePlan process 400 is further defined with reference to FIG. 12 hereinbelow.

5) In a fifth process, namely the presentResults process 410, the MAMBA system 100 renders the recommendations from the optimator process 370 to the client and executes any actions the client wants to take as a result of those recommendations. As such, the MAMBA system 100 gathers information at different points during its processing and stores that information for use in presentation to the client in a rendition of the results 410. It should be noted that the present results process is further described hereinbelow under the title "Presentation of Recommendations or Actions."

dataLoader (DL)

Figure 6:
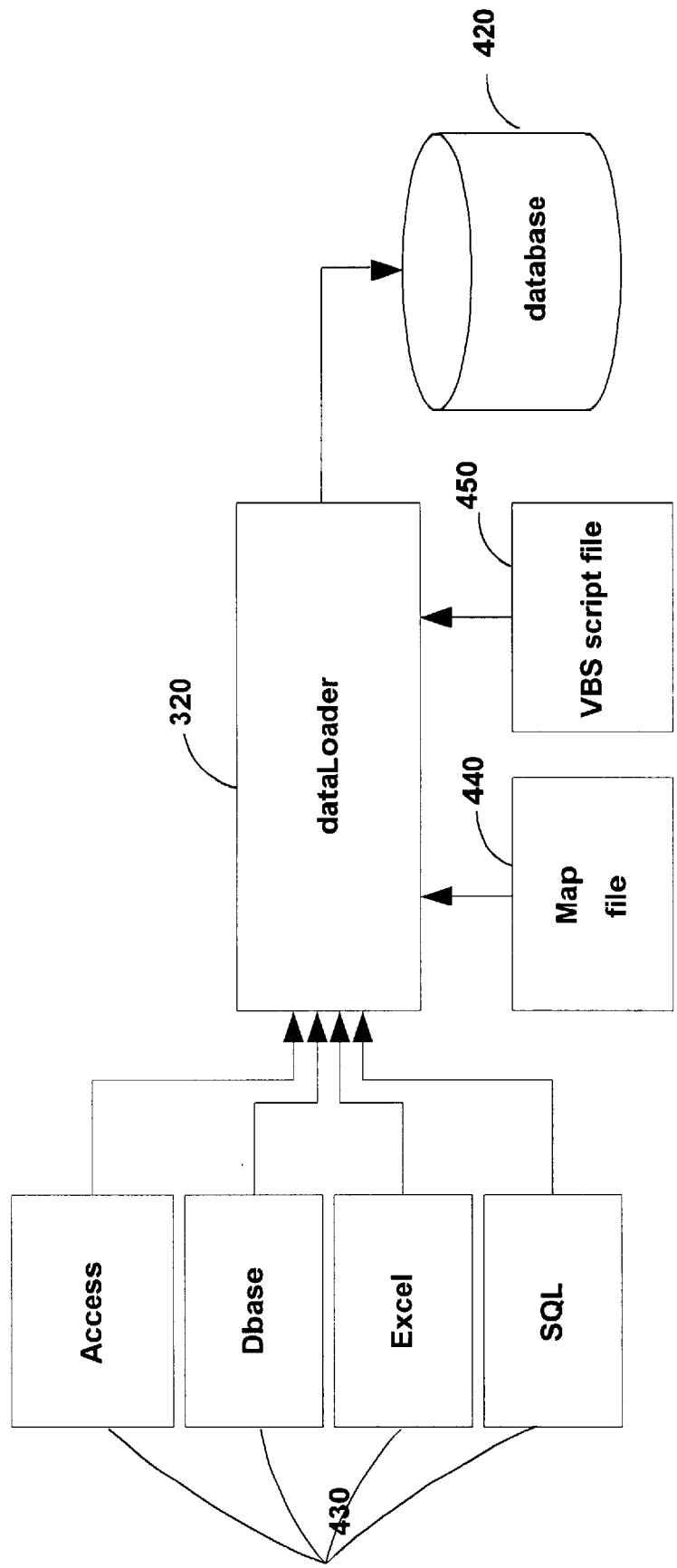
FIG. 6 is a flowchart illustrating the dataLoader (DL) architecture and process of FIG. 5.

FIG. 6 further illustrates the DL process 320 architecture and process 320. The DL process 320 is used to import data from external data sources, such as, for example, CD-ROMs or other storing mediums, such as diskettes provided by customers, or through direct data feeds from carriers serving those customers, to populate the database 74, preferably a Microsoft-structured query language™ (MS-SQL™) database, which is manufactured by, and made commonly available from, Microsoft Corporation, U.S.A., with the call detail and usage history information used by the MAMBA system 100. Other suitable database packages may be used, of which MS-SQL™ is merely an example. Preferably, the DL process 320, the results of which also support the Analysis ASP offering in addition to the MAMBA system 100, makes use of a set of ActiveX components to load requisite data from the provided sources. These components may, for instance, support the import of data from Microsoft Access™, Dbase IV™, Microsoft Excel™ and Microsoft SQL™ databases 430—430. It should be noted that other databases may be used in accordance with the present invention.

The DL process 320 makes use of two text files, namely, a "Map" file 440 and a "Visual Basic, Scripting Edition (VBS)™" file 450, to flexibly define or control the configuration of the data import process. The "Map" file 440 dictates to the DL process 320 how to map incoming data fields to destination data fields. The "VBS" file 450 is used by the DL process 320 to perform any custom transformations of input data before writing it to a destination, e.g., get dow_id from day_of_week. The Map 440 and VBS files 450 are developed as part of the data conversion process undertaken whenever new input data formats are presented by a customer base or carrier relationship base.

The DL process 320 is used to import initial customer data as well as to import ongoing call detail data. In one implementation of the invention, each of these data loads has a "base" set of user-provided data exist in a destination database, such as, for example, the local database 74 located within the analyzing digital processor 71, and then loads new data into the database. In accordance with the preferred embodiment of the invention, data shown in Table 1 hereinbelow exists in the database prior to execution of the DL process 320. It should be noted that the following is by no means a conclusive list of data and, as such, other data may exist within the database, or less data may exist within the database.

TABLE 1

Data Tables that Exists in Database Prior to Running the DL Process

| | | |
|---|---|---|
| ACCESSORY_ITEMS | ACCESSORY_PRODUCT_LINK | ACTIVITY |
| ACTIVITY_LINK | ADDRESS | ADDRESS_TYPE |
| BTA | CARRIER | CARRIER_ADDRESS_LINK |
| CARRIER_CONTACT_LINK | CARRIER_DBA | CONTACT |
| CONTACT_TYPE | COUNTY | COVERAGE_AREA_BTA_LINK |
| COVERAGE_AREA_MRSA_LINK | DB_HISTORY | FCC_CELL_LICENSE |
| FCC_PCS_LICENSE | LERG_FOREIGN | LERG_US |
| MRSA | MTA | MTA_MRSA_LINK |
| NATION | PHONE_ITEMS | PHONE_PRODUCT_LINK |
| PRODUCT_BUNDLE_ITEMS | PRODUCT_FAMILY | PRODUCT_INFO_STATUS_TYPE |
| REQUEST_STATUS | REQUEST_TYPE | SERVICE_PLAN |
| SERVICE_PLAN_STATUS_TYPE | SP_FEATURE | SP_FEATURE_BUNDLE |
| SP_FEATURE_BUNDLE_LINK | SP_FEATURE_TYPE | SP_PACKAGE |
| SP_PACKAGE_COVERAGE_LINK | SP_PACKAGE_TYPE | SP_PHONE_ITEM_LINK |
| SP_TAX | STATE | STATE_MTA_LINK |
| TECHNOLOGY_TYPE | USERINFO_STATUS_TYPE | ZIP_CODE |

The initial customer data load may then be loaded within the tables shown in Table 2.

TABLE 2

Data Tables into which Customers Initially Load Data

| | | |
|---|---|---|
| ACCOUNT | ACCOUNT_ADDRESS_LINK | ADDRESS |
| ADDRESS | CLIENT | CLIENT_ADDRESS_LINK |
| DEPARTMENT | PHONE_ITEMS | REQUEST_LOOKUP |
| TELEPHONE | USAGE_HISTORY | USER |

In accordance with one embodiment of the DL process 320, in the ongoing call detail data load the initial customer load may be completed prior to the running of the DL process 320. The ongoing call detail load may load data into the following tables shown in Table 3.

TABLE 3

Data Tables into which Customers May Load Ongoing Call Detail

| | | |
|---|---|---|
| CALL_DETAIL | PACKAGE_INSTANCE | SERVICE_PLAN |
| SERVICE_PLAN_INSTANCE | SP_PACKAGE | |

The call_detail table shown in Table 3 contains the minimum set of information provided by the wireless providers detailing calls made which can be reduced into a single calling_profile by the buildProfile process 350. The layout of the call_detail table is shown in Table 4.

TABLE 4

Layout of Call_detail Table

| Field Name | Data Type |
|---|---|
| Call_detail_id | Integer |
| Usage_id | Integer |
| billing_period | Datetime |
| mkt_cycle_end | Datetime |
| invoice_number | Varchar |
| billing_telephone_number | Varchar |
| originating_date | Datetime |
| originating_time | Varchar |
| originating_city | Varchar |
| originating_state | Varchar |
| terminating_number | Varchar |
| call_duration | Decimal |
| air_charge | Money |
| land_charge | Money |
| Surcharge | Money |
| Total | Money |
| user_last_updt | Varchar |
| tmsp_last_updt | Datetime |
| dow_id | Integer |

It should be noted that the dow_id field, as well as other fields, may contain a numerical representation of data to be inputted within a field, such as, instead of text for the day of the week that a call was placed, using 1=Sunday, 2=Monday, etc.

Operation of DataLoader Process

Figure 7:
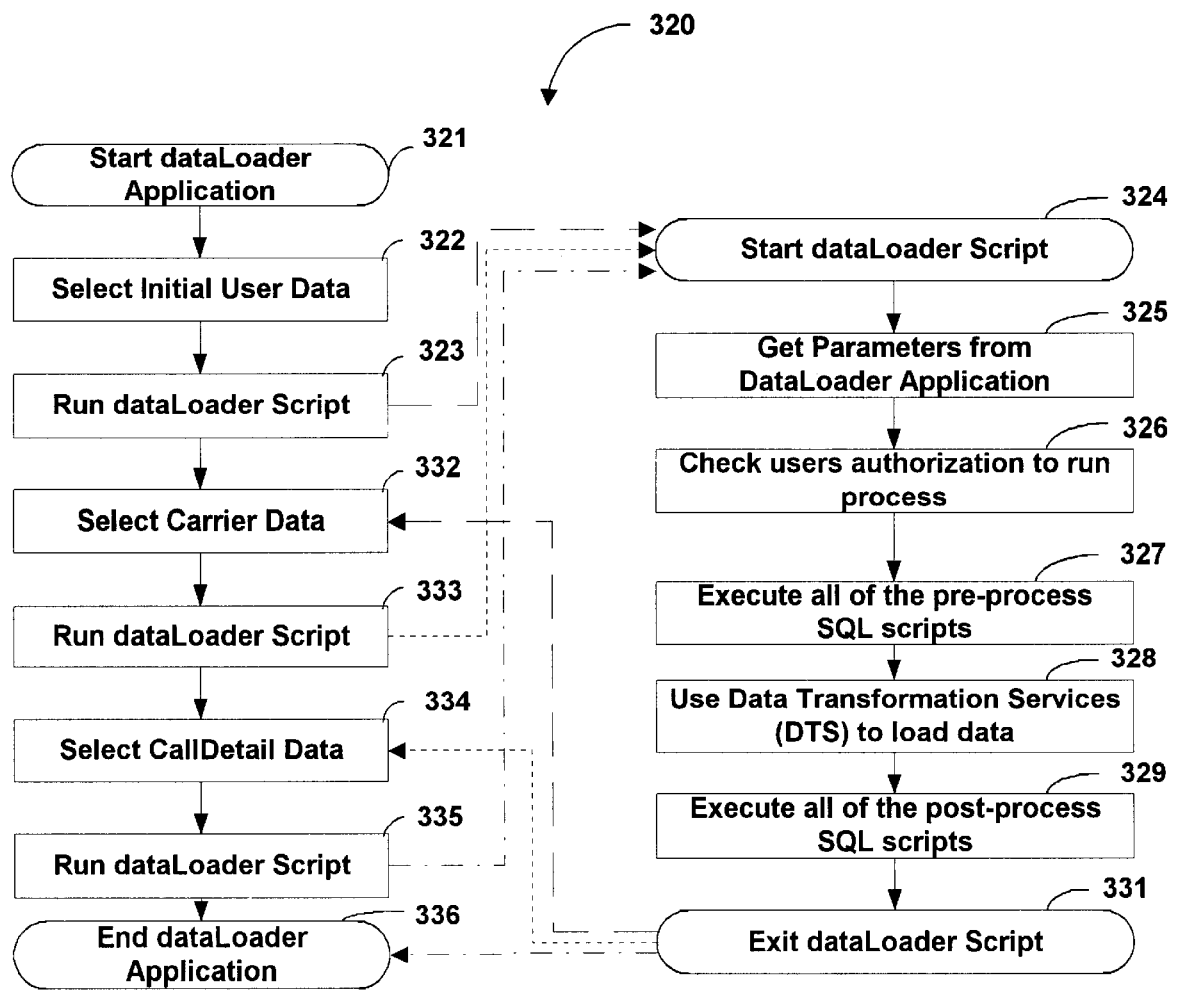
FIG. 7 is a flowchart illustrating the dataLoader process of FIG. 6.

FIG. 7 is a logical diagram that depicts operation of the DL process 320. As shown by block 321, the DL process 320 application can be started manually or as a result of a trigger event such as the posting of a customer's monthly data on an FTP site, or some similar type of event. As shown by block 322, initial user data is then selected. The DL script process is then run, as shown by block 323.

In accordance with the preferred embodiment of the invention, the DL script process includes the following steps. As shown by block 324, the DL script process is first started. Parameters are then retrieved from the dataloader process 320 application, as shown by block 325. As shown by block 326, the user's authorization is then checked in order to run the dataloader process 320 application. As shown by block 327, all pre-process SQL scripts are then executed to check the integrity/validity of the data and to otherwise put the data into the appropriate format for data transformation. Data transformation services (DTS) 328 are then used to load the pre-processed data. As shown by block 329, all post-process SQL scripts are then executed to confirm the integrity/validity of the data, after which the DL script is exited (block 331).

After the DL script process 323 is run, the DL process 320 selects a wireless service provider, or carrier, provided customer account and related (e.g., usage history) data 332. The DL script process is then run again 333, after which the DL process 320 selects "CallDetail Data" 334. As shown by block 335, the DL script process once again runs, after which the DL application ends block 336.

Build Profile Process

The following further illustrates the build profile process 350 with reference to FIG. 5, in accordance with the preferred embodiment of the invention. FIG. 5 depicts input and output of the optimator 370. The MAMBA system 100 provides a method to create calling_profile records 360 from the call_detail data 340 imported using the DL process 320. These calling_profile records 360 provide a rolled-up view of each account's call usage, reducing for a given account or subscriber what may be, for example, the hundreds or thousands of individual call detail records (N) generated into a single calling_profile record 360. This data reduction reduces the computations performed by optimator 370 in order to analyze a single account or subscriber by a similar amount.

The calling_profile record 360 is created by the buildProfile process 350. This record is used by the optimator process 370, which provides a service plan comparison and generates a list of potential service plans that may better fit the account or subscriber's particular calling profile. The calling_profile record 360 contains the fields and source data shown in Table 5.

TABLE 5

Fields and Source Data Contained in calling_profile Record

| Field Name | Data Type | Len | Source data |
|---|---|---|---|
| profile_id | Integer | | IDENTITY field |
| account_id | Integer | | from the user/account record |
| date_created | DateTime | | current date |
| billing_period | DateTime | | contains the billing period |
| periods_averaged | Integer | | contains the number of periods averaged for this record. |
| monthly_minutes | Integer | | sum of all minutes for a month |
| peak_percentage | Decimal | | buildProfile process |
| offpeak_percentage | Decimal | | buildProfile process |
| local_percentage | Decimal | | buildProfile process |
| home_zip | Varchar | 20 | From the user/address record |

TABLE 5-continued

Fields and Source Data Contained in calling_profile Record

| Field Name | Data Type | Len | Source data |
|---|---|---|---|
| corp_zip | Varchar | 20 | From the user/client/address record |
| alt_zip1 | Varchar | 20 | buildProfile process |
| alt_zip2 | Varchar | 20 | buildProfile process |
| alt_zip3 | Varchar | 20 | buildProfile process |
| alt_zip4 | Varchar | 20 | buildProfile process |
| home_zip_percentage | Decimal | | buildProfile process |
| corp_zip_percentage | Decimal | | buildProfile process |
| alt_zip1_percentage | Decimal | | buildProfile process |
| alt_zip2_percentage | Decimal | | buildProfile process |
| alt_zip3_percentage | Decimal | | buildProfile process |
| alt_zip4_percentage | Decimal | | buildProfile process |
| total_calls | Integer | | buildProfile process |
| total_rejected_calls | Integer | | buildProfile process |
| user_last_updt | Varchar | 20 | Username of person creating record |
| tmsp_last_updt | DateTime | | Current date |

The originating_city and originating_state from each call_detail record 340 may be used to determine the originating postal_code from the zip_code table. This process results in some degree of approximation because of the different methods employed by the carriers to input the destination_city information, e.g., Kansas_cit for Kansas City. However, using both the originating_city and originating_state minimizes the chances of selecting the wrong city, e.g., avoiding selecting Austin, Pa. instead of Austin, Tex., because of including the originating_state in this process.

All calls not made from either the home or corporate zip code are separated by originating_city, originating_state zip code and the total number of minutes added for each. Once calls have been separated into separate zip codes, using one implementation of the buildProfile process 350, if there are four or fewer zip codes, the zip codes may be written to the zip code fields, e.g., alt_zip1, alt_zip2, alt_zip3 and alt_zip4, in descending order by the amount of minutes for each zip code and the corresponding minutes, as a percentage of the total, may be written to the corresponding zip code percentage fields, e.g., alt_zip1_percentage, alt_zip2_percentage, alt_zip3_percentage and alt_zip4_percentage.

However, in this particular implementation, if there are more than four zip code sets, the zip code with the highest number of minutes is written to alt_zip1. Then the remaining zip codes are grouped by combining zip codes with the same first 3 digits, e.g., 787xx, and adding up the associated minutes.

Once this grouping has been completed, and if there are more than three groupings in this implementation, the zip code from the grouping with the highest number of minutes is added to alt_zip2. The remaining zip codes may then be grouped by combining zip codes with the same first two digits, e.g., 78xxx, and adding up the associated minutes.

Once this grouping has been completed, and if there are more than two groupings in this implementation, the zip code from the grouping with the highest number of minutes is added to alt_zip3. The remaining zip codes may then be grouped by combining zip codes with the same first digit, e.g., 7xxxx, and adding up the associated minutes. Once this grouping has been completed, the zip code with the highest number of minutes may be added to alt_zip4.

Once completed, the percentages may be computed from the total number of minutes and written to each zip code percentage field, including the home_zip_percentage and corp_zip_percentage fields. The periods_averaged field of the buildProfile process 350 contains the number of periods averaged to create this record. Records that are created by the buildProfile process 350 contain a value of 1 in this field. Records created by the "AvgProfilesByClient" or the "AvgProfilesByAccount" functions contain the number of profile records found for the given client or account with a billing period during the given dates. However, this value may be decremented due to the fact that the user has changed home market during that time frame.

Operation of BuildProfile Process

Figure 8:
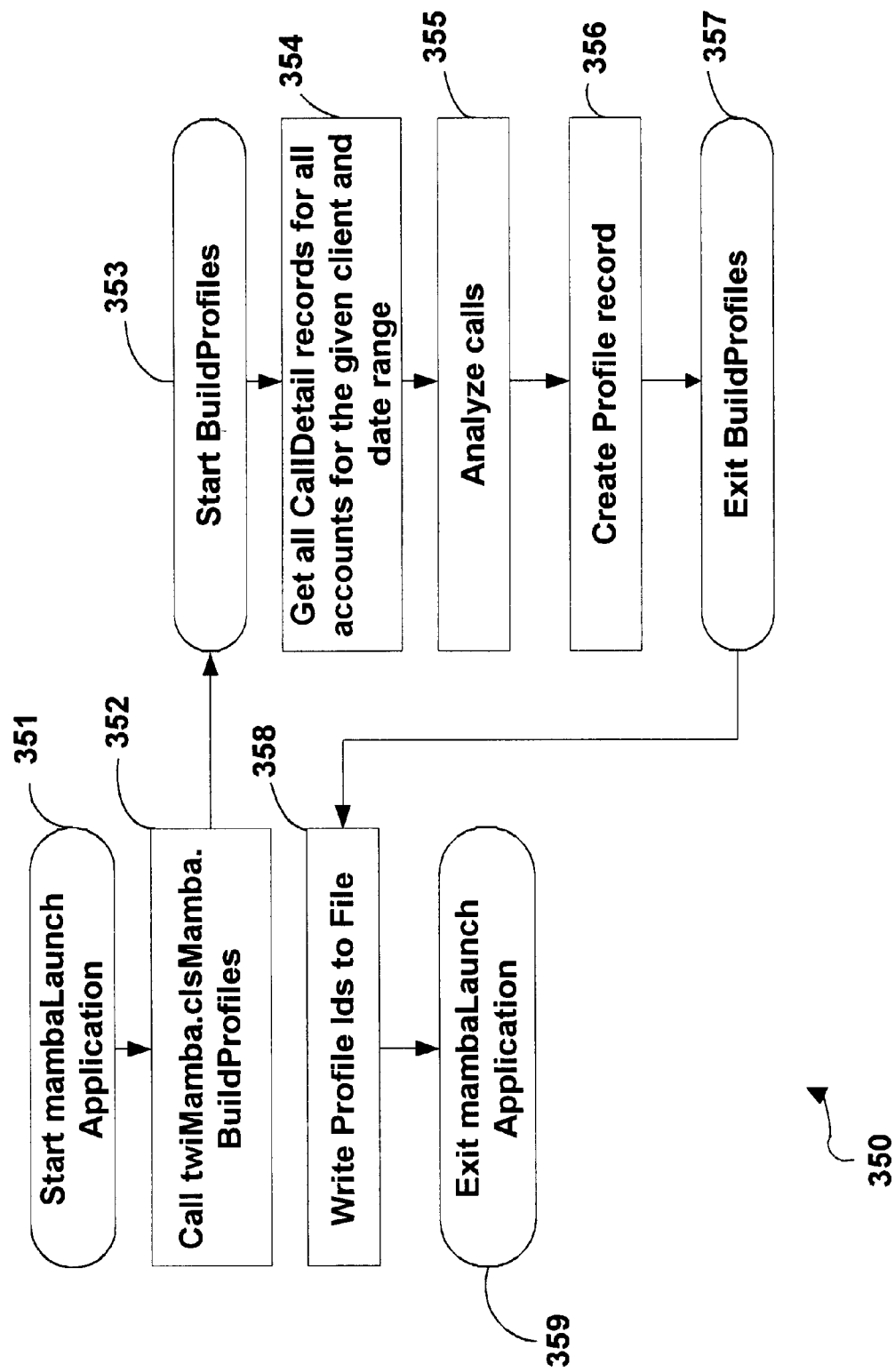
FIG. 8 is a flowchart illustrating the build profiles process of FIG. 5, which follows the dataLoader process of FIG. 7.

FIG. 8 depicts the operation of a buildProfile process 350. As shown by block 351, a MAMBALaunch application is started either manually or based upon a trigger event such as those mentioned above. As shown by block 352, the buildProfile process 350 calls a "TwiMAMBA.clsMAMBA.Build Profiles" function. As shown by block 353, the buildProfile process 350 is then started. As shown by block 354, the process gets "callDetail" records for the accounts for the given client and date range. As shown by block 355, the process analyzes the calls and, as shown in block 356, creates the profiles record. As shown by block 357, the program then exits the buildProfile process 350. The process then returns to the MAMBALaunch application and, as shown by block 358, executes a function write profile identifications to file. As shown by block 359, the buildProfile process 350 then exits MAMBALaunch Application.

Data "Bucketizing" Functions

The data "bucketizing" functions, previously mentioned with reference to the buildProfile process 350 portion of FIG. 5, guide the analyzing and classifying of the call detail data 340 for use in the MAMBA system 100 processes. These functions provide the data classification and reduction used to populate the calling_profile record 360 of the MAMBA system 100. This structure is organized according to three dimensions or parameters of a call, and are as follows:

1) "When":

time of day (ToD) and day of week (DoW). "When" parameters are used to determine when a call was made or received as determined by three (3) "buckets": peak, off peak or weekend. The service plan record of the service plan that a subscriber is currently using functions as the default ToD and DoW parameters.

The ToD/DoW parameters are as follows:

For the subscriber under consideration, if the call_date, dow_id (1–7 with each number corresponding to a fixed day of the week) is not between the weekend_start_dow and the weekend_end_dow, and was placed between weekday_peak_start and weekday_peak_end times, then the call is characterized as a "peak call."

For the subscriber under consideration, if the call_date, dow_id is not between the weekend_start_dow and the weekend_end_dow, and was not placed between weekday_peak_start and weekday_peak_end times, then the call is considered an "off-peak call."

If the call_date, dow_id equals the weekend_start_dow and was made between the after the weekday_peak_end time or if the call_date, dow_id is on the weekend_end_dow and was made between the before the weekday_peak_start time, or if the call_date, dow_id falls between the weekend_start_dow and the weekend_end_dow, then the call is considered a "weekend call."

2) "What":

Type of Call—local or toll. These parameters determine the type of call that was made/received as determined by three (3) "buckets": local, intrastate_toll and interstate_toll.

The local/toll parameters are as follows:

If called_city equals "incoming" or <null> or called_number equals <null> then the call is a "local call."

If the mobile_id_number lata_number (as derived from npa-nxx number combination)=destination_number lata_number, as derived from the npa-nxx number combination, then the call is considered to have been originated and terminated within the same Local Access Transport Area (LATA) and is therefore categorized as a "local call." As known by those skilled in the art, a npa-nxx is defined as the numbering plan area (NPA) and office code (Nxx) of an end user's telephone number.

If neither of the two parameters above is true, then the call is a "toll call."

If the mobile_id_number lata_number state (as derived from the npa-nxx number combination)=destination_number lata_number state, as derived from the npa-nxx number combination, then the call is considered to have originated and terminated within the same State and is therefore categorized as an "intrastate_toll call."

If none of the above parameters are applicable, then the call is an "interstate_toll call."

These tests may use a table that allows a local access transport area (LATA) number to be associated with an npa_nxx. The LATA (npa_xxx) information also contains city and state information. A Local Exchange Routing Guide (LERG) table may also contain the information used.

3) "Where":

Where calls are made or received (home or non-home). These parameters determine where calls were made or received by the mobile end of the wireless communications connection represented by the call detail record under consideration. Several possible buckets may be defined according to different embodiments of the invention. By way of example, under one embodiment of a set of data "bucketizing" parameters, there may be the following six (6) possible buckets defined: home_zip, corp_zip, alt1_zip, alt2_zip, alt3_zip, alt4_zip.

The Home/non-Home parameters are as follows:

If the originating_city equals <null> or the lata_number of the originating_city, originating_state pair=the lata_number of mobile_id_number (npa_nxx matching), then the call was made from the "Home" region and allocated to the home_zip_percentage. Otherwise, the call is allocated to either the corporate_zip_percentage or one of the alt_zip_percentage "buckets, depending upon the zip code associated with the the originating_city and according the the alt_zip_percentage rules previously defined.

The Optimator Process

Figure 9:
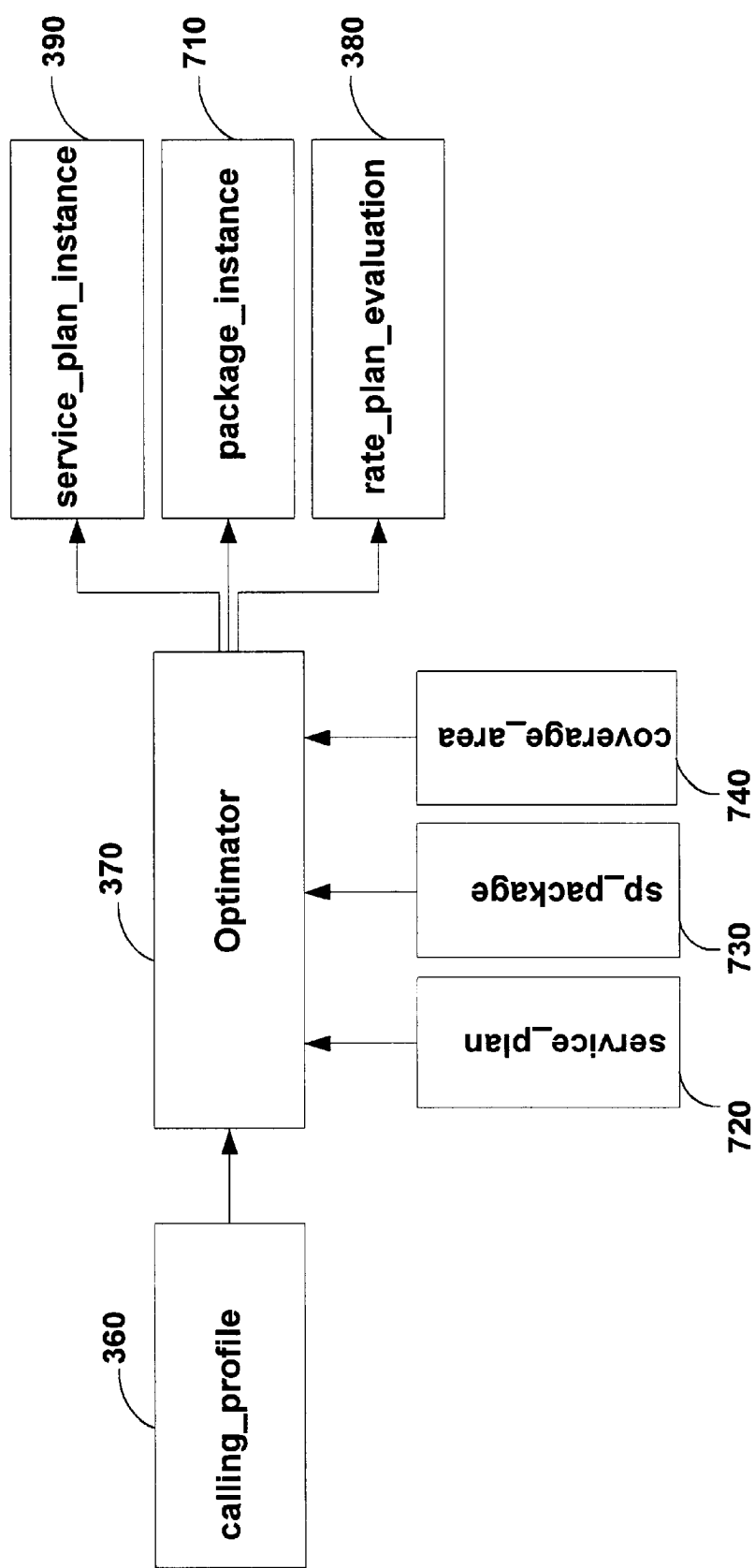
FIG. 9 is a flowchart illustrating the input and output of the optimator of FIG. 5, which follows the buildProfile process of FIG. 8.

FIG. 9 depicts the optimator process 370, and how it is implemented. The optimator process 370 uses the calling_profile record 360 for a given subscriber as input for the analysis of the usage patterns to provide recommendations for the most economical cellular service plans (see FIG. 7) for the specific billing period associated with that profile record. Further, the optimator process 370 receives as input the various service_plans 720, service_plan (sp) packages 730, and coverage_areas 740 that are offered by various carriers and that are associated with each sp_package 730. The optimator process 370 may return different numbers of recommendations per analysis. For example, in one implementation, the optimator process 370 returns up to three recommendations per analysis. The number of recommendations can be changed through an "instance variable."

The recommendations are created as records in the service_plan_instance 390 and package_instance tables 710. These records are linked to the associated account by a record in the rate_plan_evaluation table 380 which, in turn, is associated with the specific billing period associated with the calling_profile record. The optimator process 370 returns the identification of this new record.

Operation for Creating Rate Plan Evaluations

Figure 10:
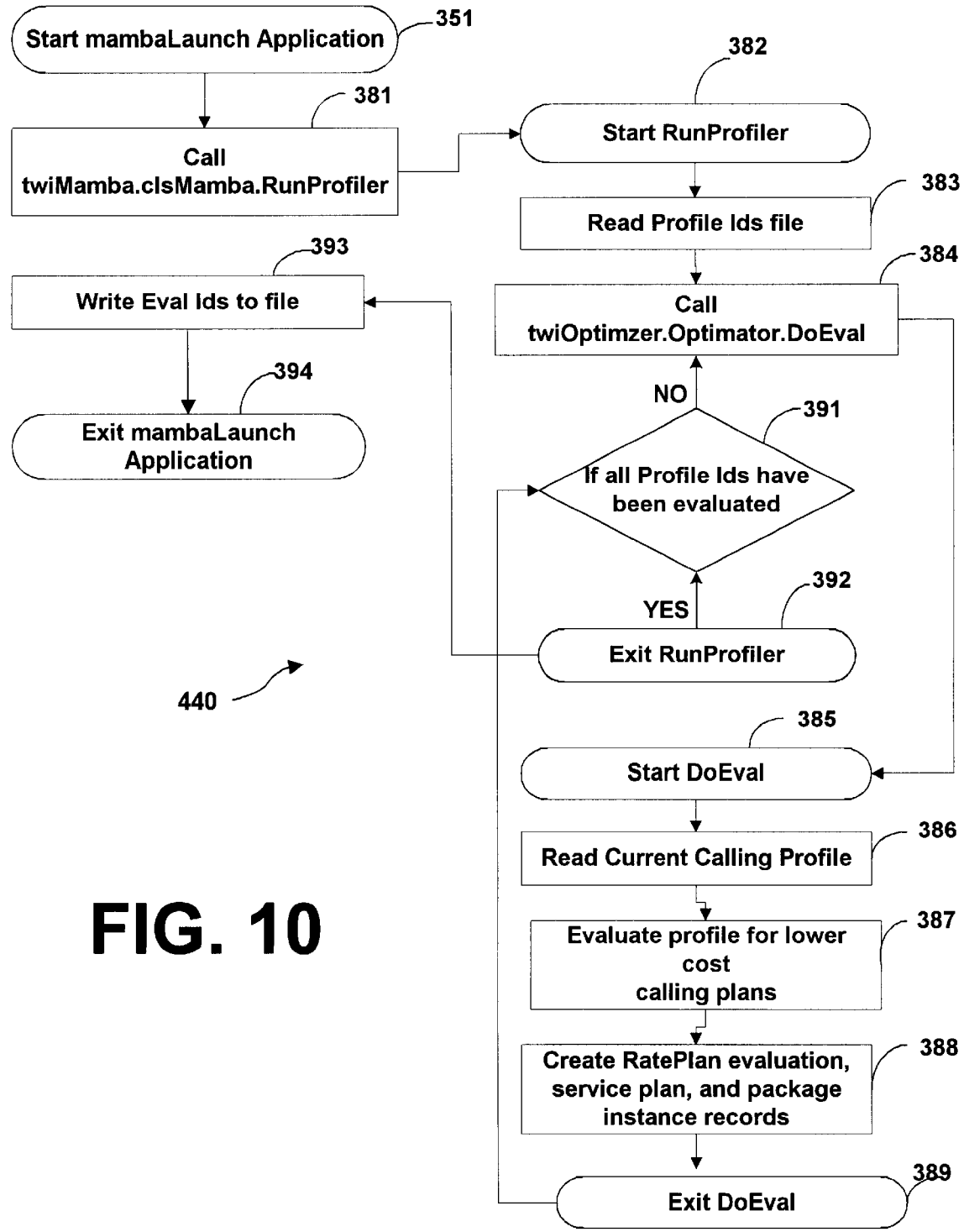
FIG. 10 is a flowchart illustrating the process of creating rate plan evaluations of FIG. 5, which follows the optimator processes of FIG. 9.

FIG. 10 depicts the operation for the process of creating rate plan evaluations 440. Block 351 depicts the step of starting the MAMBALaunch Application. As shown by block 381, a "TwiMAMBA.clsMAMBA.Run Profiler" process is called. As shown by block 382, a "runProfiler" process is started. As shown by block 383, the profile identification files created in block 358 of FIG. 8 are then read. As shown by block 384, a program "TwiOptimzer.Optimator.DoEval" is called. As shown by block 385, a "doEval" process is started. As shown by block 386, the current calling profile is read. As shown by block 387, the profile for the lower cost calling plans are then evaluated. As shown by block 388, the rate_plan_evaluation 380, service plan 390 and package instance 710 records are created. As shown by block 389, the doEval process is then exited. As shown by block 391, the runProfiler process makes the decision as to whether all profile identifications have been evaluated. If the answer is "no", the program returns to block 384, in which TwiOptimzer.Optimator.DoEval function is again called and the program continues through each step again until block 391 is reached again. If the answer is "yes" in block 391, the runProfiler process is exited, as shown in block 392. The MAMBAlaunch application then writes the eval identifications (Ids) to the file, as shown in block 393. Then as shown by block 394, the MAMBAlaunch application is exited.

Averaging Profiles

Figure 11:
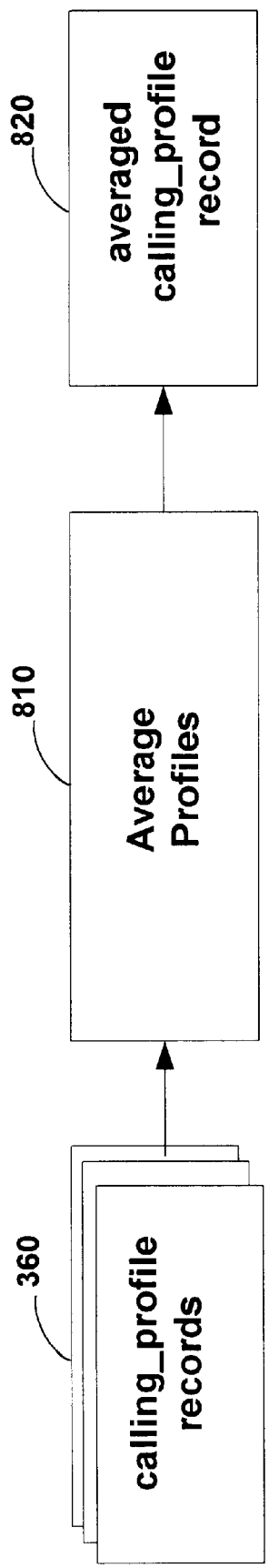
FIG. 11 is a flowchart illustrating the process of averaging profiles of FIG. 5, and how it is implemented.

FIG. 11 depicts the process of averaging profiles 810 and how it is implemented. The MAMBA system 100 allows the user to obtain a moving average 820 of the calling totals assigned to any calling profile records 360 that have a billing date within a given date range. This average 820 provides the user with a snapshot of cellular service use within a given period.

AvgProfilesByClient and avgProfilesByAccount (see "The MAMBA Component") methods (FIGS. 39 and 40) allow the user to average the calling profiles by either client or individual account. These methods create a calling profile record 820 that contains the average of usage for the calling profiles 360 created during the given period, and then return the identification of the new record.

The decidePlan Process

Returning to FIG. 5, the optimator process 370 output, specifically a variable number of service_plan_instances 390, reflects the lowest cost options based upon the calling profile analyzed. As such, the optimator 370 results represent a single point-in-time period, for example, one month, for that particular user without taking into account any historical trending information that might be available for that user. What is therefore needed but has been heretofore unaddressed in the art, is a methodology for using a series of single period optimator 370 results 390 to determine the optimal service plan for that user over an appropriate period of time, as depicted in FIG. 5. The decidePlan process 400 leverages available chronological information to assist in the determination of what service plan would be optimal for a given wireless user.

The decidePlan process 400 is based upon what can best be described as a "historical prediction" algorithm. Given the fundamental complexity of determining the optimal service plan solution set, the application of a traditional trend-based predictive methodology, e.g., a linear or other form of extrapolation, is not practical. Rather, the decidePlan process 400 leverages the "hindsight" intrinsic to a series of historical single period optimator 370 analyses in order to predict the optimal solution looking forward.

The decidePlan process 400 takes advantage of the "reactive system" type of behavior that is inherent in the analysis or decision process for selecting the optimal plan for a given subscriber. Specifically, the decision engine 400 calculates the total cost for a given set of optimator 370 generated service_plan_instances 390 over a known set of historical periods. The decidePlan process 400 then compares this total cost to the optimator 370 results of the corresponding service_plan_instances 390 for the most recent single period available, and on that basis predicts the optimal service plan going forward.

The known set of historical optimator 370 results is referred to herein as the "training set," while the single most recent set of period results is referred to as the "test set", where the test set period can also be included as part of the training set. An optimal service plan solution is selected from the training set and then compared to the result of the test set to determine how well the training set would have predicted the test set result. In implementing the training and test set, the data set to execute the historical prediction analysis is preferably a minimum of two periods, two periods for the training set and one period for the test set, in order to execute the historical prediction.

The relative attractiveness of a service plan instance 390 is determined by comparing it to the corresponding actual billed usage of the current service plan for the given period (s). The specific measure, termed "efficiency", is calculated as the following ratio:

efficiency=current plan costs/service plan instance estimated cost

If the efficiency factor is greater than 1, then the service plan instance is more cost effective than the current plan. Among a group of service plan instances, the plan instance with the highest efficiency factor is the optimal solution.

Implementation of the historical prediction analytic and decisionmaking model is best demonstrated by way of example. Table 6 shows an exemplary two period set of optimator 370 results for a single subscriber.

TABLE 6

Example of Historical Prediction Model for a Two Period Set of Results

| | | Training Set Month 1 | Efficiency (Current/ Plan X) | Test Set Month 2 | Efficiency (Current/ Plan X) |
|---|---|---|---|---|---|
| | Calling Profile MOUs | 200 | | 250 | |
| PLANS | | | | | |
| | A | $50 | 1.38 | $50 | 1.38 |
| | B | $65 | 1.06 | $65 | 1.06 |
| | C | $40 | 1.73 | $45* | 1.53* |
| | D | $60 | 1.15 | $60 | 1.15 |
| | E | $30* | 2.30* | $45 | 1.53* |
| | Current | $69 | 1.00 | $69 | 1.00 |

Where * indicates the lowest cost plan option

Based upon this minimum two period data set, the training set predicts plan E as the optimal choice, a selection confirmed by the corresponding results for the test set (Month 2).

The larger the data set, where larger is measured by the number of periods of service plan instance results available for the training set, the better the forward looking "prediction" will likely be. Table 7 shows the same two period data set presented earlier in Table 6, extended by an additional four periods, for a total of six periods, with five applied to the training set and one to the test set.

the analysis as it reflects the more recent behavior of the user. Thus, the use of a weighting strategy which gives greater relevance to more current, fresher data as compared to the older, more stale data, improves the predictive results. Optionally, the weighing strategy can be added to the decidePlan process if needed to provide such increase relevance to more recent data.

There are a number of possible weighting functions that can be applied. One possible weighting function would be an exponential envelope of the type:

$$\text{weighting factor} = n + e^{(1-Period)} \text{ where } n >= 0$$

TABLE 7

Example of Historical Prediction Model for a Six Period Set of Results

|  |  | Training Set ||||| | Training |||
|---|---|---|---|---|---|---|---|---|---|---|
|  |  | Mon 1 | Mon 2 | Mon 3 | Mon 4 | Mon 5 | Sum 1–5 | Set efficiency | Mon 6 | Mon 6 Efficiency |
|  | Calling Profile MOUs | 200 | 250 | 300 | 260 | 310 |  |  | 225 |  |
| Plans | A | $50 | $50 | $60 | $60 | $62 | $282 | 1.22 | $50 | 1.38 |
|  | B | $65 | $65 | $65 | $65 | $65 | $325 | 1.06 | $65 | 1.06 |
|  | C | $40 | $45 | $50 | $46 | $52 | $233* | 1.48* | $42 | 1.64 |
|  | D | $60 | $60 | $60 | $60 | $62 | $302 | 1.14 | $60 | 1.15 |
|  | E | $30 | $45 | $60 | $48 | $62 | $245 | 1.41 | $37* | 1.86* |
|  | Current | $69 | $69 | $69 | $69 | $69 | $345 | 1.00 | $69 | 1.00 |

Where * indicates the lowest cost plan option

In this case, use of only the most recent period's, month 6, optimator 370 output would have resulted in the selection of plan E as the optimal service plan option for this user or account. However, applying the historical prediction analysis, the total of 1–5 ranked by efficiency factor, the optimator 370 output indicates that plan C would be optimal choice for this user. Although plan E would have been the best option in for the most recent period, month 6, when the variability of this subscriber's usage profile is taken into account over the available six period data set, plan C would have been selected as the superior solution.

Figure 13:
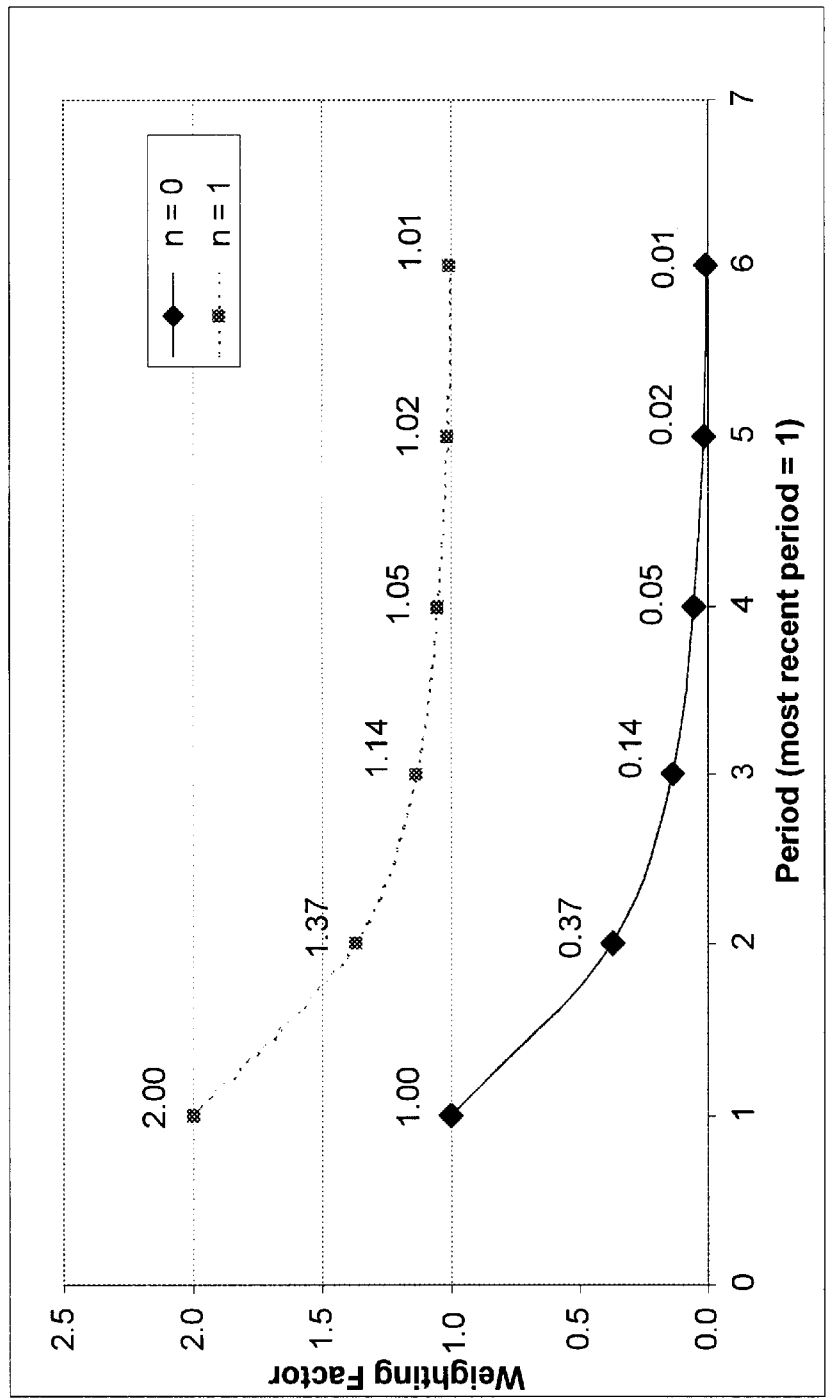
FIG. 13 is a graph plotting period versus weighting factor, for n=0, n=0.5, n=1, n=2, for the output data of the decidePlan process of FIG. 12.

The above analysis assumes that the data in the test set has equal "value" in the analysis. In reality, the more recent the data set, or the "fresher" the data, the more relevant it is to The weighting functions for n=0, n=0.5, n=1 and n=2 are plotted in FIG. 13. Data that is four periods old is weighted as 14% of that of the most recent month. The n=0 function more aggressively discounts older data than does the n=1 function, where the same four period back data is weighted at a level about one-half that of the most recent period data set.

Applying these two versions of exponential weighting envelopes to the previous six periods of training and test data sets generates the result set shown in Table 8, with the original "equal weighting" results shown as well for reference.

TABLE 8

Results of Table 7 Data After Applying the Weighting Factor

|  |  | Training Set ||||| | Training |||
|---|---|---|---|---|---|---|---|---|---|---|
|  |  | Mon 1 | Mon 2 | Mon 3 | Mon 4 | Mon 5 | Sum 1–5 | Set efficiency | Mon 6 | Mon 6 Efficiency |
|  | Calling Profile MOUs | 200 | 250 | 300 | 260 | 310 |  |  | 225 |  |
| PLANS | A | $50 | $50 | $60 | $60 | $62 | $282 | 1.22 | $50 | 1.38 |
|  | B | $65 | $65 | $65 | $65 | $65 | $325 | 1.06 | $65 | 1.06 |
|  | C | $40 | $45 | $50 | $46 | $52 | $233* | 1.48 | $42 | 1.64 |
|  | D | $60 | $60 | $60 | $60 | $62 | $302 | 1.14 | $60 | 1.15 |
|  | E | $30 | $45 | $60 | $48 | $62 | $245 | 1.41 | $37* | 1.86* |
|  | Current | $69 | $69 | $69 | $69 | $69 | $345 | 1.00 | $69 | 1.00 |

TABLE 8-continued

Results of Table 7 Data After Applying the Weighting Factor

|  | Weighting Factor n = 1 | 1.02 | 1.05 | 1.14 | 1.37 | 2.00 | Sum 1–5 | Training Set efficiency | Mon 6 | Mon 6 Efficiency |
|---|---|---|---|---|---|---|---|---|---|---|
| PLANS | A | $51 | $53 | $68 | $82 | $124 | $378 | 1.20 | $50 | 1.38 |
|  | B | $66 | $68 | $74 | $89 | $130 | $428 | 1.06 | $65 | 1.06 |
|  | C | $41 | $47 | $57 | $63 | $104 | $312* | 1.46* | $42 | 1.64 |
|  | D | $61 | $63 | $68 | $82 | $124 | $399 | 1.14 | $60 | 1.15 |
|  | E | $31 | $47 | $68 | $66 | $124 | $336 | 1.35 | $37* | 1.86* |
|  | Current | $70 | $72 | $79 | $95 | $138 | $454 | 1.00 | $69 | 1.00 |

|  | Weighting Factor n = 0 | 0.02 | 0.05 | 0.14 | 0.37 | 1.00 | Sum 1–5 | Training Set efficiency | Mon 6 | Mon 6 Efficiency |
|---|---|---|---|---|---|---|---|---|---|---|
| PLANS | A | $1 | $3 | $8 | $22 | $62 | $96 | 1.13 | $50 | 1.38 |
|  | B | $1 | $3 | $9 | $24 | $65 | $103 | 1.06 | $65 | 1.06 |
|  | C | $1 | $2 | $7 | $17 | $52 | $79 | 1.38* | $42 | 1.64 |
|  | D | $1 | $3 | $8 | $22 | $62 | $97 | 1.13 | $60 | 1.15 |
|  | E | $1 | $2 | $8 | $18 | $62 | $91 | 1.20 | $37* | 1.86* |
|  | Current | $1 | $3 | $10 | $26 | $69 | $109 | 1.00 | $69 | 1.00 |

Where * indicates the lowest cost plan option

Although the result of the historical prediction analysis in this specific scenario does not change per se as a result of applying either weighting scheme to the training set, where both the n=1 and n=0 weightings identify Plan C as the optimal plan, the application of these two weighting envelopes do have the effect of increasing the "spread" between the efficiency factor of the optimal plan, plan C, as compared to the next best solution, plan E. This is compared against the actual cost because the weighting function that more heavily favors recent or fresher data, i.e., the n=0 exponential decay envelope, provides a greater efficiency spread (1.38–1.20, or 0.18) compared to the n=1 weighting function that less aggressively discounts older or more "stale" data (1.46–1.35 or 0.11).

The methodology, historical prediction with time-based weighting, described thus far does not take into account the intrinsic period-to-period variability in the user or account's behavior. One way this variability is reflected is by the user's usage of the account, as measured by the minutes of wireless service use on a period-by-period basis. By measuring the standard deviation in a usage set for the user or account, and comparing it to per period usage data, the suitability of the data set for each period can be assessed relative to the total available array of periodic data sets. In particular, a significant "discontinuity" in a usage pattern of a user or account, for example, as a result of an extraordinary but temporary amount of business travel, especially if such a spike occurs in a current or near-current data period, could skew the results of the analysis and provide a less-than-optimal service plan solution or recommendation on a going-forward basis.

To appreciate the potential impact of period-to-period deviations, consider for example two calling profiles arrays: one for the baseline data set that has been examined thus far, and another for a more variable data set. These two data sets, their average and standard deviations and the deviations of the usage profile of each period to the average, are shown in Table 9.

TABLE 9

Comparison of Baseline and Variable Data Sets

|  | Training Set | | | | | | | Test Set | | |
|---|---|---|---|---|---|---|---|---|---|---|
|  | Mon 1 | Mon 2 | Mon 3 | Mon 4 | Mon 5 | 1–5 Ave | 1–5 Std Dev | Mon 6 | 1–6 Ave | 1–6 Std Dev |
| Baseline Calling Profile MOUs | 200 | 250 | 300 | 260 | 310 | 264 | 43.9 | 225 | 258 | 42.4 |
| Ave.-X | 64 | 14 | 36 | 4 | 46 |  |  | 33 |  |  |
| >Std Dev | yes | no | no | no | yes |  |  | no |  |  |
| Second Calling Profile MOUs | 350 | 400 | 375 | 600 | 325 | 410 | 109.8 | 320 | 395 | 104.9 |
| Ave.-X | 60 | 10 | 35 | 190 | 85 |  |  | 75 |  |  |
| >Std Dev | no | no | no | yes | no |  |  | no |  |  |

Using one standard deviation unit (one sigma, or σ) as the "filter" to identify and exclude discontinuities in a sequence of calling profiles, results in months 1 and 5 of the baseline sequence, and month 4 of the second calling profile sequence, being excluded from the analysis.

Another parameter that can be factored into the decision process of the present invention of what service plan to select for a given user or account, based upon an array of calling profiles and optimator 370 service plan instance 390 inputs, is the sensitivity of the result set to changes in calling profile. Specifically, the service plan solution set, plans A–E in the example used up to this point, should be tested by perturbing the usage profile in a positive and negative fashion by a fixed usage amount, for example, one σ. The results are shown in Table 10.

TABLE 10

Results of Perturbing the Usage Profile by One Sigma

|  |  | Sum Mon 1–5 (using n = 0 weighting) | Training Set efficiency | Ave/ Std Dev | Mon 6 | Mon 6 efficiency | +1 Sigma Cost | +1 Sigma eff. | −1 Sigma Cost | −1 Sigma eff. |
|---|---|---|---|---|---|---|---|---|---|---|
|  | Calling Profile MOUs |  |  | 264/ 43.9 | 225 |  | 269 |  | 181 |  |
| PLANS | A | $96 | 1.13 |  | $50 | 1.38 | $52 | 1.33 | $50 | 1.38 |
|  | B | $103 | 1.06 |  | $65 | 1.06 | $65 | 1.06 | $65 | 1.06 |
|  | C | $79 | 1.38* |  | $42 | 1.64 | $47 | 1.47* | $37 | 1.86 |
|  | D | $97 | 1.13 |  | $60 | 1.15 | $60 | 1.15 | $60 | 1.15 |
|  | E | $91 | 1.20 |  | $37 | 1.86* | $47 | 1.47* | $27 | 2.56* |
|  | Current | $109 | 1.00 |  | $69 | 1.00 | $69** | 1.00 | $69** | 1.00 |

Where * indicates the lowest cost plan option
** this sensitivity cannot be performed unless the current plan is known Based on the above "±one sigma" analysis, the optimal service plan option, minimizing the sensitivity of the decision to variations in usage both up and down, is plan E. Using only the upside variation results in the selection of plan C. Because there is less sensitivity to an upside in usage than a downside for many wireless service plans currently offered by the wireless service providers, either weighting the +1 analysis more heavily than the −1 analysis, or using only the +1 analysis results in the selection of plan C.

The implementation of the decision algorithms into the decidePlan process must allow for one of the following four (4) possible recommendations or actions:

1. The current plan is optimal; take no action.
2. There is a more optimal plan; if the savings is sufficient (efficiency>1.x) where x is the historical percentage savings, then change plans.
3. As a result of insufficient data, e.g., only one period of usable data is available, there is a >±1 Sigma variation in the most recent period's calling profile, etc.; therefore, take no action, and flag the reason why no action was taken.
4. Even though an optimal plan was identified, other parameters (e.g., a maximum period-to-period variance) were exceeded and therefore an accurate recommendation cannot be possible.

As with the dataLoad 320, buildProfile 350 and optimator 370 processes, decidePlan 400 can be implemented as a manual or automated process. The following inputs may be used to launch the decidePlan process 400. Please note that blank spaces indicate input variable numbers that are considered to be within the scope of the present invention.

1. Client Name
2. Account: active accounts (default) or _____ account file
3. Analysis Parameters
   a. Data window: available periods (default) or _____ periods
   b. Calling profile selection filter: yes/no (default no) within _____ Sigma
   c. Sensitivity analysis range: ±_____% or ±_____ Sigma
   d. Minimum savings filter: _____% (default 20%)

Figure 12:
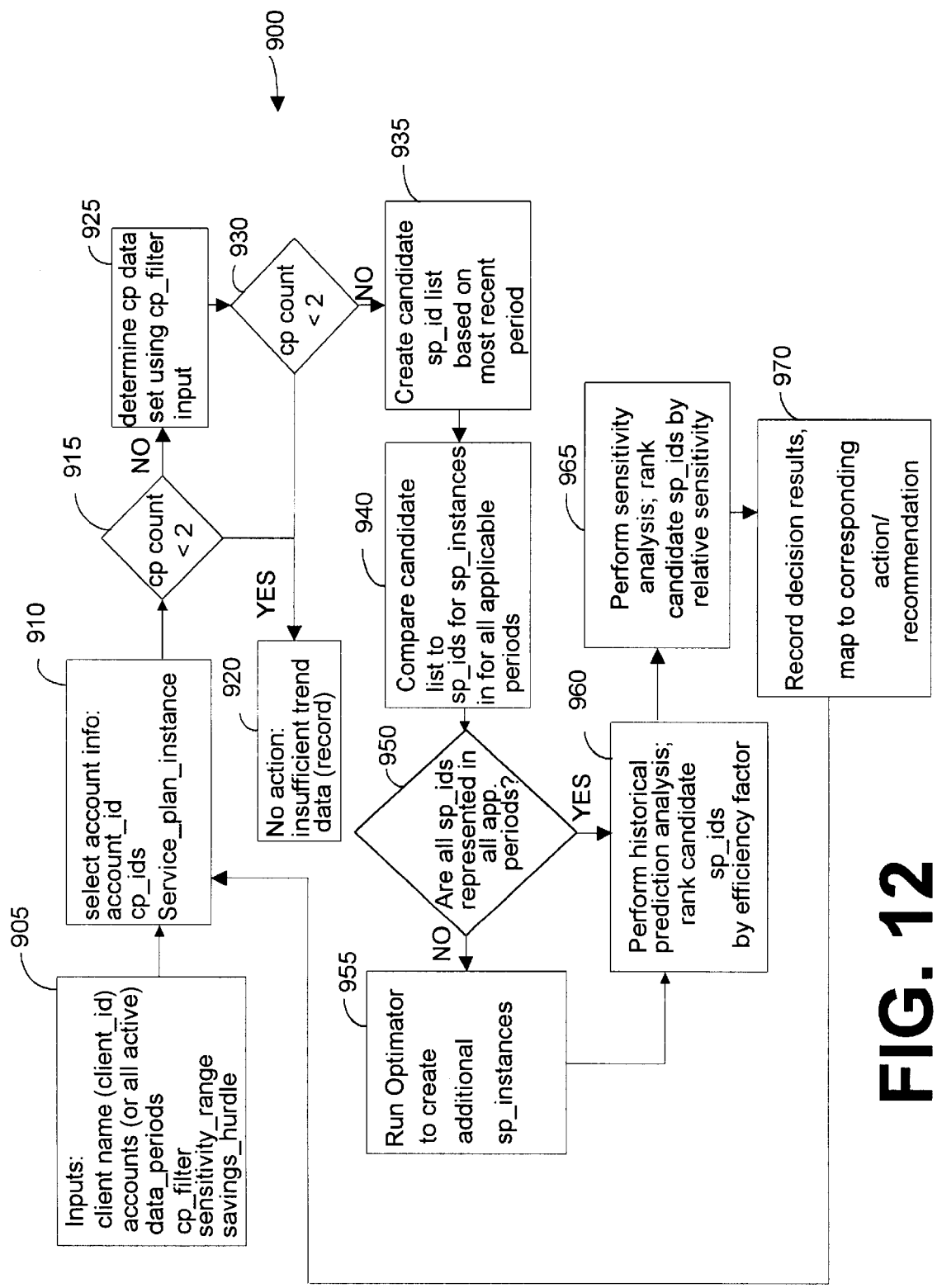
FIG. 12 is a flowchart illustrating the organization and sequence of steps that make up the decidePlan process of the decision engine of FIG. 5.

FIG. 12 shows the anticipated organization/sequence of steps of the decision process 900 that make up the decidePlan 400 process, which is described in detail herein below.

Presentation of Recommendations or Actions

If the MAMBA system 100 returns any recommendations for the given user, the MAMBA system 100 takes the user information and the information for the recommended cellular service plans and dynamically creates a report Web page that details this information. The HTML for this report Web page is stored in the database 74 for later display. Once the report Web page has been generated, the MAMBA system 100 sends an electronic mail message (email) to the specified user informing the user of the availability of more economical cellular service plans. This email may contain a hyperlink that will allow them to navigate to the stored HTML Web report. The HTML Web report page contains the information shown in Table 11. It should be noted that the presentation may also be made without use of the Web, but instead may be presented via any means of communication.

TABLE 11

Information contained in HTML Web Report

| Client Name | | Date Generated |
|---|---|---|
| Department ID | | |
| User Name | Current Plan Name (hyperlink) | Recommend Plan Name 1 (hyperlink) |
|  |  | Recommend Plan Name 2 (hyperlink) |
|  |  | Recommend Plan Name 3 (hyperlink) |

The user information is repeated for all requested users or accounts. The hyperlinks allow the viewer to view the specific information for the given plan.

The MAMBA system 100 causes the creation of a table that contains the HTML code for the report Web page and an ID value that will be part of the hyperlink that is sent to the user. The MAMBA system 100 may also cause the fields in Table 12 to be added to the USER table.

TABLE 12

Fields the MAMBA System May Add to USER Table

| Field Name | Data Type | Length |
|---|---|---|
| MAMBA | Varchar | 1 |
| MAMBAMailDate | DateTime | |
| MAMBAViewDate | DateTime | |
| MAMBAReviewUser | Varchar | 50 |
| MAMBAHTML | Text | 32765 |

The MAMBA field may contain either a "Y" or "N" to denote to which user to send the MAMBA email for a given account. The MAMBAMailDate may contain the date the email was sent to the specified user, and the MAMBAReviewDate may contain the date the MAMBA report Web page was viewed. Further, the MAMBAReviewUser field may contain the user name of the person who viewed the MAMBA report Web page. Also, the MAMBAHTML field may contain the HTML code for the Web report page.

The MAMBA Component

The MAMBA Component (twiMAMBA) may be configured to implement a number of different methods, a few of which are shown by example in Tables 13–16 for completing the preferred functionality. These methods are as follows:

TABLE 13

BuildProfile - Method that builds the calling_profile record

A. Parameters:

| Name | Type | Description |
|---|---|---|
| IclientID | Integer | client id to process |
| DloadStartDate | Date | first date to process |
| DloadEndDate | Date | last date to process |
| IprofileIds() | Integer array | returned array of created profile ids |
| InumZips | Integer | number of zip codes to process |

B. Returns

True - upon successful completion
False - upon failed completion

TABLE 14

RunProfiler - Method that launches the optimator process 370

A. Parameters:

| Name | Type | Description |
|---|---|---|
| iProfileIDs() | Integer array | array of profile ids - returned by buildProfile |
| dLoadStartDate | Date | returned array of evaluation ids |

B. Returns:

True - upon successful completion
False - upon failed completion

TABLE 15

AvgProfilesByClient - Method that takes a client name, a start and an end date, and then averages the usage totals for all profile records with a billing period between those dates and creates a new profile record.

A. Parameters:

| Name | Type | Description |
|---|---|---|
| SclientName | string | name of client to process |
| DstartDate | date | first date to process |
| DendDate | date | last date to process |
| IavgProfileIDs() | integer array | array of average profile ids - returned by buildProfile |

B. Returns:

True - upon successful completion
False - upon failed completion

TABLE 16

AvgProfilesByAccount - Method that takes an account ID, a start and an end date, and then averages the usage totals for all profile records with a billing period between those dates and creates a new profile record.

A. Parameters:

| Name | Type | Description |
|---|---|---|
| IAccountId | integer | account id |
| DStartDate | date | first date to process |
| DEndDate | date | last date to process |
| IAvgProfileIDs() | integer array | array of average profile ids - returned by buildProfile |

B. Returns:

True - upon successful completion
False - upon failed completion

FIG. 12 depicts the decision process 900 of the decidePlan process 400 (FIG. 5). The inputs of block 905, client_id, accounts, data_periods, cp_filter, sensitivity_range, and savings_hurdle, are directed to the select account info function of block 910. The select account info of 910 includes account_id, cp_ids, and service_plan_instances. Once the select account info 910 has been processed, the process proceeds to the decision block 915, where the decision is made if the cp count is less than 2. If "YES", the process proceeds to block 920, for no action because of insufficient data or records. If the decision of block 915 is "NO", the process proceeds to block 925 for the functions of determine cp data and set using cp_filter input. From block 925, the process moves to the decision block 930, where the decision is made if the cp count is less than 2. If "YES", the process again moves to block 920 for no action because of unsufficient trend data. If the decision of block 930 is "NO", the process proceeds to block 935 for the function of create candidate sp_id list based on most recent period. From the function of block 935, the process proceeds to block 940, for the function of compare candidate list to sp_ids for sp_instances in all applicable periods, based on cp list. From block 940, the process then proceeds to the decision block 950, where the decision is made, "are all sp_ids represented in all applicable periods?" If "NO", the process proceeds to block 955, for the function of run optimator 370 to create additional sp_instances. From the function of 955, the process then proceeds to the function of block 960, perform historical prediction analysis and rank candidate sp_ids by efficiency factor. If the decision of block 950 is "YES" (all sp_ids are represented in applicable periods), then the process proceeds directly to the function of block 960 of performing historical prediction analysis. After the historical prediction analysis of block 960 is complete, the process proceeds to block 965 for performing sensitivity analysis, and rank candidate sp_ds by relative sensitivity. Once the function of block 965 is complete, the process then moves to the final step of 970, for recording decision results, mapping to the corresponding action and/or recommendation.

The Application Related to MAMBA System

The following represents a detailed description of the logic of the system and method for analyzing the wireless communication records and for determining optimal wireless communication service plans.

Figure 14:
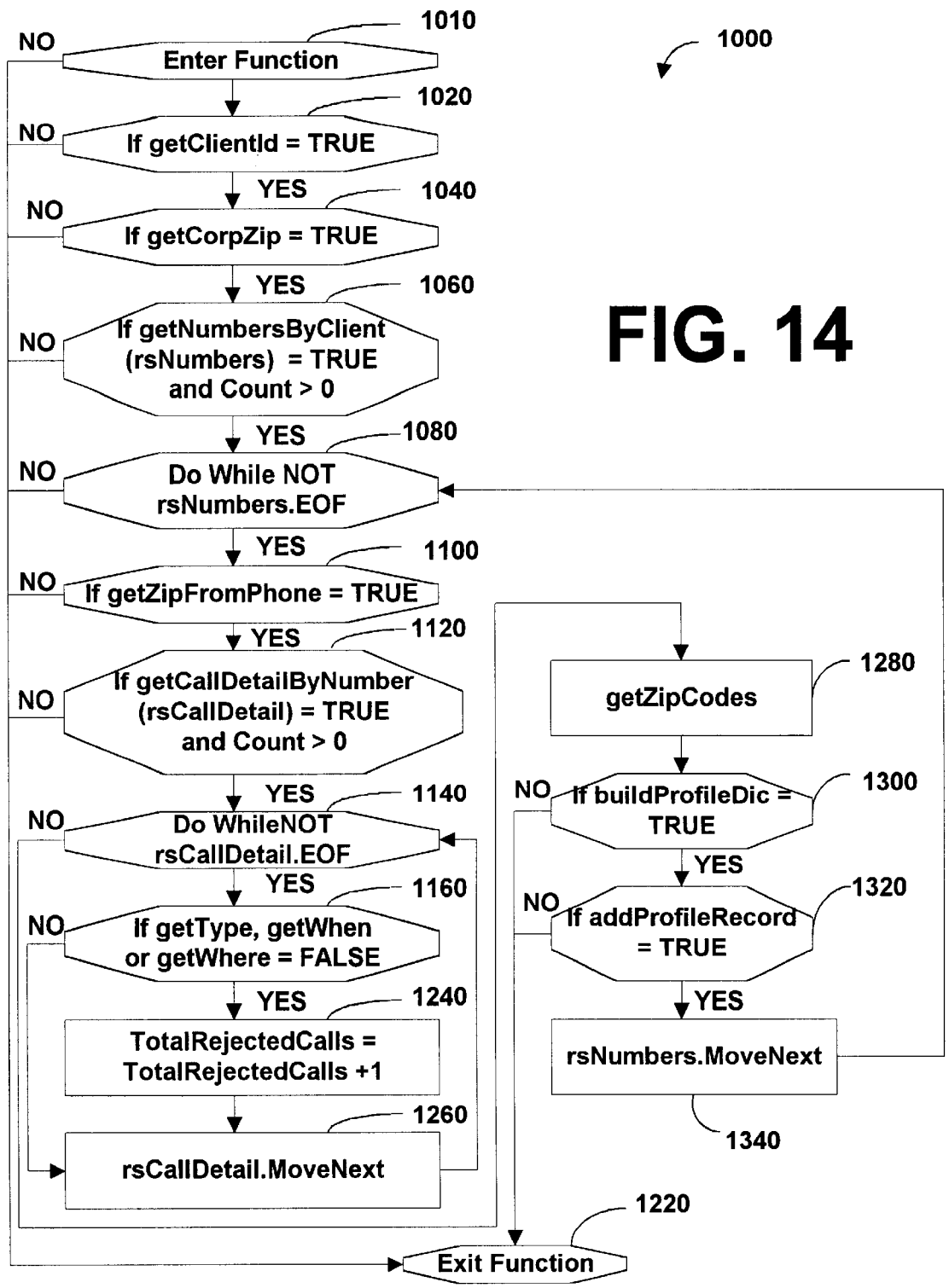
FIG. 14 is a flowchart illustrating the build profiles process of FIG. 8.

FIG. 14 depicts the operation 1000 of the buildProfile process 350. In block 1010, the process begins with the "Enter" function. In block 1020, a decision is made if getClientId is TRUE. If the answer is "NO", the process then goes to the Exit function, shown in block 1220. If the answer is "YES", then the process proceeds to block 1040. In block 1040, the decision is made if getCorpZip is TRUE. If not, the process proceeds to the Exit function 1220, if "YES", the process proceeds to block 1060, where the decision is made if getNumbersByClient (rsNumbers) is TRUE and the Count is greater than zero. If the answer is "NO", the process proceeds to the Exit function 1220. If "YES", the process proceeds to block 1080, where the decision is made to Do while NOT reNumbers.EOF. If the answer is "NO", the process goes to Exit function 1220. If "YES", the process proceeds to block 1100, where the decision is made if getZipFromPhone is TRUE. If "NO" the process proceeds to Exit function 1220. If "YES", the process proceeds to block 1120, where the decision is made if getCallDetailByNumber (rsCallDetail) is TRUE and the Count is greater than zero. If the answer is "NO", the process proceeds to the Exit function 1220. If "YES", the process proceeds to block 1140, where the decision is made to Do while NOT rsCallDetail.EOF. If the answer is "NO", the process proceeds to the getZipCodes function of block 1280. If the answer is "YES", the process proceeds to block 1160, where the decision is made if getType 1180, getWhen 1200, or getWhere 1221 are FALSE. If the answer is "NO", the process moves to the "rsCallDetail.MoveNext" function of block 1260. If "YES", the process moves to block 1240, where totalRejectedCalls is equal to total RejectedCalls+1. The process then proceeds to block 1260, where the function "rsCallDetail.MoveNext" is performed. Following this function, the system will again move to block 1140, Do while NOT rsCallDetail.EOF. This process is repeated until block 1140 is "NO", and the process proceeds to the getZipCodes function of block 1280.

The getZipCodes process of block 1280, then proceeds to a decision in block 1300 if buildProfileDic is TRUE. If "NO", the process goes to the Exit function of block 1220. If "YES", the process proceeds to block 1320 where a decision is made if addProfileRecord is TRUE. If "NO", the process proceeds to Exit function 1220. If "YES", the process proceeds to block 1340, the "rsNumbers.MoveNext" function. From here, the process then returns to the decision block 1080 of do while NOT rsNumbers.EOF.

Figure 15:
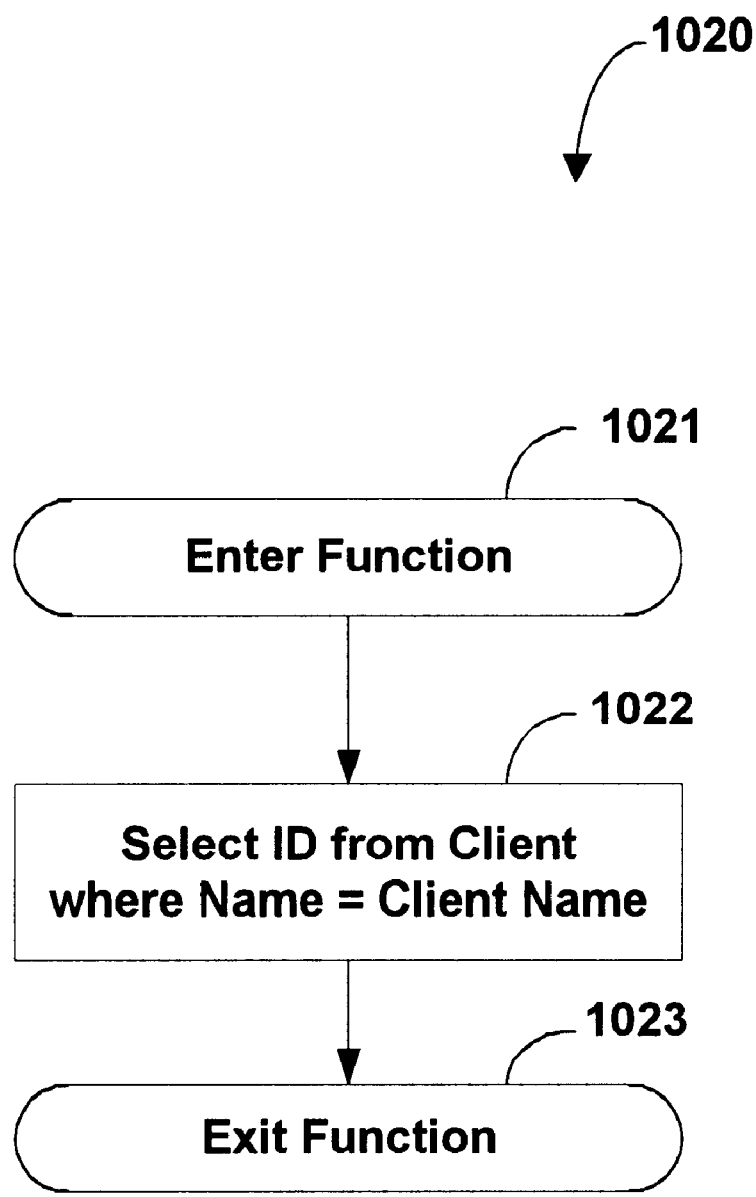
FIG. 15 is a flowchart illustrating the getClientId process of FIG. 14.

The getClientID process of block 1020 (FIG. 14) is depicted in FIG. 15. The process 1020 begins with block 1021, the Enter function, and continues to block 1022, the function of Select ID from client where name is equal to client name. The process ends in block 1023, the Exit function.

Figure 16:
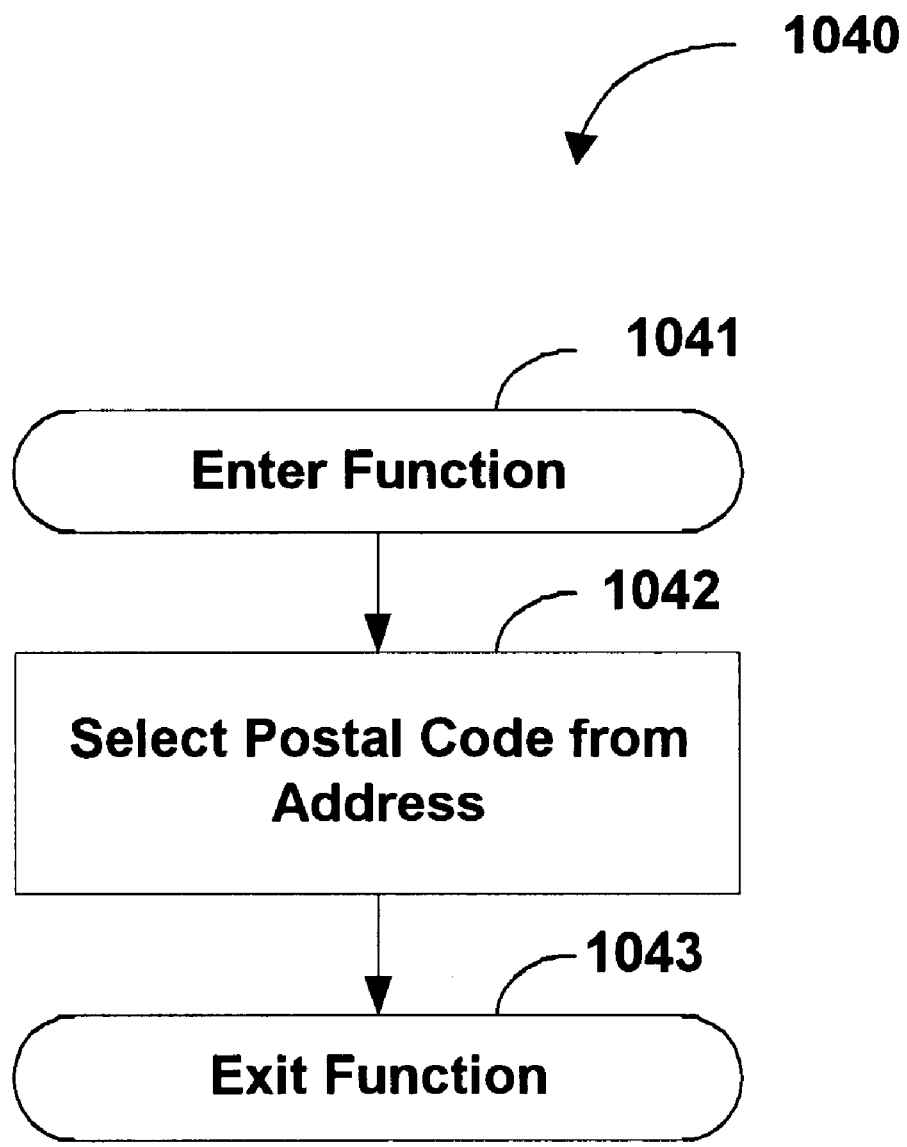
FIG. 16 is a flowchart illustrating the getCorpZip process of FIG. 14.

The getCorpZip process of block 1040 (FIG. 14) is depicted in FIG. 16. The process 1040 is entered in block 1041, and continues to block 1042, where the postal code is selected from the address. The process ends in block 1043, the Exit function.

Figure 17:
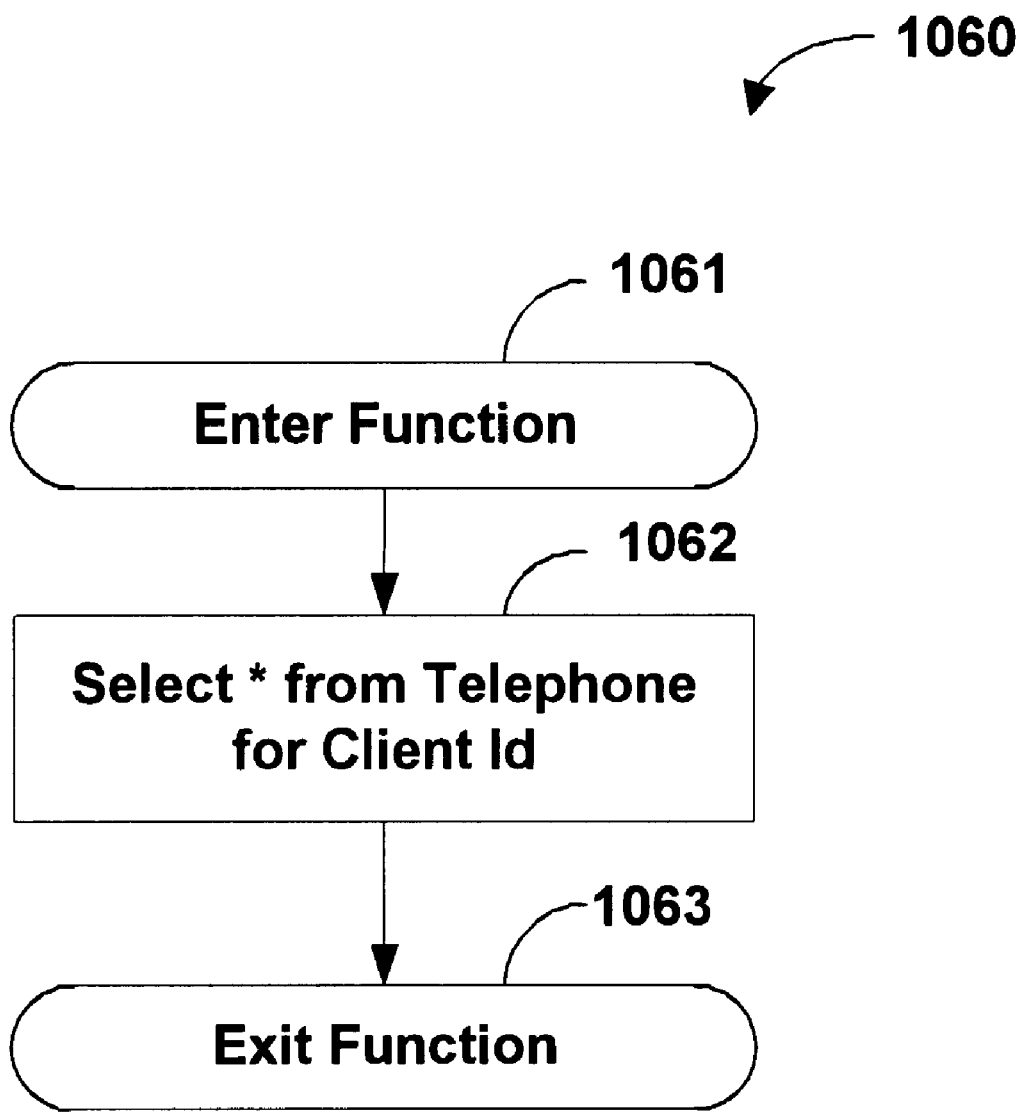
FIG. 17 is a flowchart illustrating the getNumbersByClient process of FIG. 14.

The getNumbersByClient process of block 1060 (FIG. 14) is detailed in FIG. 17. The process begins with block 1061, the Enter function, and continues in block 1062, the function Select * from Telephone for client Id. The process ends in block 1063, the Exit function.

Figure 18:
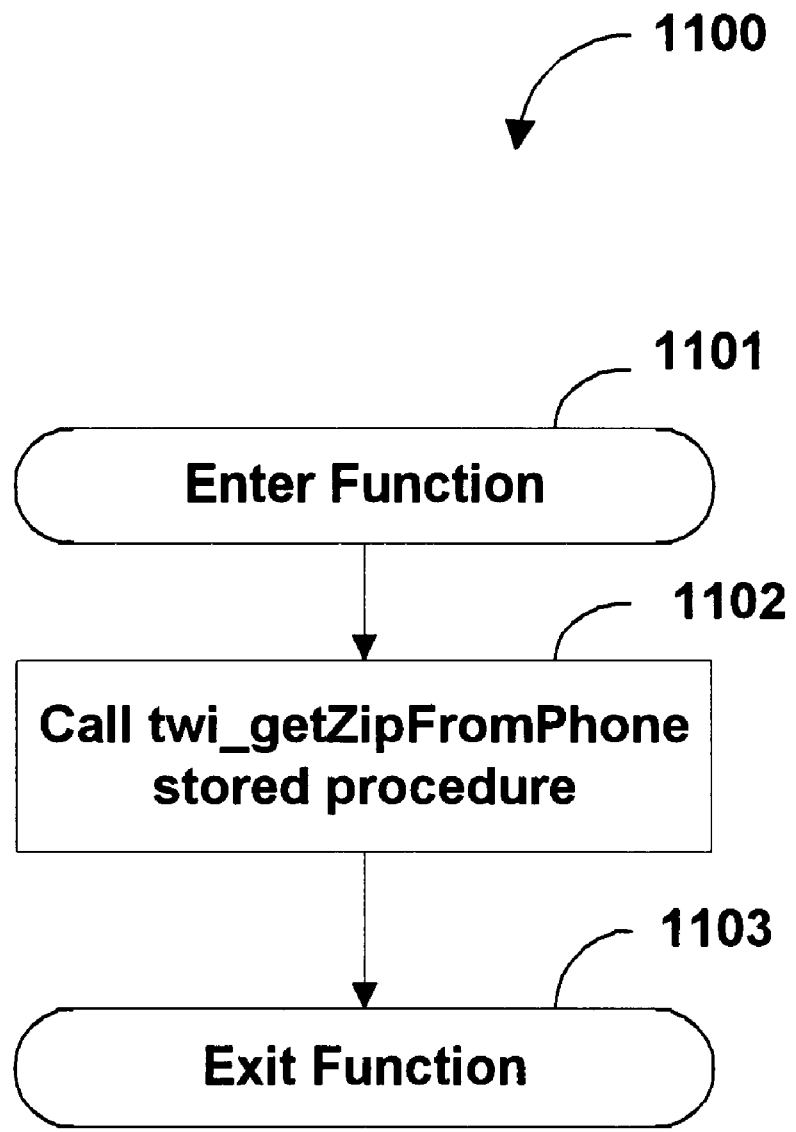
FIG. 18 is a flowchart illustrating the getZipFromPhone process of FIG. 14.

The getZipFromPhone process of block 1100 is detailed in FIG. 18. The process 1100 begins with block 1101, the Enter function, and continues to block 1102, the function call twi_getZipFromPhone stored procedure. The function ends in block 1103, the Exit function.

Figure 19:
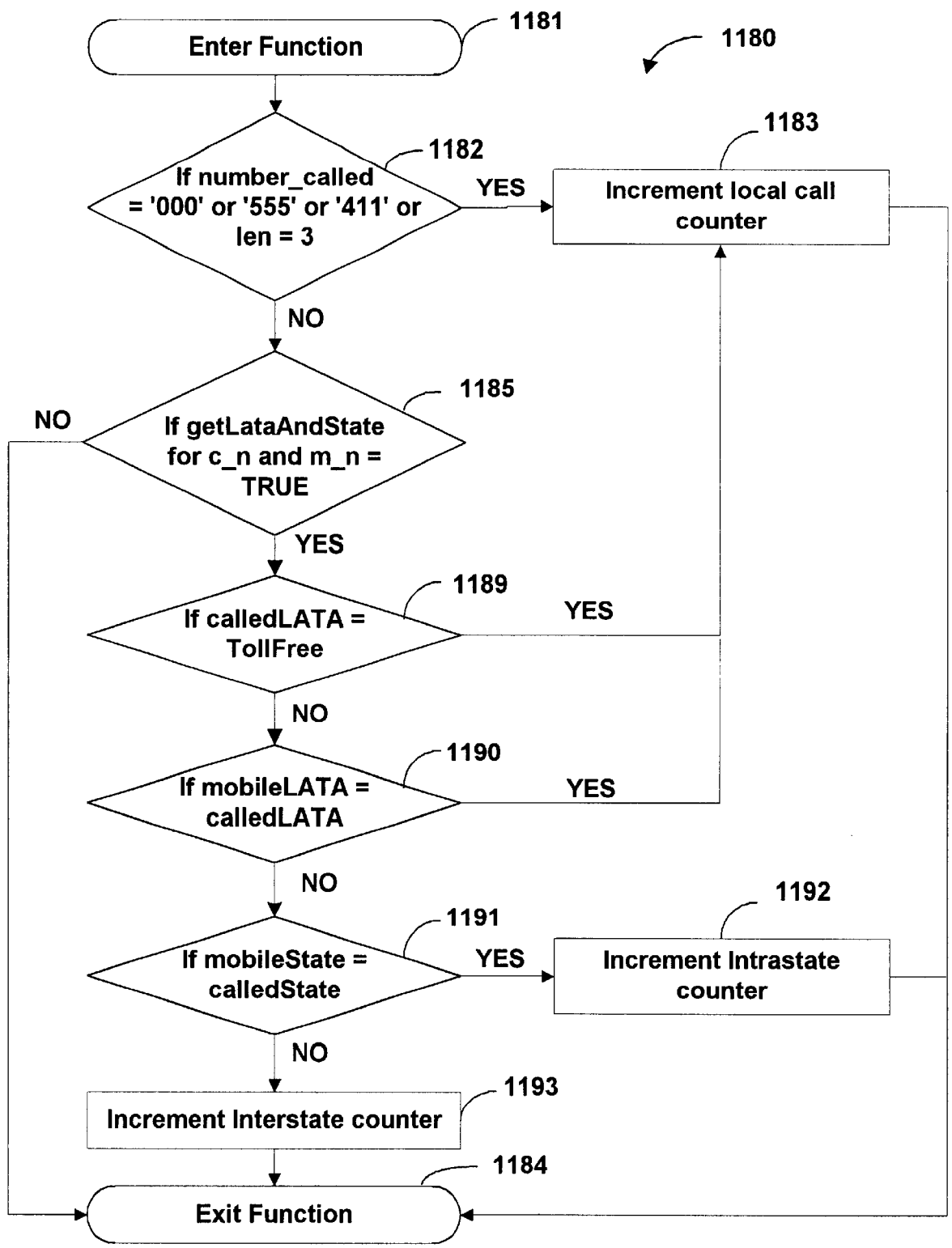
FIG. 19 is a flowchart illustrating the getType process of FIG. 14.

The getType process 1180 shown in block 1160 (FIG. 14) is detailed in the flowchart of FIG. 19. The process begins in block 1181, the Enter function, and continues in block 1182, where the decision is made if number_called is equal to '000' or '555' or '411' or len equals 3. If the answer of decision block 1182 is "YES", the process moves to the Increment local call counter of block 1183, and then exits the process in block 1184. If the decision of block 1182 is "NO", the process moves to the decision block 1185. In block 1185, the decision is made if getLataAndState for called_number and mobile_number is TRUE. If the answer is "NO", the process moves to the Exit function block 1184. If "YES", the process moves to the decision block 1189, where the decision is made if calledLATA is TollFree. If the answer is "YES", the process proceeds to block 1183, for an Increment of local call counter. If the answer of decision block 1189 is "NO", the process proceeds to the decision block 1190, where the decision If mobileLATA is equal to calledLATA. If the decision of block 1190 is "YES", the process proceeds to the Increment local call counter block 1183, and then the Exit function of block 1184. If the decision of block 1190 is "NO", the process proceeds to the decision block 1191, where the decision is made if mobileState is equal to the calledState. If the answer of decision block 1191 is "YES", the process proceeds to block 1192 for the Increment Intrastate counter, and then to the Exit function of block 1184. If the decision of block 1191 is "NO", the process proceeds to the Increment Interstate counter of block 1193, and then to the Exit function of block 1184.

Figure 20:
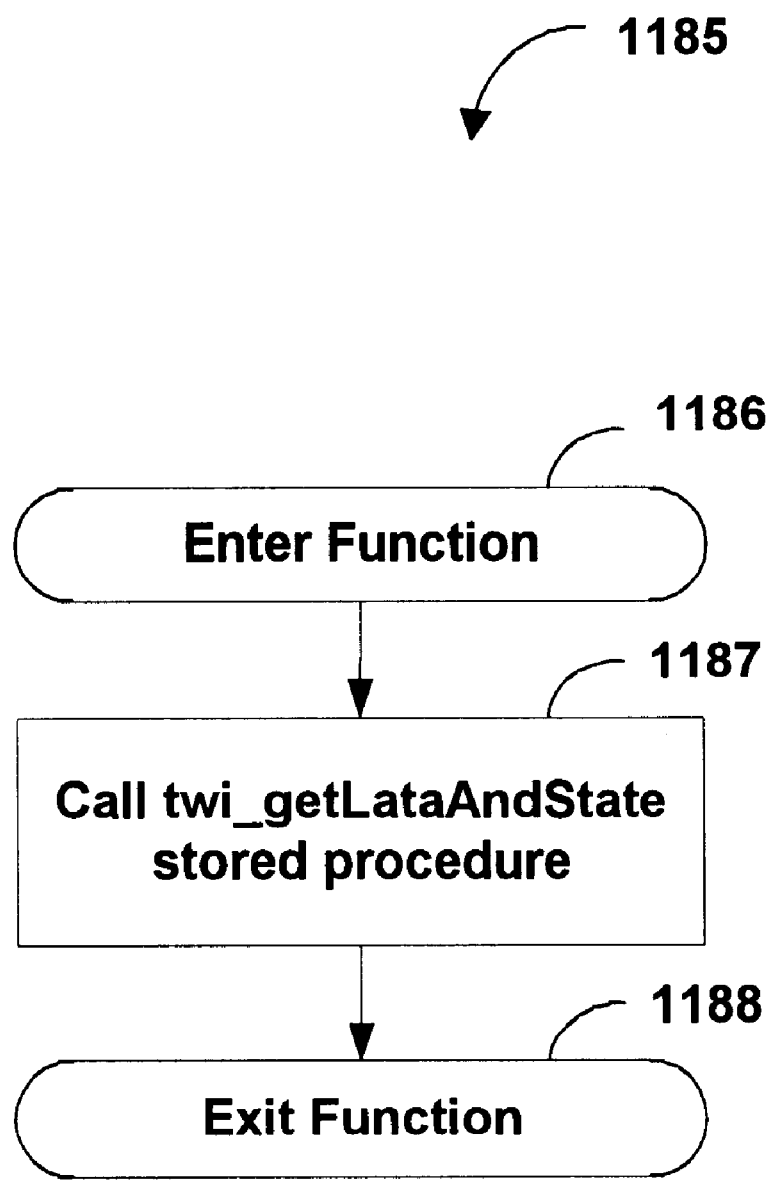
FIG. 20 is a flowchart illustrating the getLataAndState process of FIG. 19.

The getLataAndState function of block 1185 (FIG. 19) is detailed in the flowchart of FIG. 20. In FIG. 20, the process begins in the Enter function in block 1186, and continues to block 1187, the function call twi_getLataAndState store procedure. Then, the process is exited in block 1188.

Figure 21:
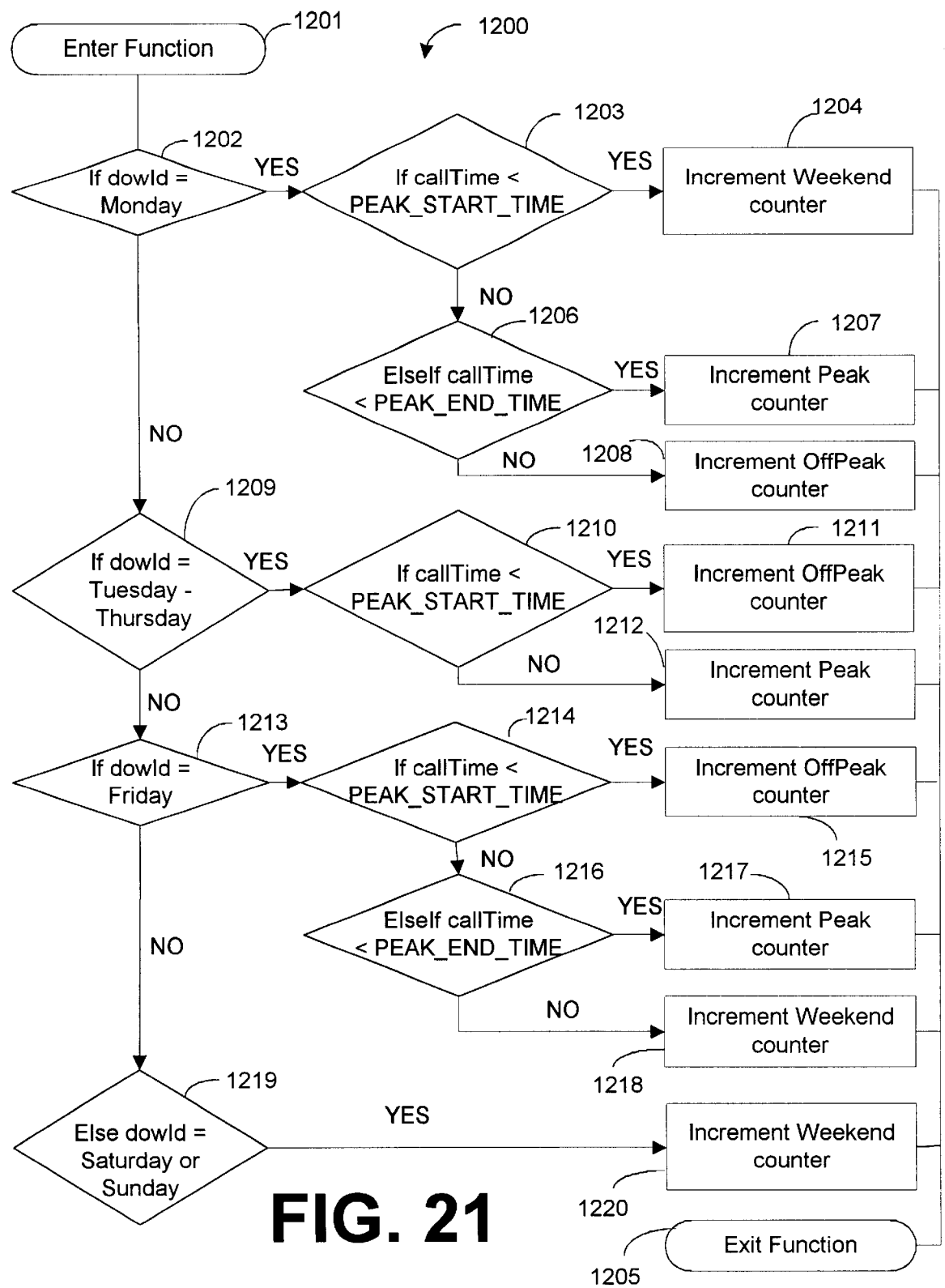
FIG. 21 is a flowchart illustrating the getWhen process of FIG. 14.

The getWhen function 1200 depicted in block 1160 (FIG. 14) is depicted in the flowchart of FIG. 21. The process is entered in block 1201, and proceeds to the decision block 1202, if dowId is Monday. If the answer is "YES", the process proceeds to the decision block 1203, where the decision is made if the callTime is less than peak_start_time. If the answer of decision block 1203 is "YES", the block 1204 Increment Weekend counter is signaled, followed by the Exit function 1205. If the answer is "NO" to decision block 1203, the process proceeds to the decision block 1206, where the decision is made if ElseIf callTime is less than peak_end_time. If the answer is "YES", the process proceeds to block 1207 where the Increment Peak counter is signaled, and then the process proceeds to the Exit function 1205. If the decision is "NO" in decision block 1206, the process proceeds to block 1208, for the Increment OffPeak counter, and then proceeds to the Exit function of block 1205. If the decision of block 1202 is "NO" (dowId does not equal Monday), then the process proceeds to decision block 1209, where the decision is made if dowId is equal to Tuesday-Thursday. If the answer is "YES", the process proceeds to decision block 1210, where the decision is made if the callTime is less than the peak_start_time. If the answer to decision block 1210 is "YES", the process proceeds to block 1210, the Increment OffPeak counter, and then to Exit function of block 1205. If the decision of block 1210 is "NO", the process proceeds to block 1212, the increment peak counter, and then to the Exit function of block 1205. If the decision to block 1209 is "NO" (dowId is not equal to Tuesday-Thursday), then the process proceeds to decision block 1213, where the decision is made if the dowId is equal to Friday. If the decision is "YES", the process proceeds to the decision block 1214, where the decision is made if callTime is less than peak_start_time. If "YES", the callTime is less than the peak_start_time, then the process proceeds to block 1215, the increment offpeak counter, and then to the Exit function 1205. If the answer to decision block 1214 is "NO", the process proceeds to decision block 1216, and the decision is made if ElseIf callTime is less than peak_end_time. If the answer is "YES", the process proceeds to the increment peak counter of block 1217, and then to the Exit function of block 1205. If the decision of block 1216 is "NO", the process proceeds to block 1218, the increment weekend counter, and then to the Exit function of block 1205. If the decision of block 1213 is "NO" (the dowId does not equal Friday), then the process proceeds to the decision block 1219, where the decision is made if Else dowId is equal to Saturday or Sunday. The decision of block 1219 is necessarily "YES", wherein the process proceeds to block 1220, the Increment Weekend counter, and then to the Exit function 1205.

Figure 22:
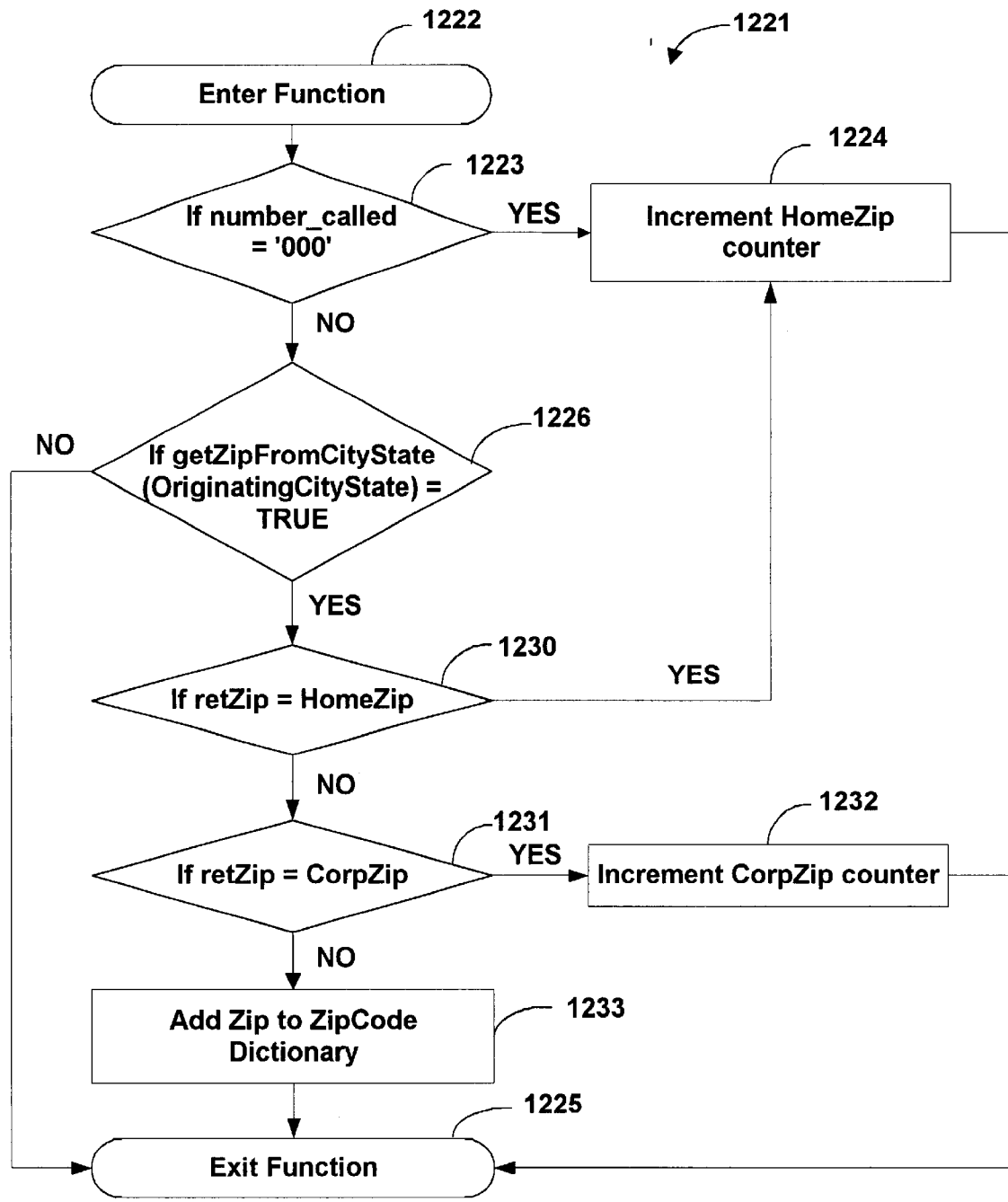
FIG. 22 is a flowchart illustrating the getWhere process of FIG. 14.

The getWhere process 1221 of block 1160 (FIG. 14) is depicted in the flowchart of FIG. 22. The getWhere process 1221 begins with the Enter function in block 1222, and proceeds to the decision block 1223, where the decision is made if number_called is equal to '000'. If "YES", the process proceeds to block 1224, the Increment HomeZip counter, and then to the Exit function of block 1225. If the decision of block 1223 is "NO", the process proceeds to the decision block 1226, where the decision is made if getZipFromCityState (originatingCityState) is TRUE. If the answer to decision block 1226 is "NO", the process proceeds to the Exit function of block 1225. If the answer to decision block 1226 is "YES", the process proceeds to decision block 1230, where the decision is made if retZip is equal to the homeZip. If "YES", the process proceeds to block 1224, the Increment HomeZip counter, and then to the Exit function of block 1225. If the decision of block 1230 is "NO", the process proceeds to the decision block 1231, where the decision is made if retZip is equal to corpZip. If the answer to the decision block 1231 is "YES", the process proceeds to block 1232, the Increment CorpZip counter, and then to the Exit function of block 1225. If the decision of block 1231 is "NO", the process proceeds to block 1233, the Add zip to zipCode dictionary, and then to the Exit function of block 1225.

Figure 23:
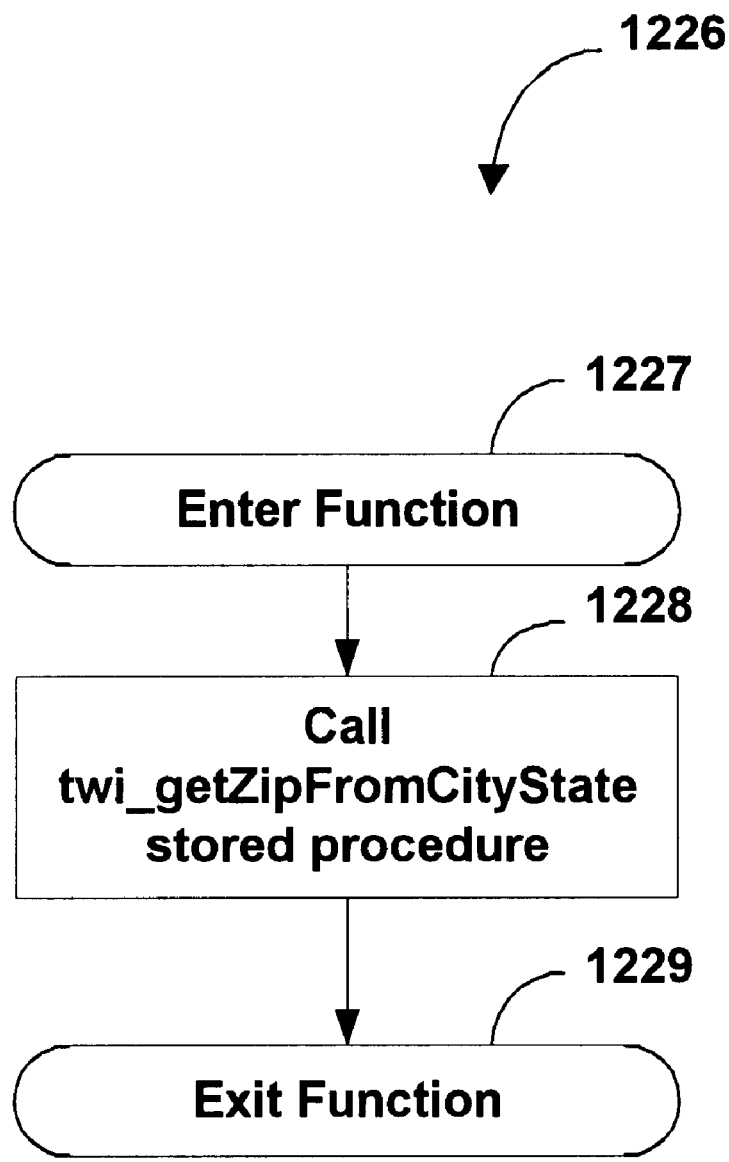
FIG. 23 is a flowchart illustrating the getZipFromCityState process of FIG. 22.

The getZipFromCityState process referred to in block 1226 (FIG. 22) is detailed in the flowchart of FIG. 23. The process 1226 begins with the Enter function in block 1227, and then proceeds to the Call twi_getZipFromCityState stored procedure command of block 1228. The process then exits in block 1229.

Figure 24:
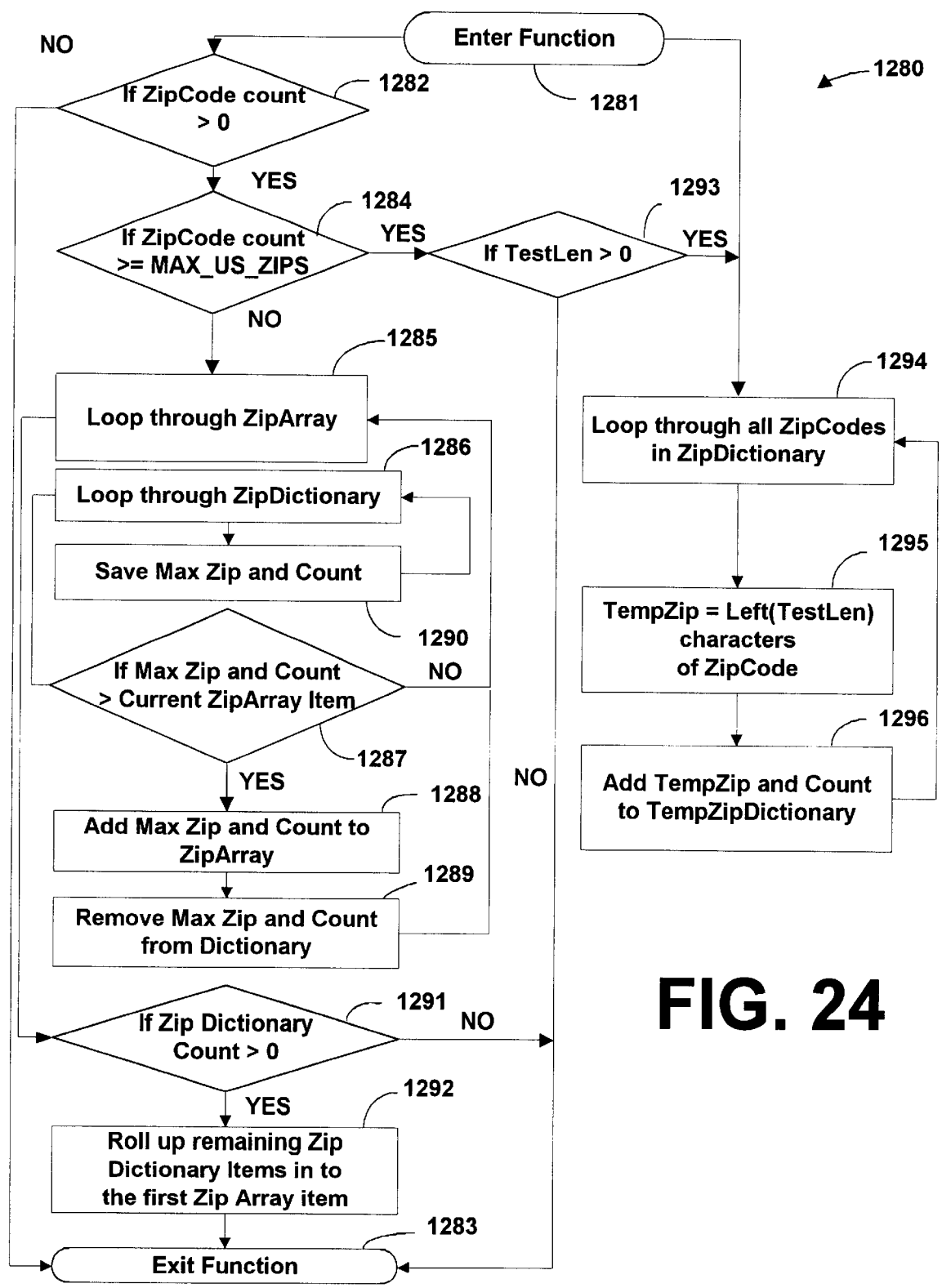
FIG. 24 is a flowchart illustrating the getZipCodes process of FIG. 14.

The getZipCodes process of 1280 of FIG. 14 is detailed in the flowchart of FIG. 24. The getZipCodes process 1280 begins with the Enter function in block 1281, and proceeds to the decision block of 1282, where the decision is made if zipCode count is greater than zero. If "NO", the process proceeds to the Exit function of bolck 1283. If the zipCode count is greater than zero ("YES"), the process proceeds to the decision block of 1284, wherein the decision is made If zipCode count is greater than or equal to max_us_zips. If "NO", the process proceeds to block 1285, the looping operation through zipArray. The zipArray may contain any number of items according to several embodiments of the invention. By way of example, in one embodiment, the zipArray contains four items. The process may either then proceed to the decision block 1291, or continue on to block 1286, the looping operation through zipDictionary. From block 1286, the process can then either proceed to the decision block of 1287 or continue on to block 1290, the function Save max zip and count. At block 1290, the process then returns to the looping operation through zipDictionary of block 1286.

If the looping operation through zipDictionary of block 1286 proceeds through the decision block of 1287, the decision is made if the max zip and count is greater than the current zipArray item. If "NO", the process returns to block 1285, the looping operation through zipArray. If the answer to decision block 1287 is "YES" (max zip and count are greater than current zipArray item), then the process proceeds to block 1288, where the max zip and count are added to zipArray. The process then proceeds to block 1289, to remove max zip and count from dictionary. From block 1289, the process then returns to block 1285, the looping operation through zipArray. Once the looping operation through zipArray of block 1285 is completed, the process proceeds to the decision block 1291, wherein the decision is made if zipDictionary count is greater than zero. If "NO", the process then proceeds to the Exit function of block 1283. If "YES", the process then proceeds to roll up remaining zip dictionary items in to the first Zip Array item as instructed in block 1292, and then proceeds to the Exit function of block 1283. Returning to the decision block of 1284, if "YES" (ZipCode count is greater than or equal to max_us_zips), then the process proceeds to the decision block 1293, wherein the decision is made if testLen is greater than zero. If "NO", the process proceeds to the Exit function of block 1283. If "YES" (testLen is greater than zero), then the process proceeds to the function of block 1294, and looping operation through all zipCodes in zipDictionary.

The loop then proceeds to block 1295, where tempZip is equal to left(testLen) characters of zipCode. The process then proceeds to block 1296, where the function Add tempZip and count to tempZipDictionary is performed, and then returns to the looping operation through all zipCodes in zipDictionary of block 1294. If in block 1294 the testLen is equal to the testLen-1, the process proceeds to the Enter function of block 1281, and the getZipCodes begins again.

Figure 25:
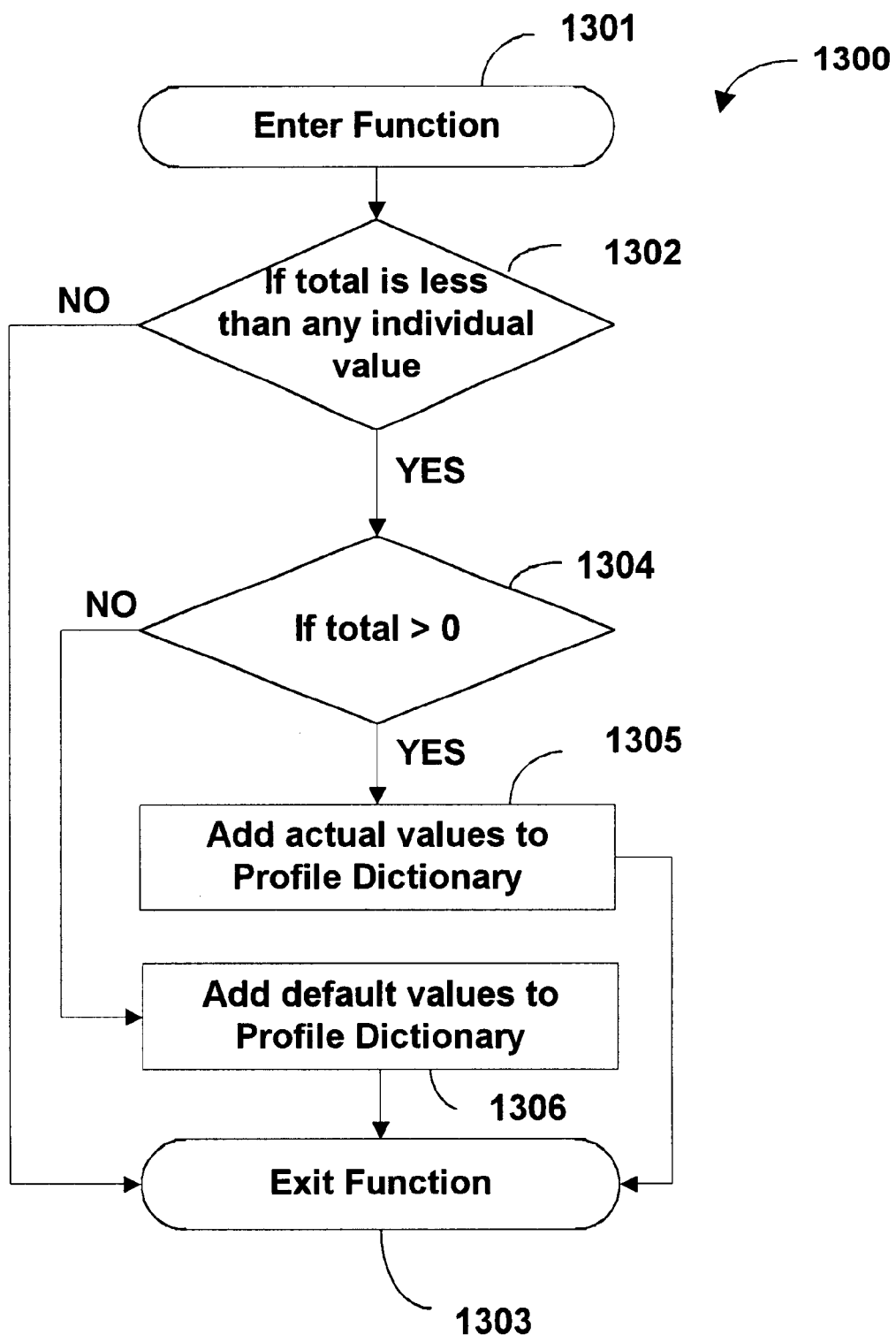
FIG. 25 is a flowchart illustrating the buildProfilesDic process of FIG. 14.

The buildProfilesDic process of block 1300 (FIG. 14) is detailed in the flowchart of FIG. 25. The process 1300 begins with the Enter function of block 1301, and proceeds to the decision block 1302, where the decision is made if total is less than any individual value. If "NO", the process proceeds to the Exit function of block 1303. If "YES" (total is less than any individual value), then the process proceeds to the decision block 1304, where the decision is made if the total is greater than zero. If "NO", the process proceeds to block 1306, for adding default values to profile dictionary, and then to the Exit function of block 1303. If the decision of block 1304 is "YES" (total is greater than zero), then the process proceeds to block 1305, for adding actual values to profile dictionary, and then to the Exit function of block 1303.

Figure 26:
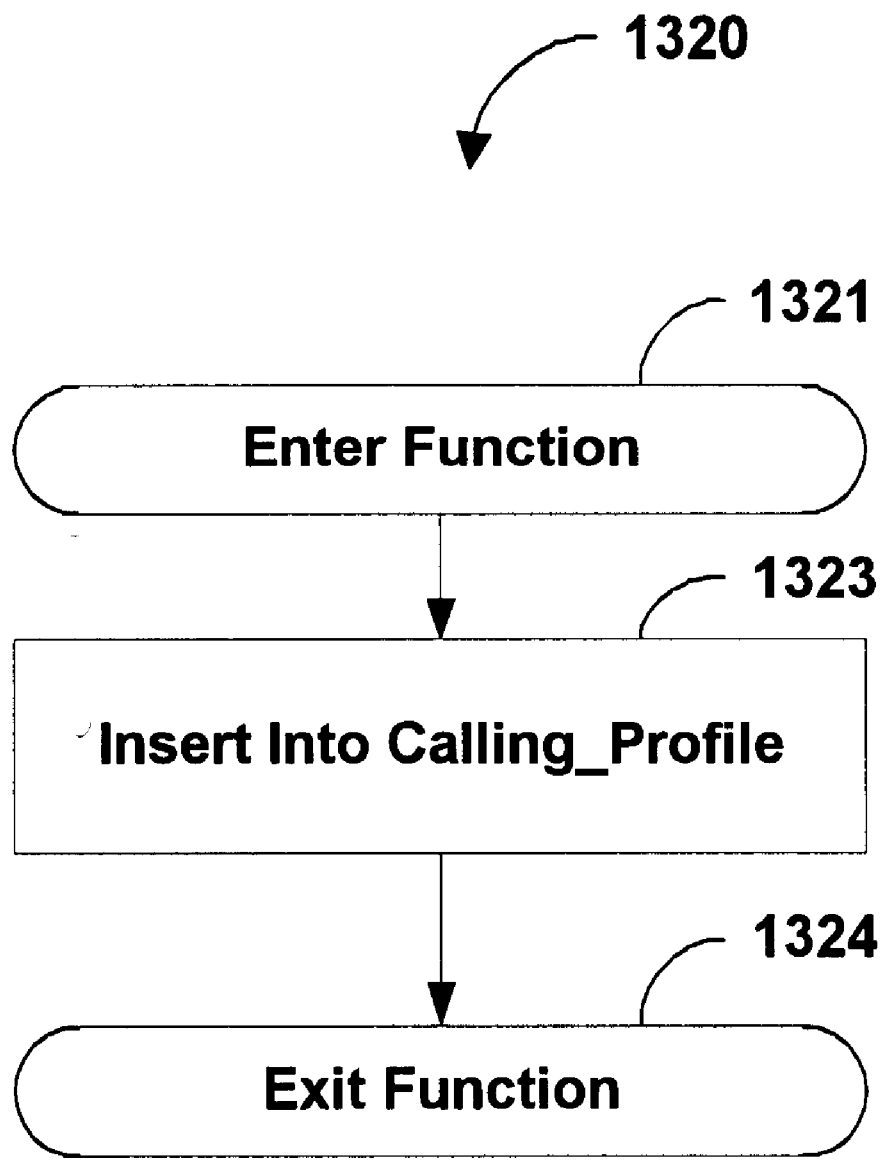
FIG. 26 is a flowchart illustrating the addProfileRecord process of FIG. 14.

The addProfileRecord process of block 1320 (FIG. 14) is detailed in the flowchart of FIG. 26. The process 1320 begins with the Enter function of block 1321. The process then proceeds to block 1323 for inserting into the calling_profile. The process then ends with the Exit function 1324.

Figure 27:
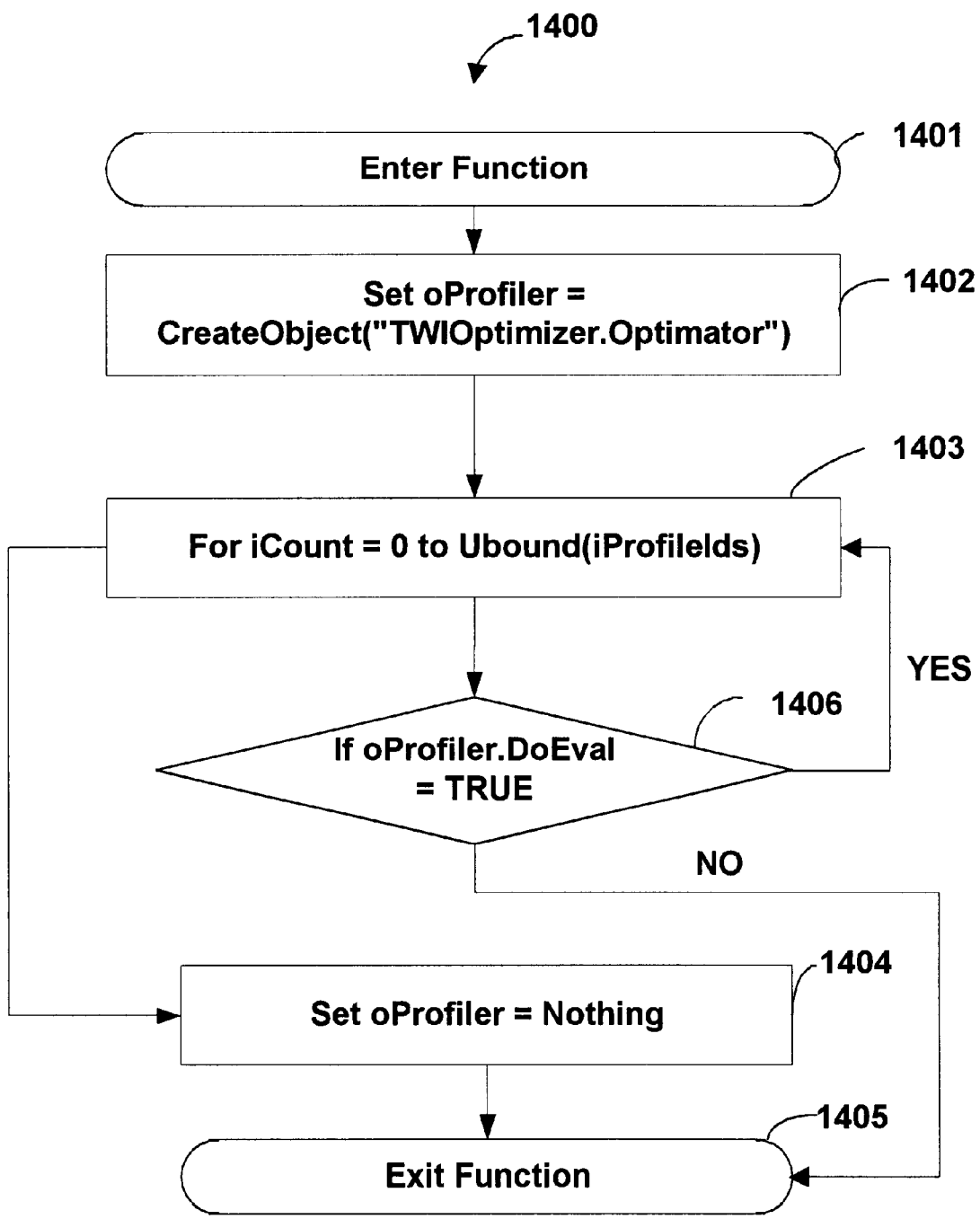
FIG. 27 is a flowchart illustrating the runProfiler process of the optimator of FIG. 5.

Once the profiles are built, according to the steps detailed in the flowchart of FIGS. 14–26, the profiles are then run, as detailed in the flowchart of FIG. 27. The runProfiler process 1400 begins with the Enter function of block 1401, and proceeds to the function of block 1402, of Set oProfiler= CreateObject("TWIOptimizer.Optimator"). The process then proceeds to block 1403, For iCount=0 to Ubound (iProfileIds). From block 1403, the process may proceed to block 1404, Set oProfiler=Nothing, and then to the Exit function of block 1405. Block 1403 may also proceed to the decision block of 1406, where the decision is made If oProfiler.DoEval is TRUE. If "NO", the process then proceeds to the Exit function of block 1405. If "YES" (oProfiler.DoEval is TRUE), then the process returns to block 1403, For iCount=0 to Ubound(iProfileIds).

Figure 28:
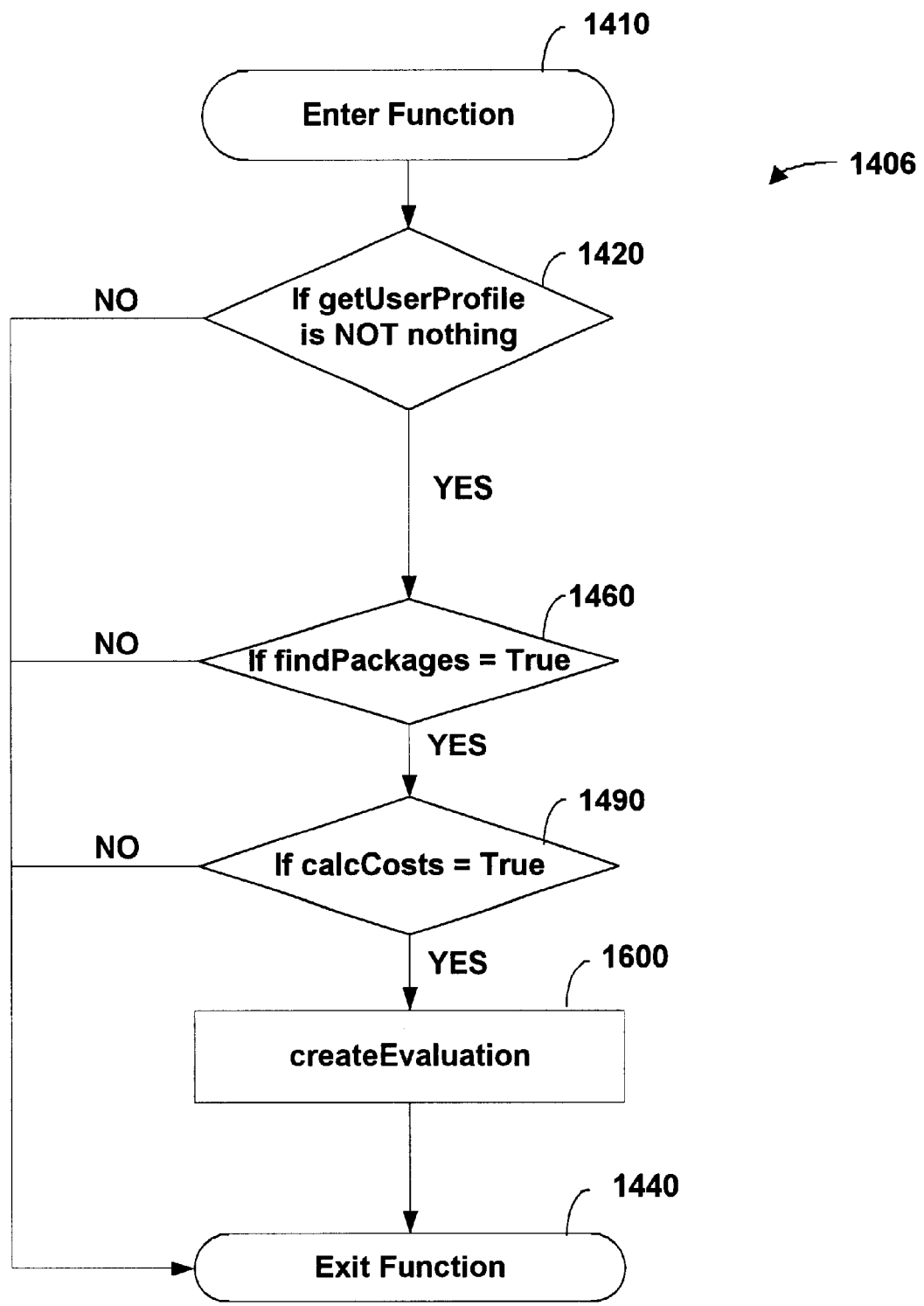
FIG. 28 is a flowchart illustrating the doEval process of FIG. 27.

The doEval process of block 1406 (FIG. 27) is detailed in the flowchart of FIG. 28. The doEval process 1406 begins with the Enter function of block 1410, and proceeds to the decision block 1420, where the decision is made If getUserProfile is NOT nothing. If "NO", the process proceeds to the Exit function of block 1440. If "YES" (getUserPrfile is NOT nothing), then the process proceeds to the decision block 1460, where the decision is made If findPackages is True. If "NO", the process proceeds to the Exit function of block 1440. If "YES" (findPackages is True), then the process proceeds to the decision block of 1490. In the decision block of 1490, the decision is made If calcCosts is True. If "NO", the process proceeds to the Exit function of block 1440. If "YES", the process then proceeds to block 1600 for createEvaluation, and then to the Exit function 1440.

Figure 29:
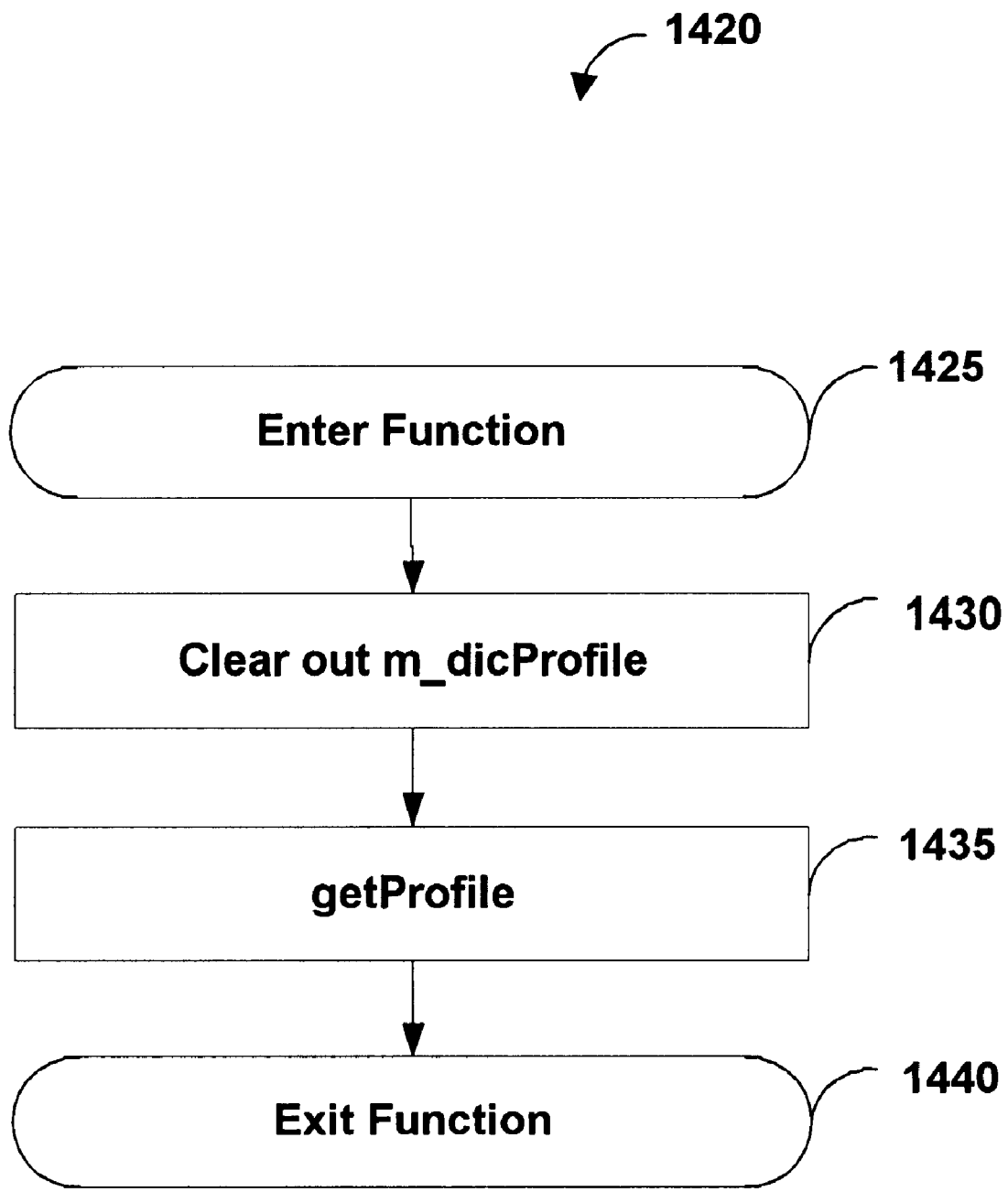
FIG. 29 is a flowchart illustrating the getUserProfile process of FIG. 28.

The getUserProfile process of block 1420 (FIG. 28) is described in greater detail in the flowchart of FIG. 29. The getUserProfile process 1420 begins with the Enter function of block 1425, proceeds to block 1430 for Clear out m_dicProfile. The process then proceeds to block 1435 for getProfile, and then to the Exit function 1440.

Figure 30:
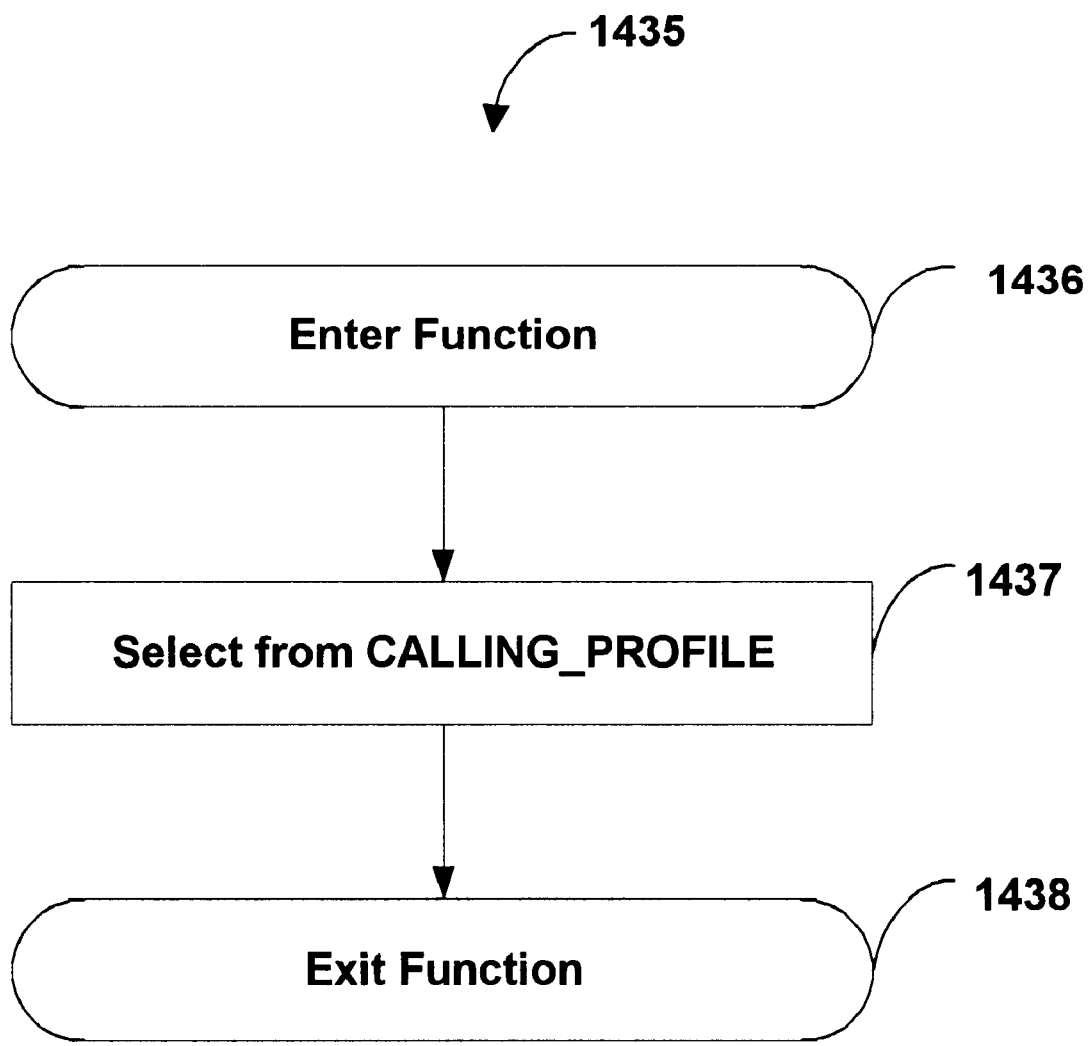
FIG. 30 is a flowchart illustrating the getProfile process of FIG. 29.

The getProfile process of block 1435 (FIG. 29) is described in greater detail in the flowchart of FIG. 30. The getProfile process 1435 begins with the Enter function of block 1436, and proceeds to block 1437 for Select from calling_profile. The process then proceeds to the Exit function of block 1438.

Figure 31:
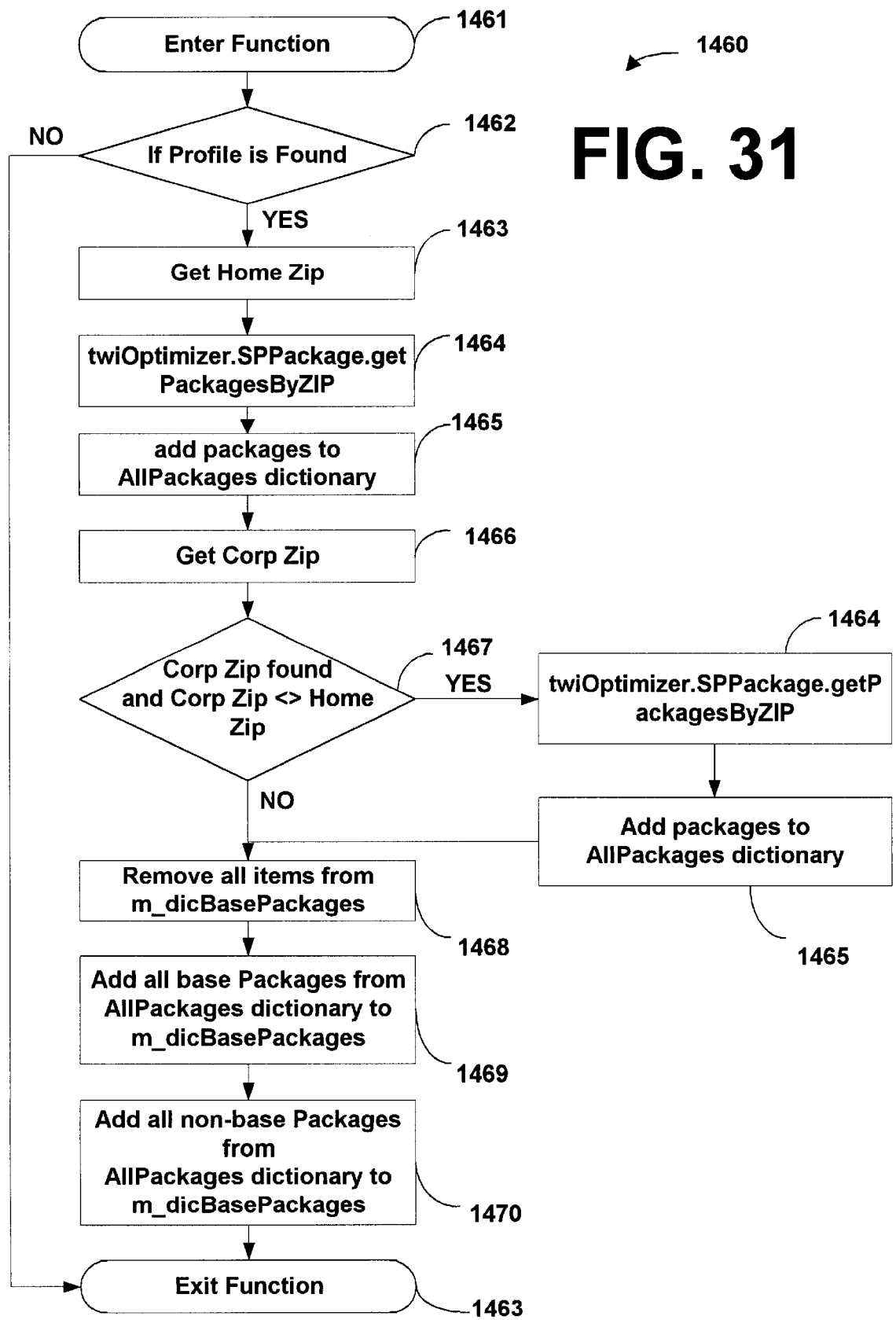
FIG. 31 is a flowchart illustrating the findPackages process of FIG. 28.

The findPackages process of block 1460 (FIG. 28) is described in greater detail in the flowchart of FIG. 31. The findPackages process 1460 begins with the Enter function of block 1461, and then proceeds to the decision block of 1462, where the decision is made if profile is found. If "NO", the process proceeds to the Exit function of block 1463. If "YES" (profile is found), the process proceeds to block 1463 for Get home zip, and then to block 1464, twiOptimizer.SPPackage.getPackagesByZIP, where packages are added to allPackages dictionary 1465. The process proceeds to block 1466 where it performs the Get corp zip function, and then to the decision block of 1467, where the decision is made if corp zip is found and corp zip is greater than or less than the home zip. If the decision of block 1467 is "NO", the process proceeds to block 1468 for removing all items from m_dicBasePackages. The process then proceeds to block 1469 for performing the function Add all base packages form allPackages dictionary to m_dicBasePackages. The process then proceeds to block 1470 where it performs the function Add all non-base packages from allPackages dictionary to m_dicBasePackages, and then proceeds to the Exit function 1463. If the decision of block 1467 is "YES" (corp zip is found and corp zip is greater than or less than home zip), the process proceeds to block 1464, where it performs the function twiOptimizer.SPPackage.getPackagesByZip. The process then proceeds to block 1465 where it performs the function Add packages to allPackages dictionary. From block 1465, the process continues on to block 1468, where it performs the function Remove all items from m_dicBasePackages, and the process continues on until the Exit function of block 1463.

Figure 32:
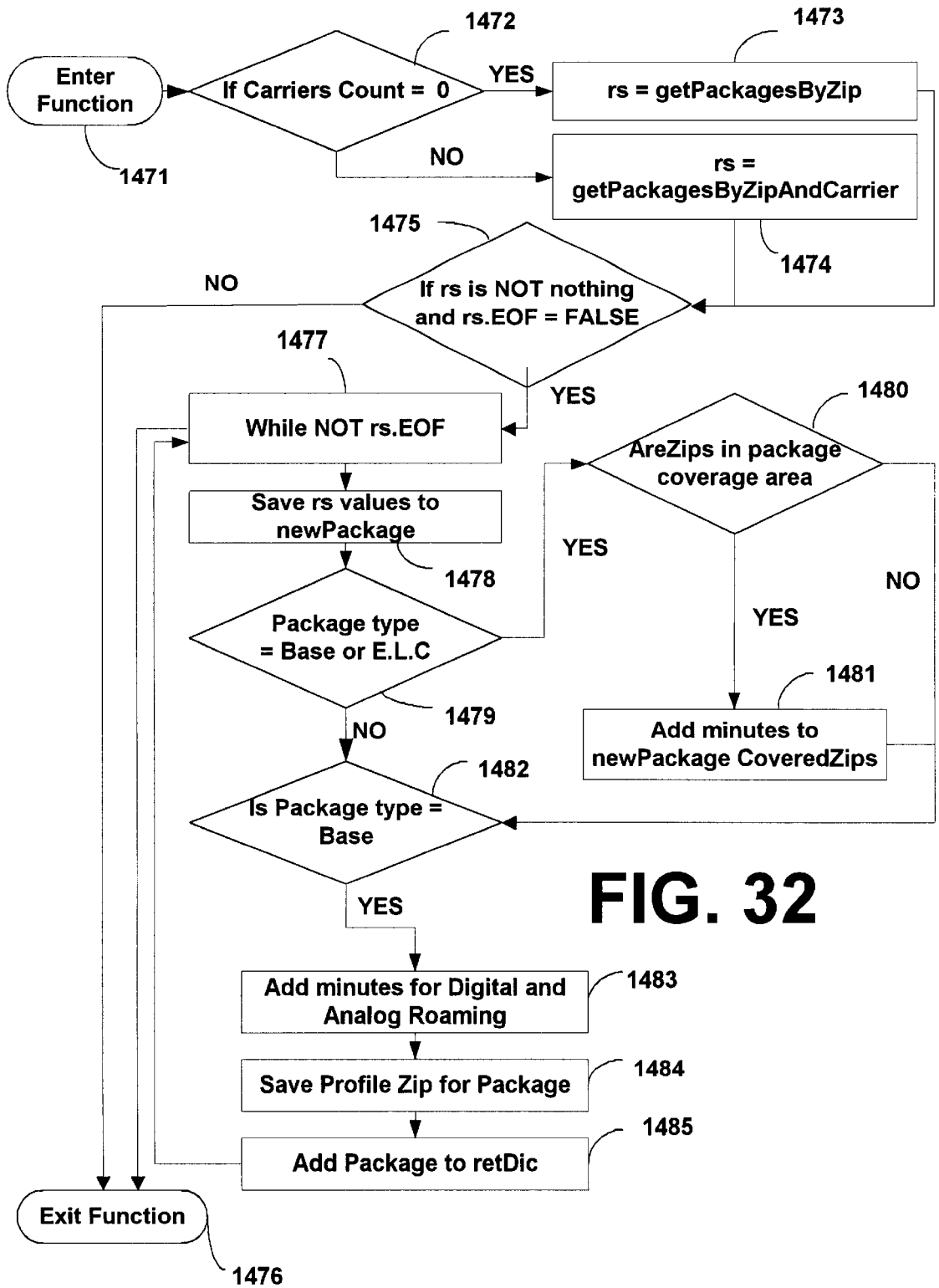
FIG. 32 is a flowchart illustrating the getPackagesByZip process of FIG. 31.

The getPackagesByZIP process of block 1464 (FIG. 31) is described in greater detail in the flowchart of FIG. 32. The getPackagesByZIP process 1464 begins with the Enter function 1471, and proceeds to the decision block 1472, where the decision is made if carriers count is equal to zero. If "NO", the process proceeds to block 1474, where rs equals getPackagesByZipAndCarrier, and then to the decision block 1475. If the answer to the decision block 1472 is "YES" (carriers count is equal to zero), then the process proceeds to block 1474, where rs equals getPackagesByZip. From block 1473, the process then proceeds to the decision block 1475, where the decision is made if rs is NOT nothing and rs.EOF is FALSE. If the answer is "NO", the process proceeds to the Exit function of block 1476. If the answer to the decision block 1475 is "YES" (rs is NOT nothing and rs.EOF is FALSE), then the process proceeds to block 1477, While NOT rs.EOF.

From block 1477, the process may then proceed to the Exit function of block 1476, or it may proceed to block 1478, where it performs the function Save rs values to newpackage. From block 1478, the process proceeds to the decision block 1479, where the decision is made if package type equals base or extendedLocalCalling. If "NO", the process proceeds to the decision block of 1482. If "YES" (package type is equal to base or extendedLocalCalling), the process then proceeds to the decision block 1480. In the decision block 1480, the decision is made areZips in package coverage area. If "NO", the process then proceeds to the decision block 1482. If "YES" (areZips in package coverage area), then the process proceeds to block 1481, where it performs the function Add minutes to newPackage coveredZips.

From block 1481, the process then proceeds to the decision block 1482, where the decision is made is package type equal to Base. The answer to the decision block 1482 is necessarily "YES", and the process proceeds to block 1483, where it performs the function Add minutes for Digital and Analog Roaming. From block 1483, the process proceeds to block 1484, where it performs the function Save profile zip for package.

From block 1484, the process proceeds to block 1485, where it performs the function Add package to retDic. From block 1485, the process returns again to block 1477, and this loop is repeated until the function is rs.EOF. Then the process proceeds from block 1477 to the Exit function of block 1476.

Figure 33:
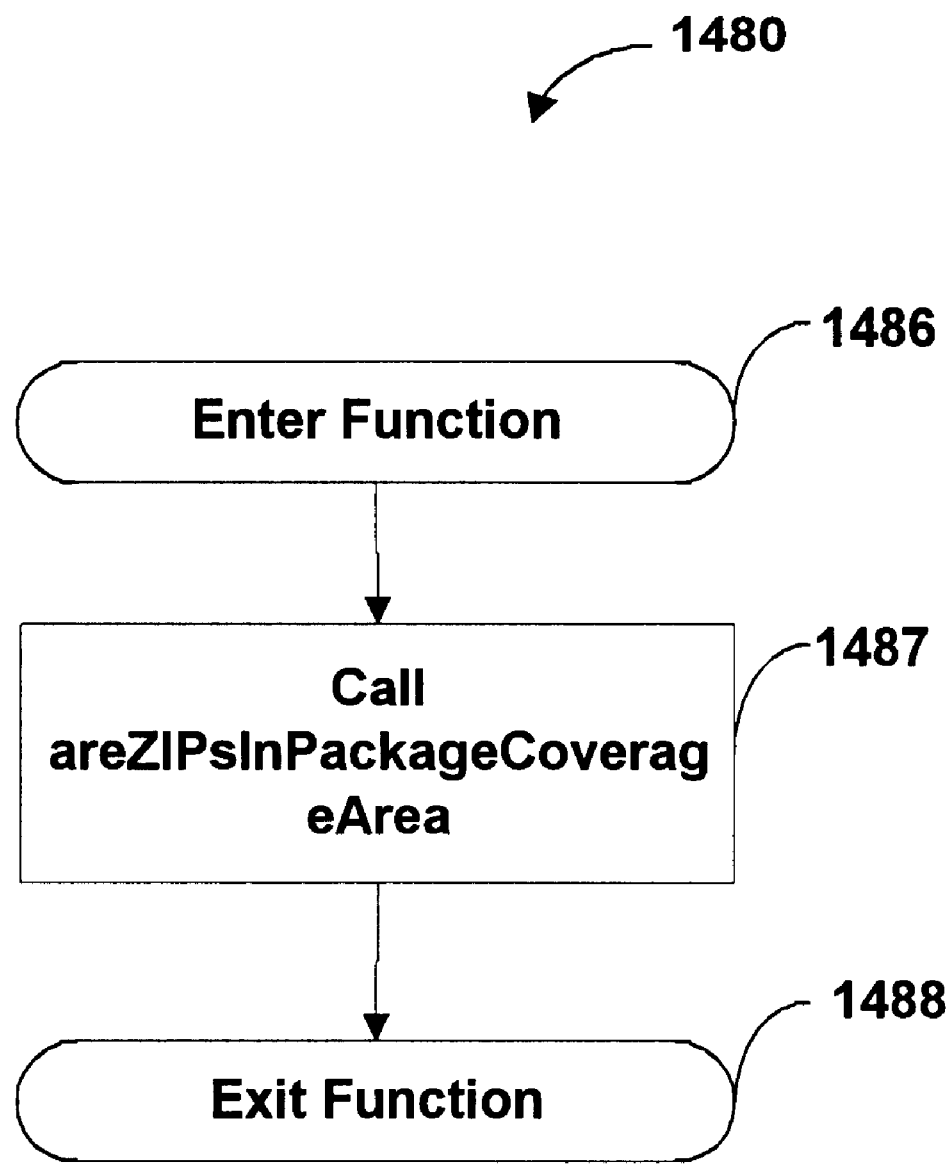
FIG. 33 is a flowchart illustrating the selectCoveredZIPS process of FIG. 32.

The selectCoveredZIPs process of block 1480 (FIG. 32) is described in greater detail in the flowchart of FIG. 33. The selectCoveredZIPs function 1480 begins with the Enter function of block 1486, and then proceeds to block 1487, where it performs the function Call areaZIPsInPackageCoverageArea. Upon completion of the function of block 1487, the process proceeds to the Exit function of block 1488.

Figure 34A:
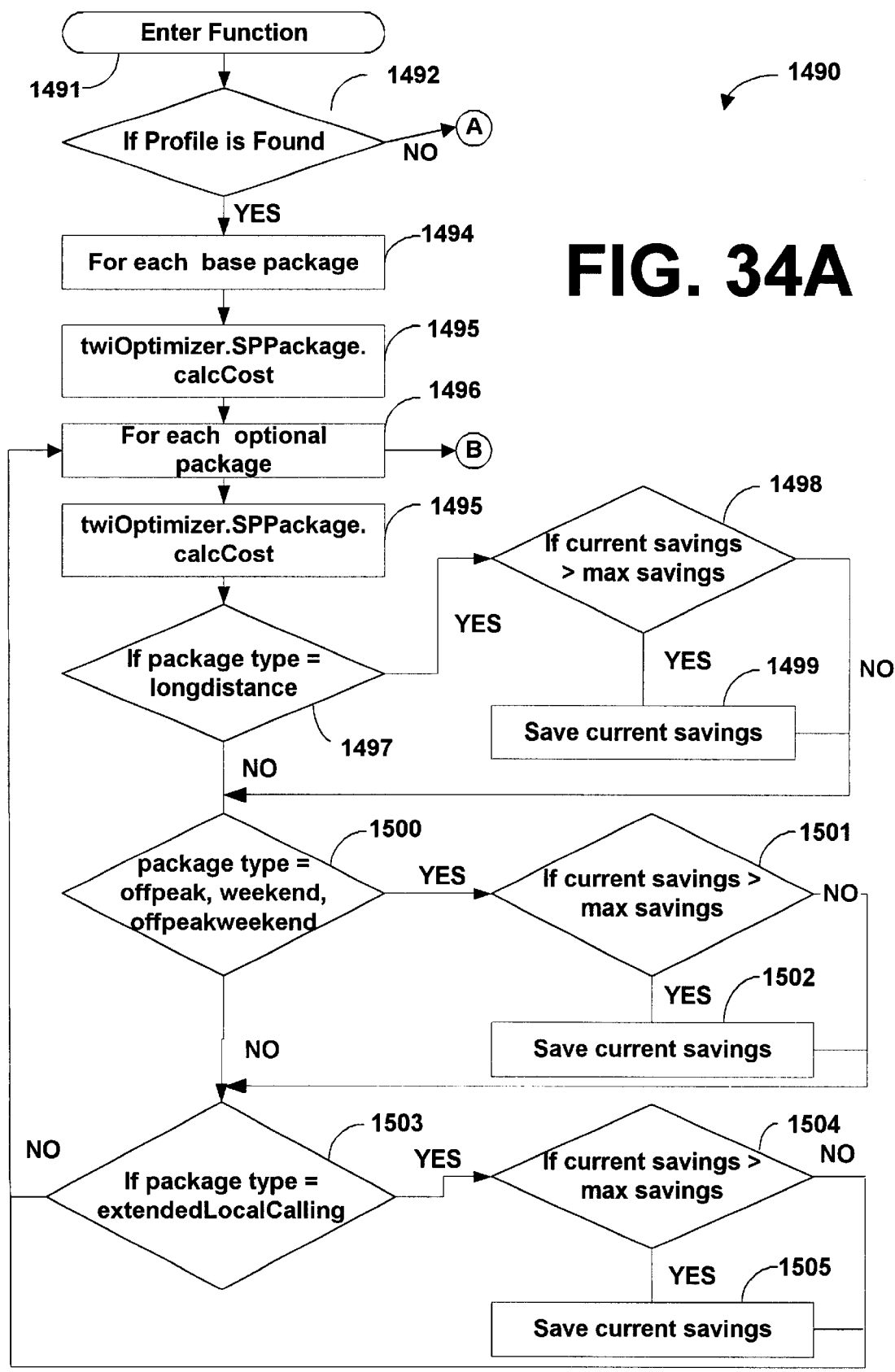
FIGS. 34A and 34B are flowcharts illustrating the calcCost process of FIG. 28.
Figure 34B:
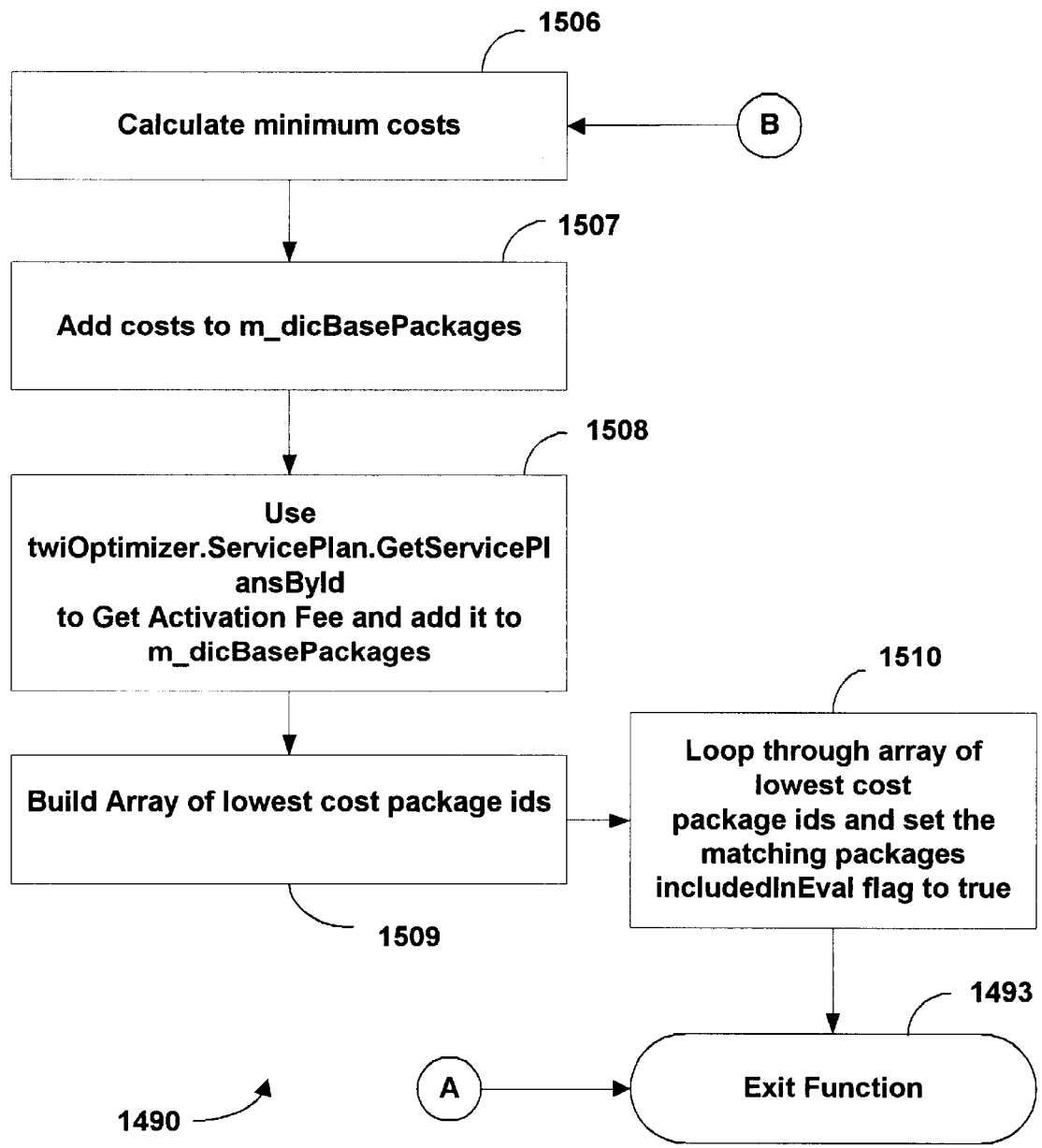

The calcCosts process of block 1490 (FIG. 28) is described in greater detail in the flowcharts of FIG. 34A and FIG. 34B. The process calcCosts 1490 begins with the Enter function of block 1491, and proceeds to the decision block 1492, where the decision is made if profile is found. If "NO", the process proceeds to the Exit function of block 1493. If "YES" (Profile is Found), the process proceeds to the function of block 1494, For each base package, and then proceeds to the function of block 1495, twiOptimizer.SPPackage.calcCost. From block 1495, the process proceeds to a looping operation beginning with block 1496, for each optional package.

From block 1496, the process can either proceed directly to the Calculate minimum costs function of block 1506, or the function of block 1495, twiOptimizer.SPPackage.calcCost. From block 1495, the process proceeds to the decision block 1497, where the decision is made whether package type equals longdistance. If "YES" (package type is longdistance), the process proceeds to the decision block 1498, where the decision is made if current savings is greater than max savings. If the answer to the decision block 1498 is "NO" (current savings is not greater than max savings), the process proceeds to the decision block 1500. If "YES" (current savings is greater than max savings), the process proceeds to the function of block 1499, Save current savings.

From block 1499, the process then proceeds to the decision block 1500. In the decision block 1500, the decision is made if package type is equal to offpeak, weekend, or offpeakweekend. If "YES" (package type is either offpeak, weekend, or offpeakweekend), the process proceeds to the decision block 1501. In the decision block 1501, the decision is made whether current savings are greater than max savings. If "NO", the process proceeds to the decision block 1503. If "YES" (current savings are greater than max savings), the process proceeds to the function of block 1502, Save current savings.

From block 1502, the package type then proceeds to the decision block 1503. If the decision of block 1500 is "NO" (package type is not offpeak, weekend, or offpeakweekend), then the process proceeds to the decision block 1503, where the decision is made if package type is equal to extendedLocalCalling. If "NO", the process returns back to the function of block 1406, for each optional package, and then proceeds to the function of block 1495, twiOptimizer.SPPackage.calcCost, and the procedure is run again. If the decision of block 1503 is "YES" (package type is extendedLocalCalling), the process then proceeds to the decision block 1504. In the decision block 1504, the decision is made whether current savings is greater than max savings. If the answer to the decision of block 1504 is "NO", the process returns again to the looping operation of block 1496, and the procedure is run again for each optional package. If the answer to block 1504 is "YES" (current savings is greater than max savings), then the process proceeds to the function of block 1505, Save current savings.

From block 1505, the process then returns to block 1496, where the procedure is repeated. Once the procedures have been calculated for each optional package of block 1496, the process then continues on to the function of block 1506, Calculate minimum costs. From block 1506, the process then proceeds to the function of block 1507, Add costs to m_dicBasePackages. From block 1507, the process proceeds to the function of block 1508, Use twiOptimizer.ServicePlan.GetServicePlansById to Get activation fee and add it to m_dicBasePackages.

From block 1508, the process continues to the function of block 1509, Build array of lowest cost package ids. The array may contain any number of items according to several embodiments of the invention. By way of example, in one embodiment of the invention, the array contains three items. From block 1509, the process continues to the function of block 1510, a looping operation through array of lowest cost package ids and set the matching packages includedInEval flag to true. From block 1510, the process then proceeds to the Exit function of block 1493.

Figure 35A:
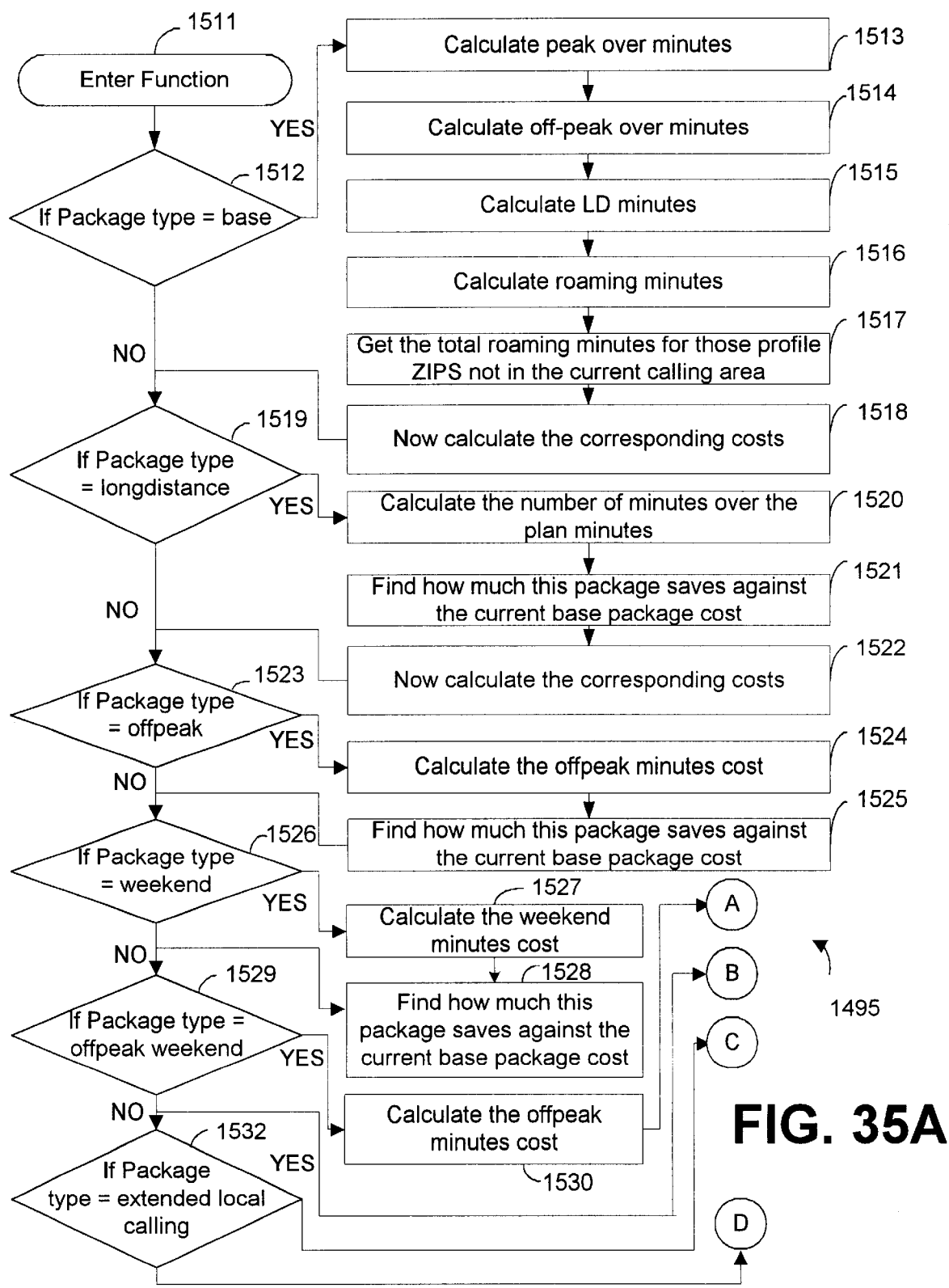
FIGS. 35A and 35B are flowcharts illustrating a continuation of the calcCost process of FIG. 34.
Figure 35B:
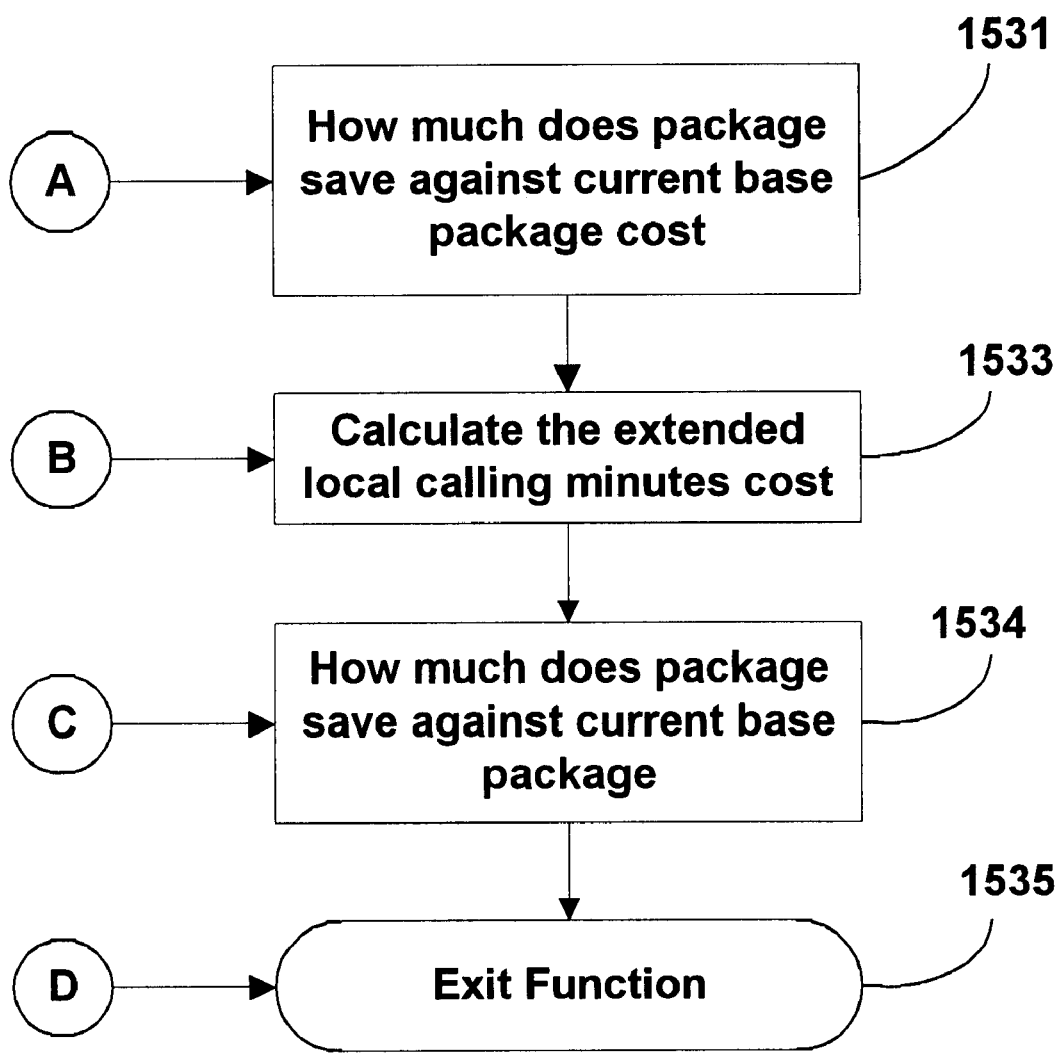

The process for the calcCost function of block 1495 (FIG. 34) is detailed in the flowchart of FIGS. 35A and 35B. The process 1495 begins with the Enter function of block 1511, and proceeds to the decision block of 1512, where the decision is made if package type is equal to base. If "YES" (package is base), then the process proceeds to the function of block 1513, Calculate peak over minutes. The process then proceeds to the function of block 1514, Calculate off-peak over minutes, followed by the function of block 1515, Calculate long distance (LD) minutes.

The process then proceeds to the function of block 1516, Calculate roaming minutes, and then to block 1517, Get the total roaming minutes for those profile ZIPS not in the current calling area. From block 1517, the process proceeds to block 1518, the function Now Calculate the corresponding costs, and then proceeds to the decision block 1519, where the decision is made if package type is longdistance. Further, if the decision of block 1512 is "NO" (package type is not base), the process proceeds to the decision block of 1519. If the decision of block 1519 is "NO", the process then proceeds to the decision of block 1523, as to whether Package type is equal to offpeak. If the decision of block 1519 is "YES" (package type is equal to longdistance), the process proceeds to the function of block 1520, Calculate the number of minutes over the plan minutes.

From block 1520, the system proceeds to block 1521, the function Find how much this package saves against the current base package cost. Once the function of 1521 is complete, the process moves to the function 1522, Now calculate the corresponding costs. Once the function of block 1522 is completed, the process then moves to the decision block 1523, where the decision is made if package type is equal to offpeak. If the decision is "NO", the process proceeds to the decision block of 1526. If the decision of block 1523 is "YES" (package type is offpeak), then the process proceeds to the function of block 1524, Calculate the offpeak minutes cost.

After the function of block 1524, the process proceeds to the function of block 1525, Find how much this package saves against the current base package cost. Upon completion of the function 1525, the process then proceeds to the decision block of 1526, where the decision is made if package type is equal to weekend. If "NO", the process proceeds to the decision block 1529. If the decision of block 1526 is "YES" (package type is weekend), then the process proceeds to the function of block 1527, Calculate the weekend minutes cost. Upon the completion of the function of block 1527, the process proceeds to the function of block 1528, Find how much this package saves against the current base package cost. Upon completion of the function of block 1528, the process will then proceed to the decision block 1529, where the decision is made if package type is equal to offpeak weekend. If "NO", the process proceeds to the decision block 1532. If the decision of block 1529 is "YES" (package type is offpeak weekend), then the process proceeds to the function of block 1530, Calculate the offpeak minutes cost.

Figure 36:
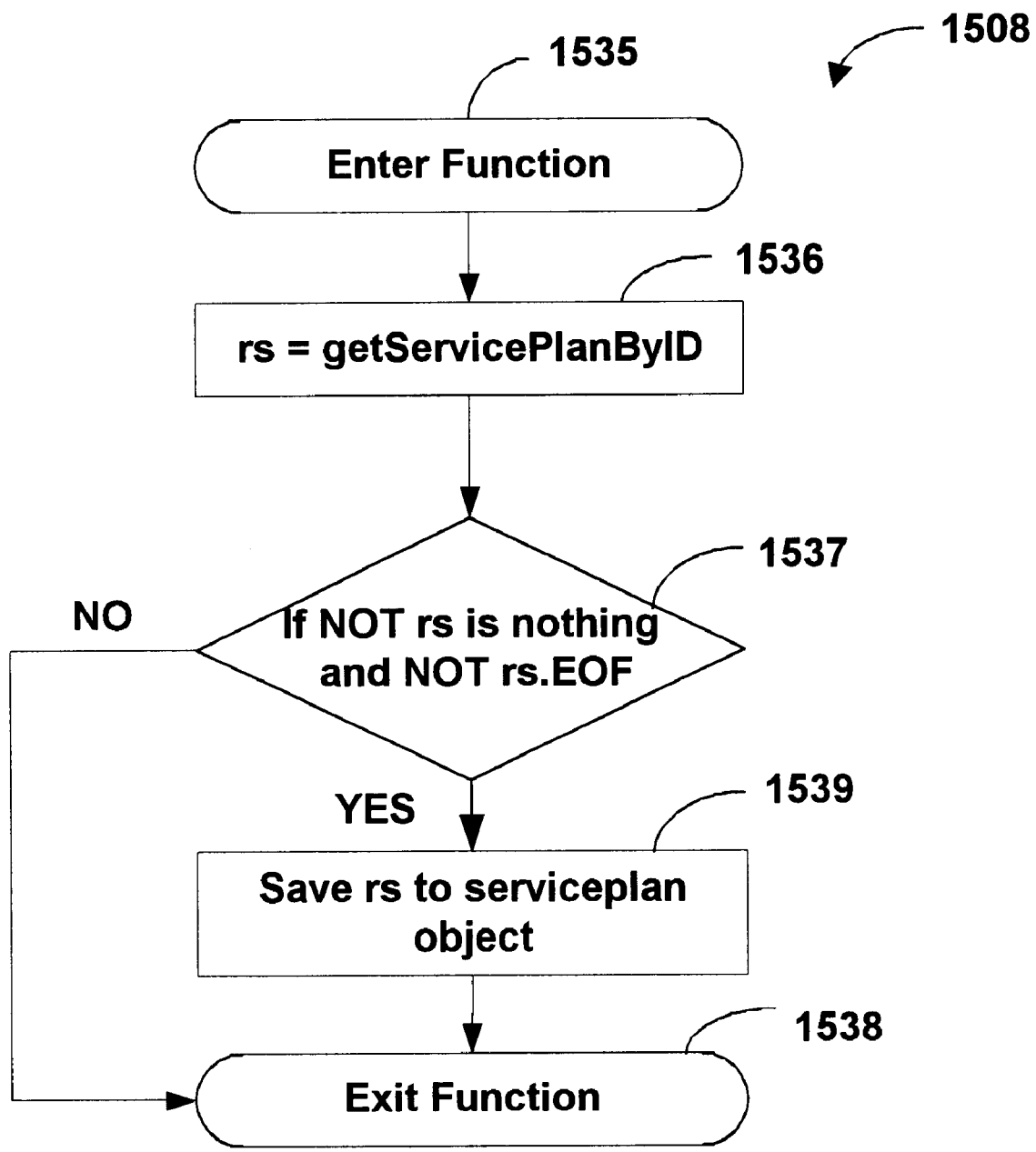
FIG. 36 is a flowchart illustrating the getServicePlanByID process of FIG. 34.

Upon completion of the function of block 1530, the process continues to the function of block 1531, Find how much this package saves against the current base package cost. Upon completion of this function, the process then proceeds to the decision block 1532, where the decision is made if package type is equal to extended local calling. If "NO", the process then proceeds to the Exit function of block 1535. If the decision of block 1532 is "YES" (package is extended local calling), then the process proceeds to the function of block 1533, Calculate the extended local calling minutes cost. After the function of block 1533, the process continues to the function of block 1534, Find how much this package saves against the current base package cost. The process then proceeds to the Exit function 1535. The getServicePlanByID process of block 1508 (FIG. 34) is detailed in the flowchart of FIG. 36. The getServicePlanByID process 1508 begins with the Enter function of block 1535, and proceeds to the function of block 1536, rs equals getServicePlanByID. The process then proceeds to the decision block 1537, where the decision is made if NOT rs is nothing and NOT rs.EOF. If "NO", the process proceeds to the Exit function of block 1538. If "YES" (NOT rs is nothing and NOT rs.EOF), then the process continues to the function of block 1539, Save rs to serviceplan object. From block 1539, the process then proceeds to the Exit function of block 1538.

Figure 37:
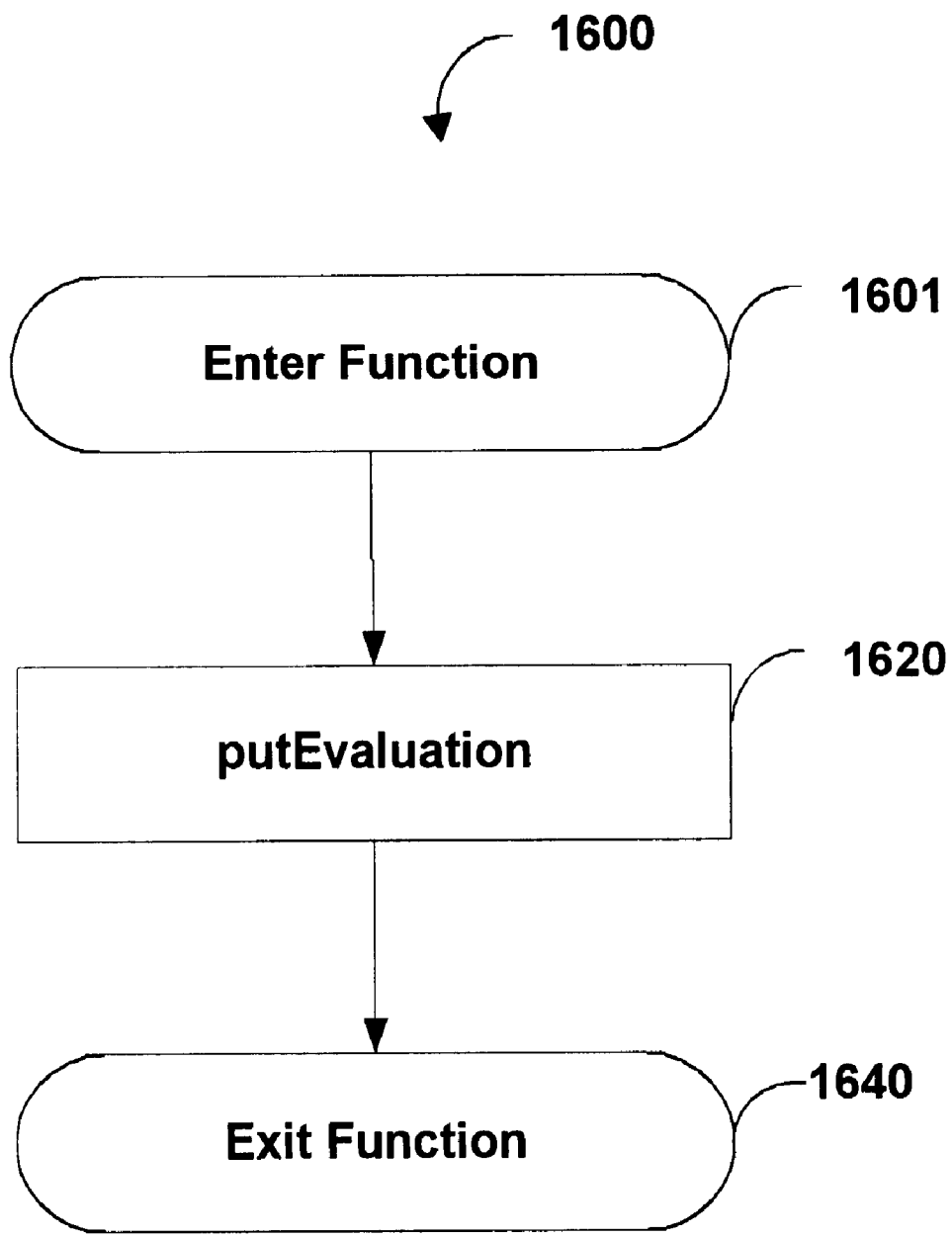
FIG. 37 is a flowchart illustrating the createEvaluation process of FIG. 28.

The createEvaluation function of block 1600 (FIG. 28) is detailed in the flowchart of FIG. 37. The process createEvaluation 1600 begins with the Enter function of block 1601, proceeds to the function of block 1620, putEvaluation, and then finishes with the Exit function of block 1640.

Figure 38:
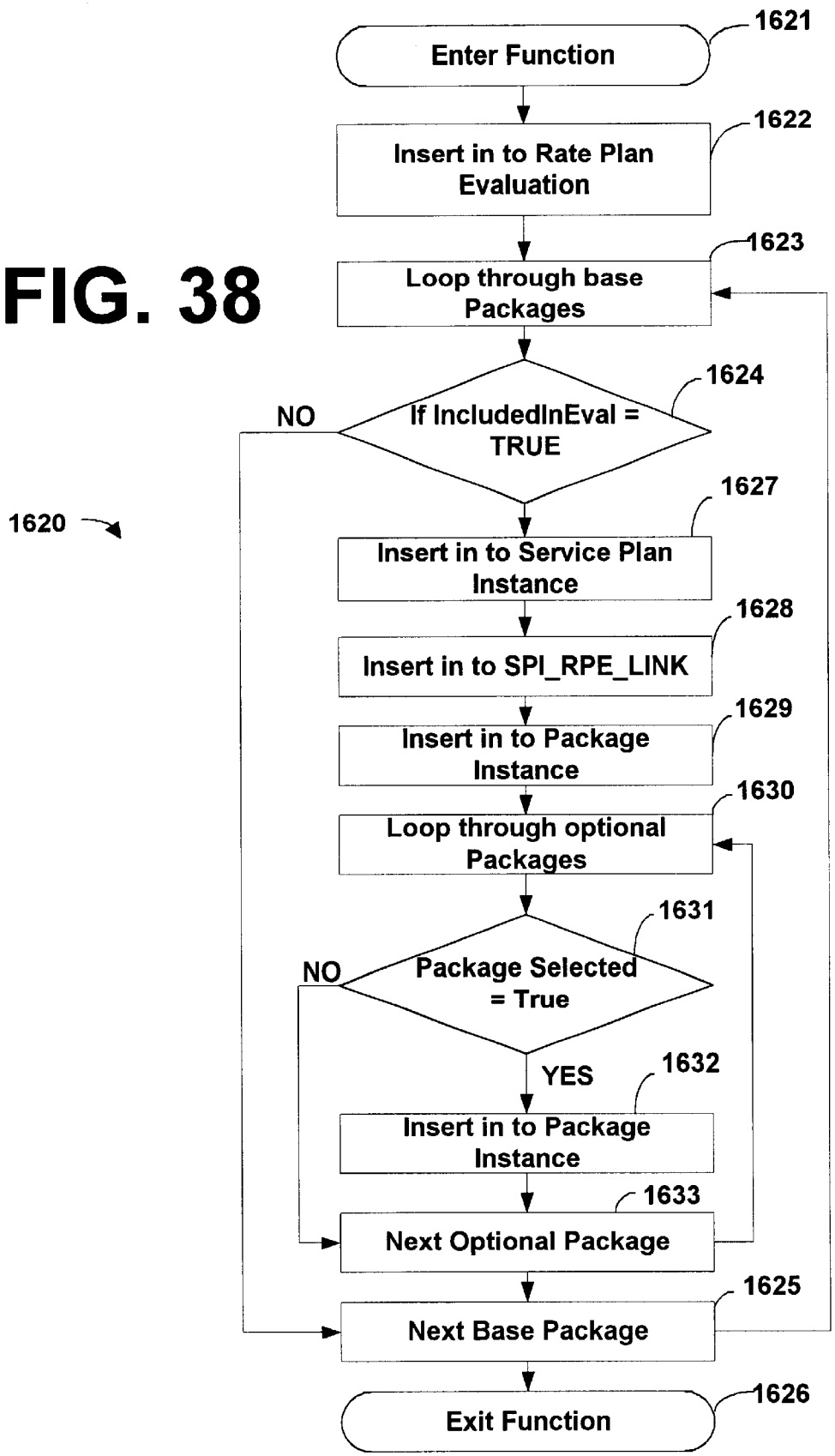
FIG. 38 is a flowchart illustrating the putEvaluation process of FIG. 29.

The putEvaluation process of block 1620 (FIG. 37) is detailed in the flowchart of FIG. 38. The process putEvaluation 1620 begins with the Enter function 1621, proceeds to the function of block 1622, Insert in to rate plan evaluation, and then proceeds to the function of block 1623, a looping operation through base packages. The process then proceeds to the decision block 1624, where the decision is made if includedInEval is TRUE. If "NO", the process then proceeds to the next base package, as depicted in block 1625.

From block 1625, the process then returns to the looping operation base packages of block 1623. If the decision of block 1624 is "YES" (includedInEval is TRUE), then the process proceeds to the function of block 1627, Insert in to service plan instance. The process then proceeds to the function of block 1628, Insert in to SPI_RPE_LINK, before proceeding to the function of block 1629, Insert in to package instance. The process then continues to the function of block 1630, the looping operation through optional packages. In the looping operation, the process proceeds to the decision block 1631, where the decision is made if package selected is True. If "NO", the looping operation then goes directly to the next optional package, as shown in block 1633, before returning through to the looping operation through optional packages of block 1630. If the decision of block 1631 is "YES" (if package selected is True), then the process proceeds to the function of block 1632, Insert in to package instance, and then to the function of block 1633 for the next optional package.

Once the looping operation is completed, the process then proceeds from block 1633 to the function of block 1625 for the next base package, which is part of the looping operation through based packages as depicted in block 1623. Once the looping operation through base packages is complete, the process then moves from block 1625 to the Exit function of block 1626.

Figure 39:
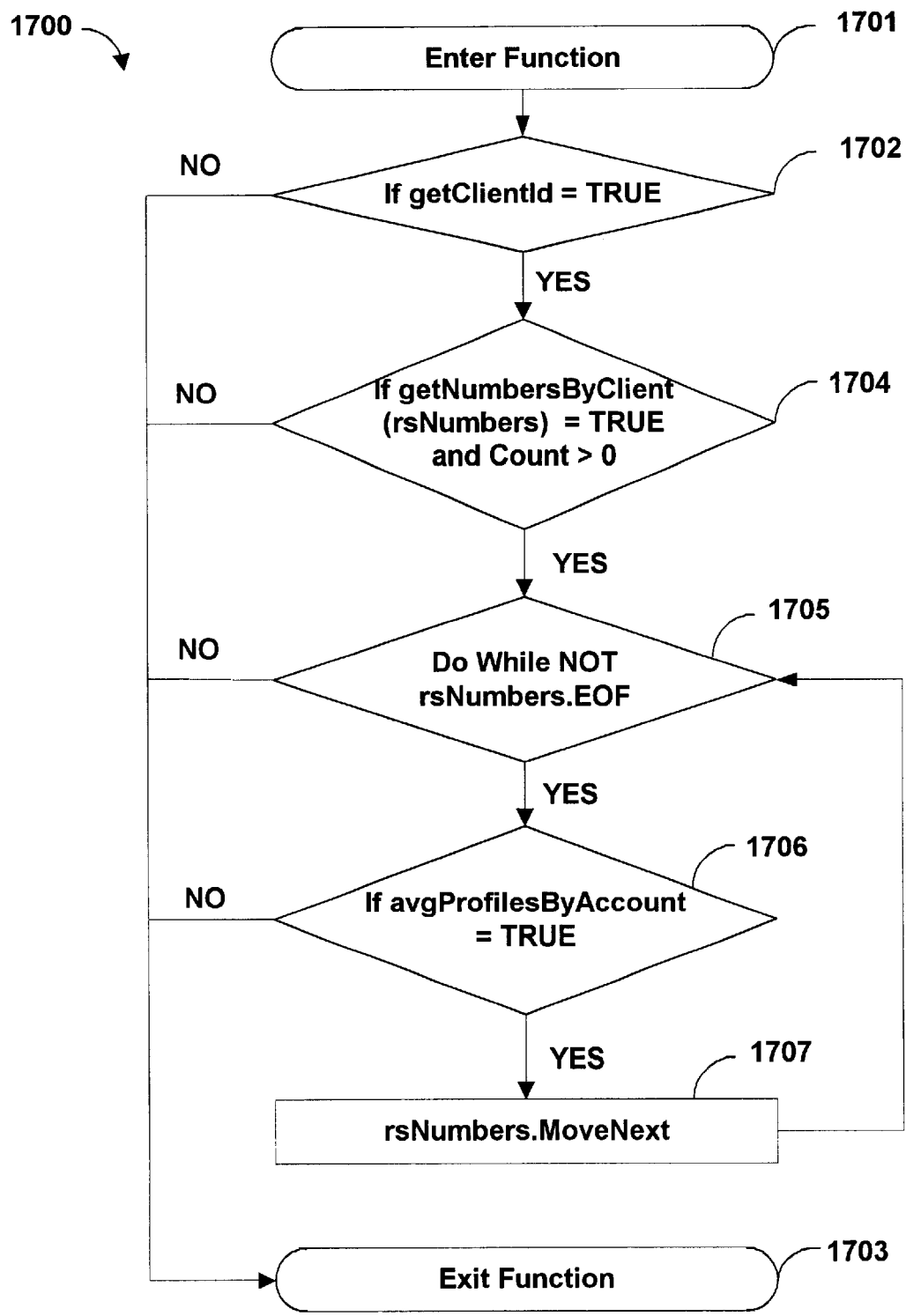
FIG. 39 is a flowchart illustrating the avgProfilesByClient process of FIG. 11.

The calling profiles may be averaged by client or account. The avgProvilesByClient process 1700 is depicted in the flowchart of FIG. 39. The avgProfilesByClient process 1700 begins with the Enter function of block 1701, and proceeds to the decision block 1702, where the decision is made if getClientId is TRUE. If "NO", the process then proceeds to the Exit function of block 1703. If "YES" (getClientId is TRUE), then the process proceeds to the decision block 1704. In block 1704, the decision is made If getNumbersByClient (rsNumbers) is TRUE and count is greater than zero. If "NO", the process proceeds to the Exit function of block 1703. If "YES" (getNumbersByClient (rsNumbers) is TRUE and count is greater than zero), the process proceeds to the decision block 1705, where the decision is made Do While NOT rsNumbers.EOF. If "NO", the process proceeds to the Exit function of block 1703. If "YES" (NOT rsNumbers.EOF), then the process proceeds to the decision block 1706.

The decision is made in block 1706 if avgProfilesByAccount is TRUE. If "NO", the process proceeds to the Exit function of block 1703. If "YES" (avgProfilesByAccount is TRUE), the process proceeds to the function of block 1707, rsNumbers.MoveNext. From the function of block 1707, the process then returns to the decision block 1705, and is repeated while NOT rsNumbers.EOF. The getClientId function of block 1702 has been previously described and is depicted in process 1020 (FIG. 15). The getNumbersByClient function of block 1704 has been previously described and is depicted in the flowchart of process 1060 (FIG. 17).

Figure 40:
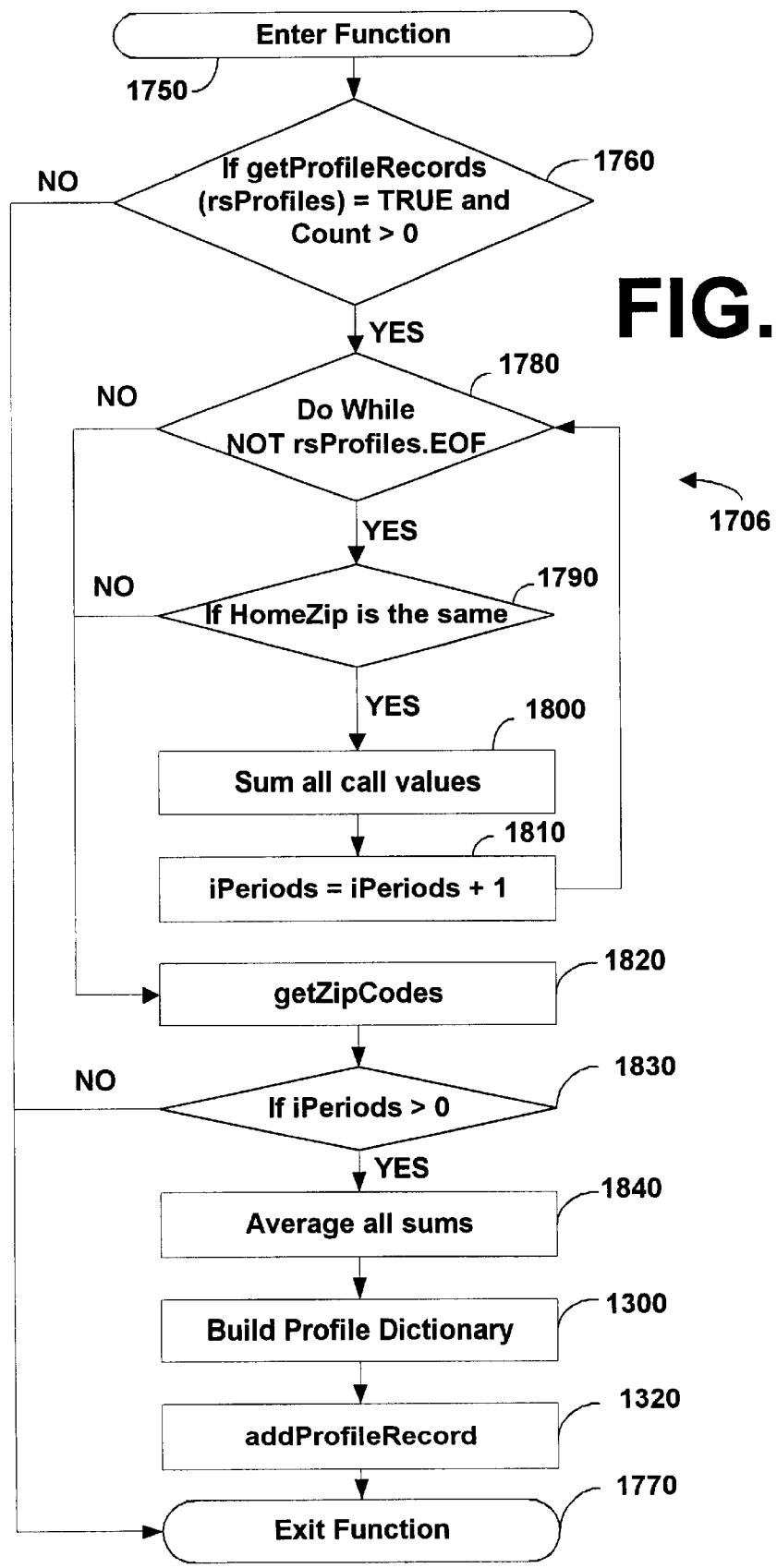
FIG. 40 is a flowchart illustrating the avgProfilesByAccounts process of FIG. 39.

The avgProfilesByAccount process 1706 (FIG. 39), is depicted in the flowchart of FIG. 40. The avgProfilesByAccount process 1706 begins with the Enter function shown in block 1750. The process then proceeds to the decision block 1760, where the decision is made if getProfileRecords (rsProfiles) is TRUE and the count is greater than zero. If "NO", the process proceeds to the Exit function of block 1770. If "YES" (getProfileRecords is TRUE and count is greater than zero), then the process proceeds to the decision block 1780, a Do while NOT rsProfiles.EOF function. If "NO", the process proceeds to the getZipCodes function of block 1820. If "YES" (NOT rsProfiles.EOF), then the process proceeds to the decision block 1790. In the decision block 1790, the decision is made if homeZip is the same. If "NO", the process proceeds to the getZipCodes function of block 1820. If "YES" (homeZip is the same), then the process proceeds to the function of block 1800, Sum all call values.

From block 1800, the process then continues to the function of block 1810, iPeriods equals iPeriods plus 1. The process then returns to the function Do while NOT rsProfiles.EOF of block 1780. Once the block 1780 is "NO", and leads to the getZipCodes function of block 1820, the process then continues to the decision block 1830. The decision is made in block 1830 if iPeriods is greater than zero. If "NO", the process proceeds to the Exit function of block 1770. If "YES" (iPeriods is greater than zero), then the process continues to the function of block 1840, Average all sums. The process then continues to the Build profile dictionary function of block 1300. The Build profile dictionary function is depicted in process 1300 (FIG. 25). The process then continues to the addProfileRecord of block 1320 (FIG. 26), before proceeding to the Exit function of block 1770.

Figure 41:
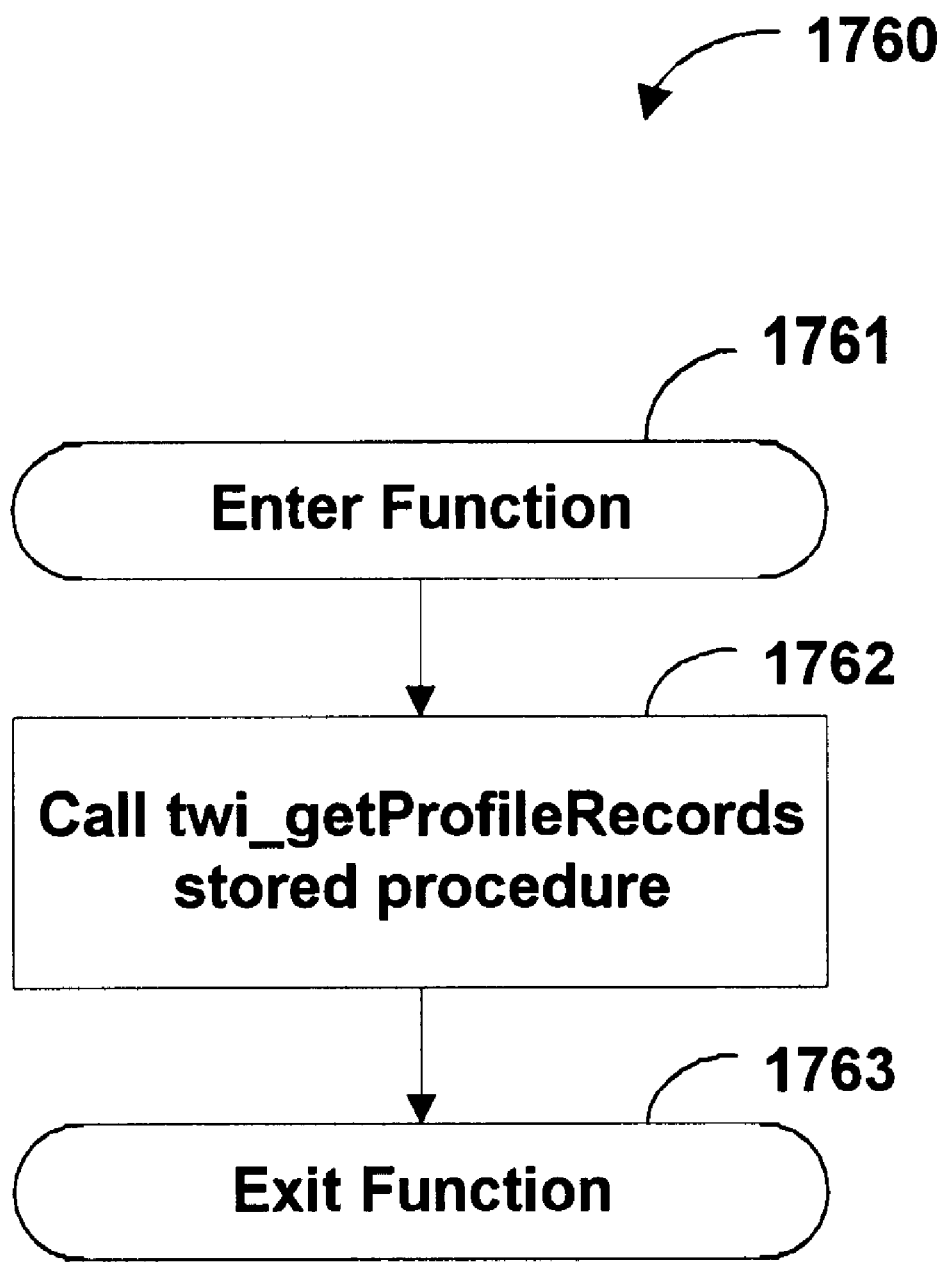
FIG. 41 is a flowchart illustrating the getProfileRecords process of FIG. 40.

The getProfileRecords process of block 1760 is depicted in greater detail in the flowchart of FIG. 41. The getProfileRecords process 1760 begins with the Enter function 1761, proceeds to the Call twi_getProfileRecords stored procedure of block 1762, and then finishes with the Exit function of block 1763.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A method, comprising the steps of:
   receiving billing information associated with a subscriber of a telecommunication service under a current rate plan;
   processing the subscriber related billing information to produce organized data in a calling profile record for each telecommunication service being used by the subscriber;
   analyzing the processed data in relation to a plurality of rate plans of a plurality of telecommunication service providers;
   determining at least one proposed rate plan that would save the subscriber telecommunication costs relative to the current rate plan; and
   producing a report of the at least one proposed rate plan to enable selection of a best telecommunication service provider and a best rate plan.

2. The method of claim 1, wherein the step of receiving billing information further comprises the steps of:
   importing wireless call detail records; and
   providing the wireless call detail records to usage history and call detail tables.

3. The method of claim 2, wherein the step of importing wireless call detail records is further defined as receiving the call detail records from at least one wireless communications carrier.

4. The method of claim 2, wherein the step of importing wireless call detail records further comprises the step of receiving the call detail records from the subscriber.

5. The method of claim 2, wherein the step of receiving billing information is performed via file transfer protocol.

6. The method of claim 2, wherein the step of receiving billing information is further defined as using a staging table as a subset of the total call detail records imported.

7. The method of claim 2, wherein the step of receiving billing information comprises using a staging table that allows for extraction of a minimum set of total call detail records used to populate the call detail table.

8. The method of claim 2, wherein said method further comprises more than one telecommunication service, and wherein the step of processing the subscriber related billing information assesses rate plan options in a subscriber home or corporate market.

9. The method of claim 8, wherein the calling profile record includes an assessment of rate plan options in a subscriber home or corporate market.

10. The method of claim 8, wherein the calling profile record includes an assessment of service plan options that categorizes where calls are made or received into a subscriber home market, corporate market, and alternate markets.

11. The method of claim 1, wherein the step of analyzing the processed data comprises the step of evaluating calling profile records of the subscriber in order to determine if the current rate plan is cost effective for the subscriber.

12. The method of claim 11, wherein the step of analyzing the processed data further comprises the step of determining at least one cost-effective calling plan.

13. The method of claim 12, wherein the step of analyzing the processed data further comprises the step of comparing the cost of the at least one cost-effective calling plan to cost of the current rate plan.

14. The method of claim 13, wherein the step of analyzing the processed data further comprises the step of selecting a best possible cost-effective calling plan.

15. The method of claim 14, wherein the step of selecting the best possible cost-effective plan is performed by using at least one statistical filter.

16. The method of claim 1, wherein the step of producing a report further comprises the step of rendering recommendations to the subscriber.

17. The method of claim 16, wherein the step of producing a report further comprises the step of presenting results of the step of analyzing the processed data to the subscriber.

18. The method of claim 16, wherein the step of producing a report further comprises the step of executing any actions a viewer of the report may wish to take as a result of viewing the report.

19. A system, comprising:
   means for receiving subscriber related billing information associated with a subscriber of a telecommunication service under a current rate plan;
   means for processing the subscriber related billing information to produce organized data in a calling profile record for each telecommunication service being used by the subscriber, the means for processing being communicatively coupled to the means for receiving subscriber related billing information;
   means for analyzing the processed data in relation to a plurality of rate plans of a plurality of telecommunication service providers, the means for analyzing being communicatively coupled to the means for processing the subscriber related billing information;
   means for determining at least one proposed rate plan that would save the subscriber telecommunication costs relative to the current rate plan, the means for determining being communicatively coupled to the means for analyzing the processed data; and
   means for producing a report of the at least one proposed rate plan to enable selection of a best telecommunication service provider and a best rate plan, the means for producing a report being communicatively coupled to the means for determining at least one proposed rate plan that would save the subscriber telecommunication costs.

20. The system of claim 19, wherein the means for receiving subscriber related billing information further comprises:
   means for importing wireless call detail records; and
   means for providing the wireless call detail records to usage history and call detail tables, wherein the means for providing the wireless call detail records to usage history and call detail tables is communicatively coupled to the means for importing wireless call detail records.

21. A system comprising:
   at least one transceiver configured to receive billing information associated with a subscriber of a telecommunication service under a current rate plan;
   a storage unit configured to store the billing information, wherein the storage unit is communicatively coupled to the transceiver;
   a memory comprising software, wherein the memory is communicatively coupled to the transceiver and the storage unit; and a processor, communicatively coupled to the transceiver, storage unit and memory, configured by the software to: process the subscriber related billing information to produce organized data in a calling profile record for each telecommunication service being used by the subscriber; analyze the processed data in relation to a plurality of rate plans of a plurality of telecommunication service providers; determine at least one proposed rate plan that would save the subscriber telecommunication costs relative to the current rate plan; and produce a report of the at least one proposed rate plan to enable selection of a best telecommunication service provider and a best rate plan, wherein the transceiver is configured to transmit the report.

22. The system of claim 21, wherein the system comprises a first transceiver and a second transceiver, the first transceiver being configured to receive billing information associated with a subscriber of a telecommunication service under a current rate plan, and the second transceiver being configured to transmit the produced report to the subscriber.

23. A computer readable medium having a computer program stored thereon, the computer readable medium, comprising:

logic configured to receive billing information associated with a subscriber of a telecommunication service under a current rate plan;

logic configured to store the billing information;

logic configured to process the subscriber related billing information to produce organized data in a calling profile record for each telecommunication service being used by the subscriber;

logic configured to analyze the processed data in relation to a plurality of rate plans of a plurality of telecommunication service providers;

logic configured to determine at least one proposed rate plan that would save the subscriber telecommunication costs relative to the current rate plan;

logic configured to produce a report of the at least one proposed rate plan to enable selection of a best telecommunication service provider and a best rate plan; and logic configured to transmit the produced report.

24. The method of claim 23, wherein the logic configured to receive billing information further comprises:

logic configured to import wireless call detail records; and logic configured to provide the wireless call detail records to usage history and call detail tables.

25. The method of claim 23, wherein the logic configured to analyze the processed data further comprises logic configured to evaluate calling profile records of the subscriber in order to determine if the current rate plan is cost effective for the subscriber, wherein the calling profile records are created from the imported wireless call detail records for each individual telecommunication service that assesses rate plan options in a subscriber home or corporate market.

26. The method of claim 23, wherein the logic configured to transmit the produced report, transmits the report to the subscriber.

27. A system, comprising:

a storage unit configured to store billing information associated with a subscriber of a telecommunication service under a current rate plan;

a memory comprising software, wherein said memory is communicatively coupled to the storage unit; and a processor communicatively coupled to the storage unit and the memory, configured by the software to:
process the subscriber related billing information to produce organized data in a calling profile record for each telecommunication service being used by the subscriber;
analyze the processed data in relation to a plurality of rate plans of a plurality of telecommunication service providers;
determine at least one proposed rate plan that would save the subscriber telecommunication costs relative to the current rate plan; and
produce a report of the at least one proposed rate plan to enable selection of a best telecommunication service provider and a best rate plan.

28. A method, comprising the steps of:

receiving billing information associated with a subscriber of a telecommunication service under a current rate plan;

processing the subscriber related billing information to produce organized data having a predefined format;

analyzing the processed data in relation to a plurality of rate plans of a plurality of telecommunication service providers, wherein the analyzing step further comprises the steps of evaluating calling profile records of the subscriber in order to determine if the current rate plan is cost effective for the subscriber and determining at least one cost-effective calling plan, wherein the at least one cost effective calling plan is in the form of a rate plan evaluation record and at least one linked service plan instance record;

determining at least one proposed rate plan that would save the subscriber telecommunication costs relative to the current rate plan; and producing a report of the at least one proposed rate plan to enable selection of a best telecommunication service provider and a best rate plan.

29. The method of claim 28, wherein the step of receiving billing information further comprises the steps of:

importing wireless call detail records; and providing the wireless call detail records to usage history and call detail tables.

30. The method of claim 29, wherein the step of importing wireless call detail records is further defined as receiving the call detail records from at least one wireless communications carrier.

31. The method of claim 29, wherein the step of importing wireless call detail records further comprises the step of receiving the call detail records from the subscriber.

32. The method of claim 29, wherein the step of receiving billing information is performed via file transfer protocol.

33. The method of claim 29, wherein the step of receiving billing information is further defined as using a staging table as a subset of the total call detail records imported.

34. The method of claim 29, wherein the step of receiving billing information comprises using a staging table that allows for extraction of a minimum set of total call detail records used to populate the call detail table.

35. The method of claim 29, wherein said method further comprises more than one telecommunication service, and wherein the step of processing the subscriber related billing information further comprises the step of creating a calling profile record from the imported wireless call detail records for each individual telecommunication service that assesses rate plan options in a subscriber home or corporate market.

36. The method of claim 35, wherein the step of creating a calling profile record is further defined as creating a calling profile record that includes an assessment of rate plan options in a subscriber home or corporate market.

37. The method of claim 35, wherein the step of creating a calling profile record further comprises the step of creating a calling profile record that includes an assessment of service plan options that categorizes where calls are made or received into a subscriber home market, corporate market, and alternate markets.

38. The method of claim 28, wherein the step of analyzing the processed data further comprises the step of comparing the cost of the at least one cost-effective calling plan to cost of the current rate plan.

39. The method of claim 38, wherein the step of analyzing the processed data further comprises the step of selecting a best possible cost-effective calling plan.

40. A method, comprising the steps of:
receiving billing information associated with a subscriber of a telecommunication service under a current rate plan;
processing the subscriber related billing information to produce organized data having a predefined format;
analyzing the processed data in relation to a plurality of rate plans of a plurality of telecommunication service providers, wherein said analyzing step further comprises the steps of: evaluating calling profile records of the subscriber in order to determine if the current rate plan is cost effective for the subscriber; determining at least one cost-effective calling plan; comparing the cost of the at least one cost-effective calling plan to cost of the current rate plan; and selecting a best possible cost-effective calling plan by using a historical predictor algorithm;
determining at least one proposed rate plan that would save the subscriber telecommunication costs relative to the current rate plan; and
producing a report of the at least one proposed rate plan to enable selection of a best telecommunication service provider and a best rate plan.

41. The method of claim 40, wherein the step of receiving billing information further comprises the steps of:
importing wireless call detail records; and
providing the wireless call detail records to usage history and call detail tables.

42. The method of claim 41, wherein the step of importing wireless call detail records is further defined as receiving the call detail records from at least one wireless communications carrier.

43. The method of claim 41, wherein the step of importing wireless call detail records further comprises the step of receiving the call detail records from the subscriber.

44. The method of claim 41, wherein the step of receiving billing information is performed via file transfer protocol.

45. The method of claim 41, wherein the step of receiving billing information is further defined as using a staging table as a subset of the total call detail records imported.

46. The method of claim 41, wherein the step of receiving billing information comprises using a staging table that allows for extraction of a minimum set of total call detail records used to populate the call detail table.

47. The method of claim 41, wherein said method further comprises more than one telecommunication service, and wherein the step of processing the subscriber related billing information further comprises the step of creating a calling profile record from the imported wireless call detail records for each individual telecommunication service that assesses rate plan options in a subscriber home or corporate market.

48. The method of claim 47, wherein the step of creating a calling profile record is further defined as creating a calling profile record that includes an assessment of rate plan options in a subscriber home or corporate market.

49. The method of claim 47, wherein the step of creating a calling profile record further comprises the step of creating a calling profile record that includes an assessment of service plan options that categorizes where calls are made or received into a subscriber home market, corporate market, and alternate markets.

50. The method of claim 40, wherein the at least one cost effective calling plan is in the form of a rate plan evaluation record and at least one linked service plan instance record.

51. The method of claim 40, wherein the step of producing a report further comprises the step of rendering recommendations to the subscriber.

52. The method of claim 51, wherein the step of producing a report further comprises the step of presenting results of the step of analyzing the processed data to the subscriber.

53. The method of claim 51, wherein the step of producing a report further comprises the step of executing any actions a viewer of the report may wish to take as a result of viewing the report.

* * * * *